United States Patent [19]

Hirtle

[11] 3,955,180
[45] May 4, 1976

[54] TABLE DRIVEN EMULATION SYSTEM
[75] Inventor: Allen C. Hirtle, Needham, Mass.
[73] Assignee: Honeywell Information Systems Inc., Waltham, Mass.
[22] Filed: Jan. 2, 1974
[21] Appl. No.: 430,322

[52] U.S. Cl. ............................................. 340/172.5
[51] Int. Cl.² ................... G05B 17/02; G05B 23/02; G06F 9/19; G06F 11/00
[58] Field of Search ..................... 340/172.5; 445/1

[56] References Cited
UNITED STATES PATENTS

| | | | |
|---|---|---|---|
| 3,369,221 | 2/1968 | Lethin et al. | 340/172.5 |
| 3,480,914 | 11/1969 | Schlaeppi | 340/172.5 |
| 3,631,405 | 12/1971 | Hoff et al. | 340/172.5 |
| 3,675,214 | 7/1972 | Ellis et al. | 340/172.5 |
| 3,721,961 | 3/1973 | Edstrom et al. | 340/172.5 |
| 3,748,649 | 7/1973 | McEowen et al. | 340/172.5 |
| 3,766,532 | 10/1973 | Liebel | 340/172.5 |
| 3,859,636 | 1/1975 | Cook | 340/172.5 |

Primary Examiner—Raulfe B. Zache
Assistant Examiner—Jan E. Rhoads
Attorney, Agent, or Firm—Faith F. Driscoll; Ronald T. Reiling

[57] ABSTRACT

A host microprogrammed data processing system includes a plurality of tables to store information coded to define a plurality of a variety of different input-output system configurations of resources required to execute input-output instructions in a corresponding number of target systems being emulated by the host system. The host system further includes emulation apparatus which includes a control store which stores microprograms for directing the system in processing input-output instructions of target programs and for verifying whether each such instruction can be executed by the host system. The emulation apparatus generates coded information indicating which one of a given number of channel program routines the host system is required to use to execute the input-output instruction using the host input-output resources. Using the information of the tables, the emulation apparatus is able to execute completely certain types of target system input-output instructions used to perform control operations.

33 Claims, 43 Drawing Figures

| Relative Location | ABBRV | Contents (0–7 / 8–15 / 16–23 / 24–31) |
|---|---|---|
| | | 0   7\|8   15\|16   23\|24   31 |
| 32 | LCW | TG \| RG \| ←——— SEG, SRA ———→ |
| 52 | BR0 | TG \| RG \| ←——— SEG, OFFSET ———→ |
| 56 | BR1 | TG \| RG \| ←——— SEG, OFFSET ———→ |
| 60 | BR2 | TG \| RG \| ←——— SEG, OFFSET (MAIN MEMORY) ———→ |
| 64 | BR3 | TG \| RG \| ←——— SEG, OFFSET (CONTROL MEMORY) ———→ |
| 68 | BR4 | TG \| RG \| ←——— SEG, OFFSET (I/O TABLES) ———→ |
| 72 | BR5 | TG \| RG \| ←——— SEG, OFFSET ———→ |
| 76 | BR6 | TG \| RG \| ←——— SEG, OFFSET ———→ |
| 80 | BR7 | TG \| RG \| ←——— SEG, OFFSET ———→ |
| 84 | GR0 | INV \| INA \| INB \| INC |
| 88 | GR1 | MBZ \| ADDRESS (70, BC) |
| 92 | GR2 | CONTROL \| ADDRESS (67, AC) |
| 96 | GR3 | L \| ADDRESS (77, SC) |
| 100 | GR4 | IND \| INEI \| RHU \| MBZ |
| 104 | GR5 | ←——— CF WORK LOCATION (CFWL2) ———→ |
| 108 | GR6 | ←——— CF WORK LOCATION (CFWL3) ———→ |
| 112 | GR7 | ←——— CF WORK LOCATION (CFWL6) ———→ |
| 116 | GR8/IR0 | MBZ \| ADDRESS (64, CSR) |
| 120 | GR9/IR1 | ←——— CF CONTROL WORD (CFCW) ———→ |
| 124 | GR10/IR2 | MBZ \| ADDRESS (66, EIR) |
| 128 | GR11/IR3 | MBZ \| ADDRESS (76, IIR) |
| 132 | GR12/IR4 | ←——— CF WORK LOCATION (CFWL1) ———→ |
| 136 | GR13/IR5 | RSU \| BRR \| IBR (RBW) |
| 140 | GR14/IR6 | ←——— CF WORK LOCATION (CFWL4) ———→ |
| 141 | GR15/IR7 | ←——— CF WORK LOCATION (CFWL5) ———→ |
| 148 | SR0 | ←——— RSU ———→ |
| 152 | SR0 | ←——— RSU ———→ |
| 156 | SR1 | ←——— RSU ———→ |
| 160 | SR1 | ←——— RSU ———→ |
| 164 | SR2 | ←——— RSU ———→ |
| 168 | SR2 | ←——— RSU ———→ |
| 172 | SR3 | ←——— RSU ———→ |
| 176 | SR3 | ←——— RSU ———→ |

TG = TAG, RG = RING, MBZ = MUST BE ZERO, RSU = RESERVED FOR SOFTWARE USE

*Fig. 1b.*

| ADDRESS IN HEX/DECIMAL | CONTENTS | |
|---|---|---|
| 00 | GR0 | GR0 |
| 01 | GR1 | GR1 |
| 02 | GR2 | GR2 |
| 03 | GR3 | GR3 |
| 04 | GR4 | GR4 |
| 05 | GR5 | GR5 |
| 06 | GR6 | GR6 |
| 07 | GR7 } SEE FIG. 4. | GR7 |
| 08 | GR8/IR0 | GR8 |
| 09 | GR9/IR1 | GR9 |
| 0A | GR10/IR2 | GRA |
| 0B | GR11/IR3 | GRB |
| 0C | GR12/IR4 | GRC |
| 0D | GR13/IR5 | GRD |
| 0E | GR14/IR6 | GRE |
| 0F | GR15/IR7 | GRF |
| 10 ↓ 17 | SR0-UPPER ↓ SR3-LOWER | S0U ↓ S3L |
| 18 ↓ 29 | CURRENT JP PCB ADDRESS ↓ INTERNAL PROCESSOR QUEUE WORD | CJA ↓ IQW |
| 2A ↓ 2F | RESERVED | |
| 30 | RWC TABLE ENTRY | W30 |
| 31 | SECTOR TABLE ENTRY | W31 |
| 32 | PCU TABLE ENTRY | W32 |
| 33 | 1ST C3 CHARACTER | W33 |
| 34 | C4 THROUGH C7 CHARACTERS | W34 |
| 35 | MASS STORAGE ADDRESS FETCHED FROM EXTENSION TABLE | W35 |
| 36 | MASS STORAGE DEVICE CODE | W36 |
| 37 | DATA FROM DEVICE TABLE | W37 |
| ↓ 3F | ↓ TOTAL OF 16 WORKING LOCATIONS | ↓ W3F |
| 40 ↓ 4F | 16 STW'S (1 DUMMY) | SW0 ↓ SWF |
| 50 ↓ 7F | 48 UNASSIGNED LOCATIONS | |
| 80 ↓ BF | 64 IMAGE AREA LOCATIONS | I80 ↓ IBF |
| C0 ↓ FF | 64 WORKING LOCATIONS | WC0 ↓ WFF |

Fig. 3.

| | 0 | | | | LSM | | | 63 |
|---|---|---|---|---|---|---|---|---|
| GR0 | BCT① TRAP | M B Z ① | C1 VARIANT (RWC) | INA ① | | INB ① | | INC ① |
| 1 | | MBZ ① | | ADDRESS (BC) ① | | | | |
| 2 | R H U | PCU IDENTIFICATION CODE | | ADDRESS (AC) ① | | | | |
| 3 | | | | ADDRESS (SC) ① | | | | |
| 4 | IND ① | | INEI ① | | RSU | | MBZ ① | |
| 5 | MBZ ① | C3 VARIANT CHAR. | | C4 | C5 | C6 | | C7 |
| 6 | | | | | | | | |
| 7 | 00 | MMMDDD | | ADDRESS(PSC)(POINTS TO INST. CAUSING CALL/TRAP) | | | | |
| 8 | | MBZ ① | | ADDRESS(CSR) ① | | | | |
| 9 | | | | CFCW ① | | | | |
| 10 | | MBZ ① | | ADDRESS(EIR) ① | | | | |
| 11 | | MBZ ① | | ADDRESS(IIR) ① | | | | |
| 12 | | OP-CODE | | NUMBER OF C3 VARIANTS PROCESSED BY CF | | NUMBER OF NON-PROCESSED VAR. | SCN CODE | R W C B / P C U R / D E V R |
| 13 | | MBZ ① | | BASE RELOCATION REG. ① | | INDEX/BARRICADE REG. ① | | |
| 14 | | MBZ ① | | INDEX VALUE OF PCU TABLE ENTRY | | | | |
| 15 | | MBZ ① | | INDEX VALUE OF DEVICE TABLE ENTRY | | | | |

① VALUE SET BY ESP INITIALLY
(MBZ = MUST BE ZERO)

*Fig. 4.*

CONTROL STORE WORD FORMAT

| 0 | 5 6 | 9 10 | 15 16 | 21 22 | 23 25 | 26 | 39 40 | 47 48 | 79 80 | 83 |
|---|-----|------|-------|-------|-------|----|-------|-------|-------|-----|
| A | B | C | D | L | E | K | QA-QB | F (32) | P (4) | |

*Fig. 5.*

| 0 | | | | 5 6 | | | | | 11 12 | 13 | 15 16 | | | | | | | | | | | | | | | | | | | | 31 |
|---|---|---|---|---|---|---|---|---|---|---|---|---|---|---|---|---|---|---|---|---|---|---|---|---|---|---|---|---|---|---|---|
| TIME SLOT MASK | | | | | | COUNTER CODE (OCTAL) | | | | EXT | SECTOR | | | RWC BUSY MASK | | | | | | | | | | | | | | | | | |
| 1 | 1A | 2 | 2A | 3 | 3A | | | | | | | | | 1 | 1A | 2 | 2A | 3 | 3A | 4 | 4A | 5 | 5A | 6 | 6A | 8 | 8A | 9 | 9A | | |
| 0 | 0 | 1 | 1 | 0 | 0 | 0 | 1 | 0 | 0 | 1 | 0 | 0 | 0 | 0 | 1 | 0 | 0 | 0 | 0 | 0 | 0 | 0 | 0 | 0 | 1 | 1 | 0 | 0 | 0 | 0 | 0 |

RWC CODE (72)₈

*Fig. 7a.*

| 0 | | | | 5 6 | | 12 13 | 15 16 | 31 |
|---|---|---|---|---|---|---|---|---|
| TIME SLOT STATUS | | | | | RESERVED FOR SOFTWARE USE | STATUS | DISPLACEMENT TO PCU TABLE (RELATIVE TO CONTENTS OF BR4) | |
| 1 | 1A | 2 | 2A | 3 | 3A | | | |

SECTOR NONEXISTENT

*Fig. 7b.*

| 0 | 15 16 | 31 |
|---|-------|-----|
| STATUS | DISPLACEMENT OF DEVICE TABLE | |
| 0 1 2 3 4 5 6 7 8 9 10 11 12 13 14 15 | | |

PCU TYPE: 0,1,2,3 (bits)
NA NS (IFNS=0): 4,5
CB RSU (IFNS=0): 6,7
ALTERNATE C2 CODE IF NS = 1 OTHERWISE WHEN NS=0:

| 10 | 11 | 12 | 13 | 14 | 15 |
|----|----|----|----|----|----|
| | | CI | CA | DI | DA |

RSU

0-NON EXISTENT
1-PRINTER
2-TIMER
3-CARD
4-CONSOLE
5-MASS STORAGE-MULTIPLE SPINDLE
6-MASS STORAGE
7-MAGNETIC TAPE
8-F SPECIAL CASE UNIT

NA = NON ADDRESSABLE UNIT
NS = NO STATUS-USE ALTERNATE C2, USE DISPLACEMENT FROM FIRST ENTRY (C2 OF INS
CB = PCU BUSY
CI = PCU INTERRUPT STORED
CA = PCU INTERRUPT ALLOW
DI = DEVICE INTERRUPT STORED
DA = DEVICE INTERRUPT ALLOW
RSU = RESERVED FOR SOFTWARE

*Fig. 7c.*

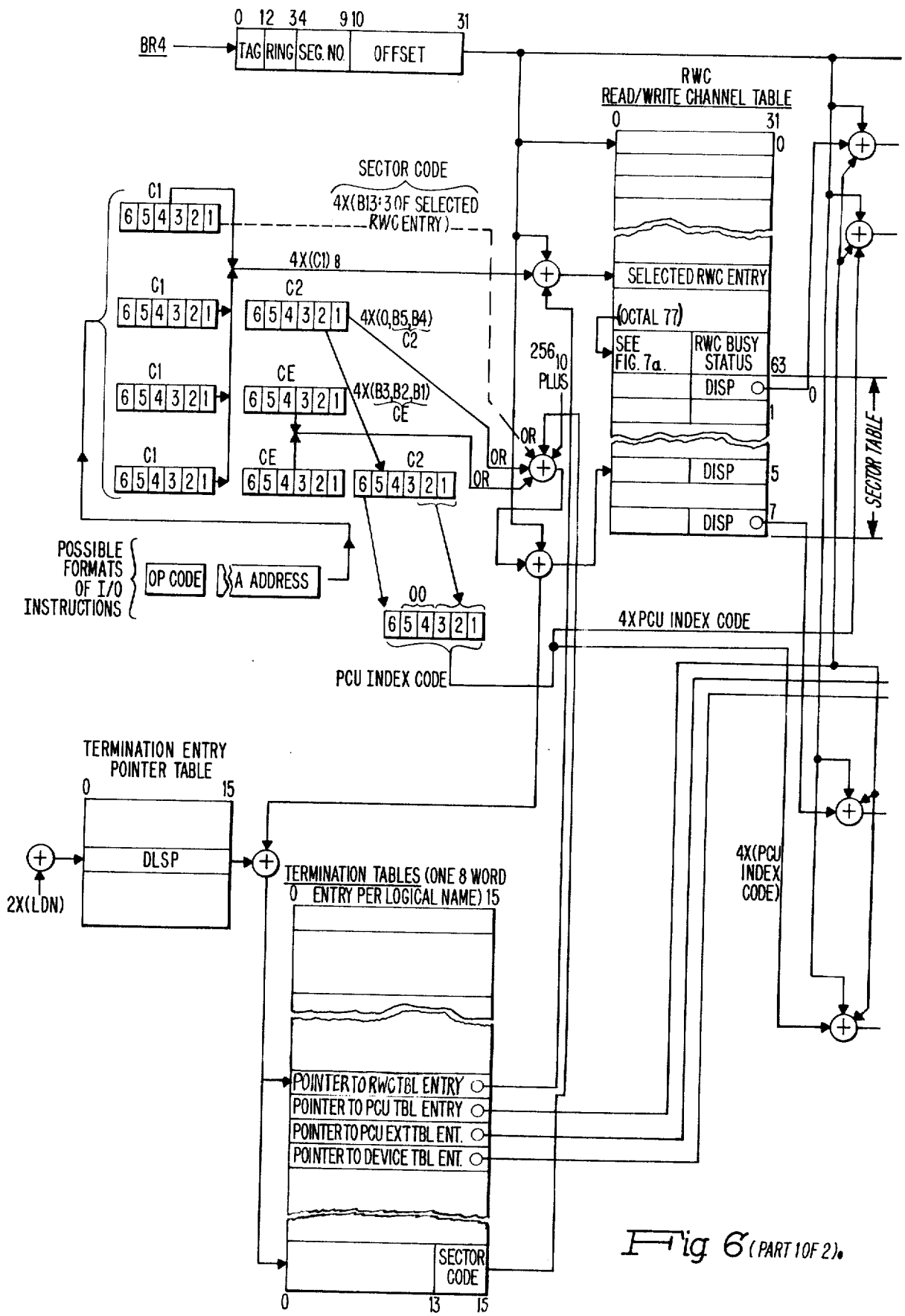
Fig 6 (PART 1 OF 2).

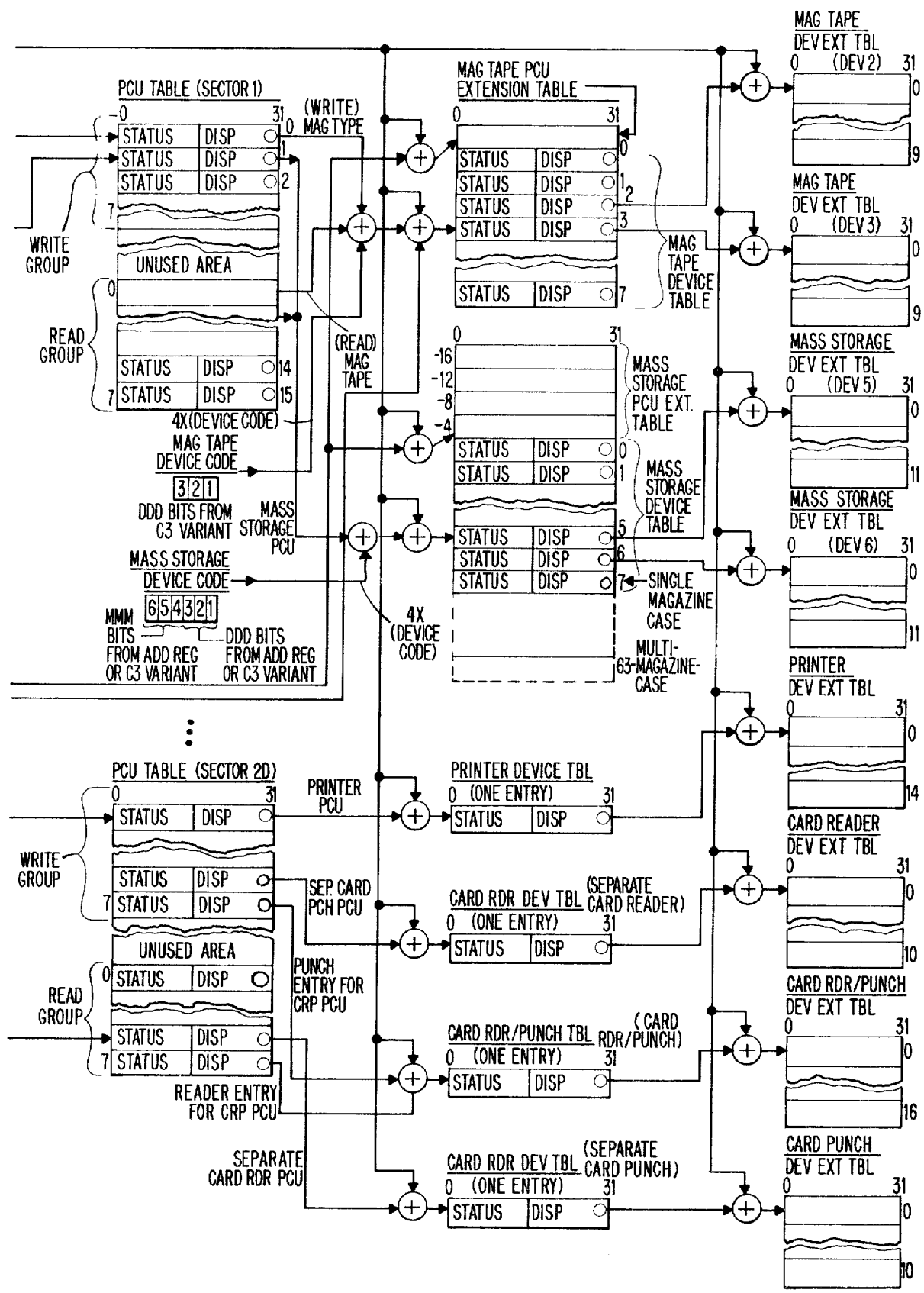
Fig. 6 (PART 2 OF 2).

|  | 0 | 15 | 16 | | | 31 |
|---|---|---|---|---|---|---|
| WORD 0 | RWC POINTER | | PCU POINTER | | | |
| WORD 1 | PCUXT POINTER | | DT POINTER | | | |
| WORD 2 | RSU | | TARGET SYSTEM LOGICAL NAME | | | |
| WORD 3 | DEVICE TYPE | | 16  SUBTYPE  23 | 24 DEVICE NUMBER 31 | | |
| WORD 4 | DEVICE NUMBER | RSU | 15 | RSU | 0 0 0 0 0 | SECTOR CODE |

*Fig. 7h.* — DEVICE READY

| 0 | 15 | 16 | 31 |
|---|---|---|---|
| STATUS | | DISPLACEMENT | |
| DB | DT1 DT2 DT3 DT4 DT5 DT6 DT | DEVICE SPECIFIC STATUS | |

*Fig. 7e.*

| -16 | RFU | | | |
|---|---|---|---|---|
| -12 | DEVICE (00DDDXX) | MAGAZINE (00MMMXXX) | CYLINDER | CYLINDER |
| -8 | TRACK | TRACK | RECORD | RECORD |
| -4 | 0 0 STATUS 1 (S1) | STATUS 2 (S2) | 16 17 18 19 20 21 22 23 | 24 25 26 27 28 29 30 31 |

2 — DEV INOP (DI)
3 — DEV ERROR (DV)
4 — PROT VIOL (PV)
5 — READ ERROR (RE)
6 — INST INCOM (IT)
7 — TRACK LINKING REC (TLR)
8,9 — ZERO
10 — FORMAT VIOL (FV)
11 — TRACK OVERFLOW (TO)

12 — B FILE PROT
13 — A FILE PROT
14 — DATA WRITE
15 — FORMAT WRITE 16-19 — ONE
20 — B FILE WRITE PERMIT
21 — A FILE WRITE PERMIT
22 — DATA PERMIT
23 — FORMAT PERMIT

RESERVED

*Fig. 7d.*

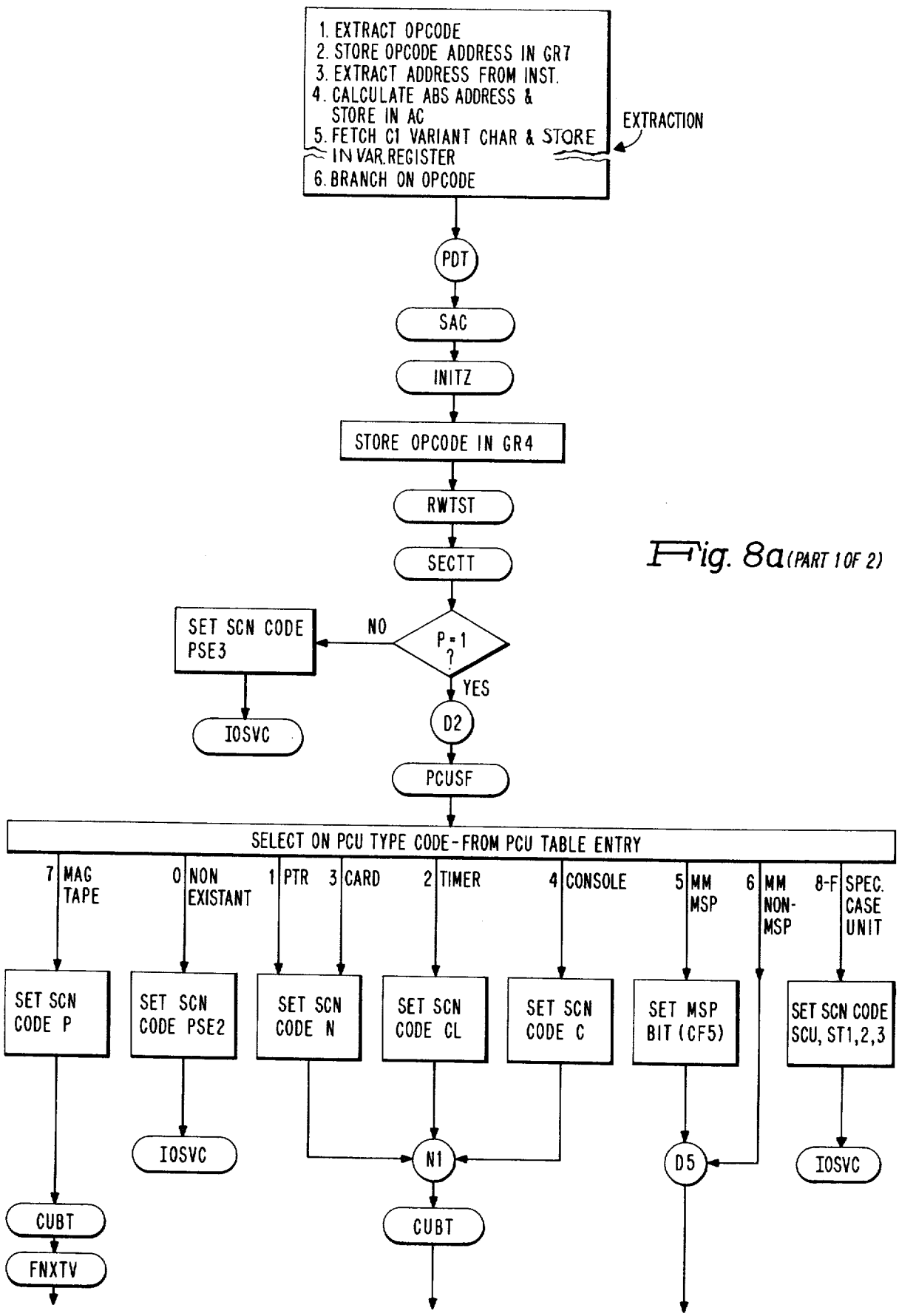
Fig. 8a (PART 1 OF 2)

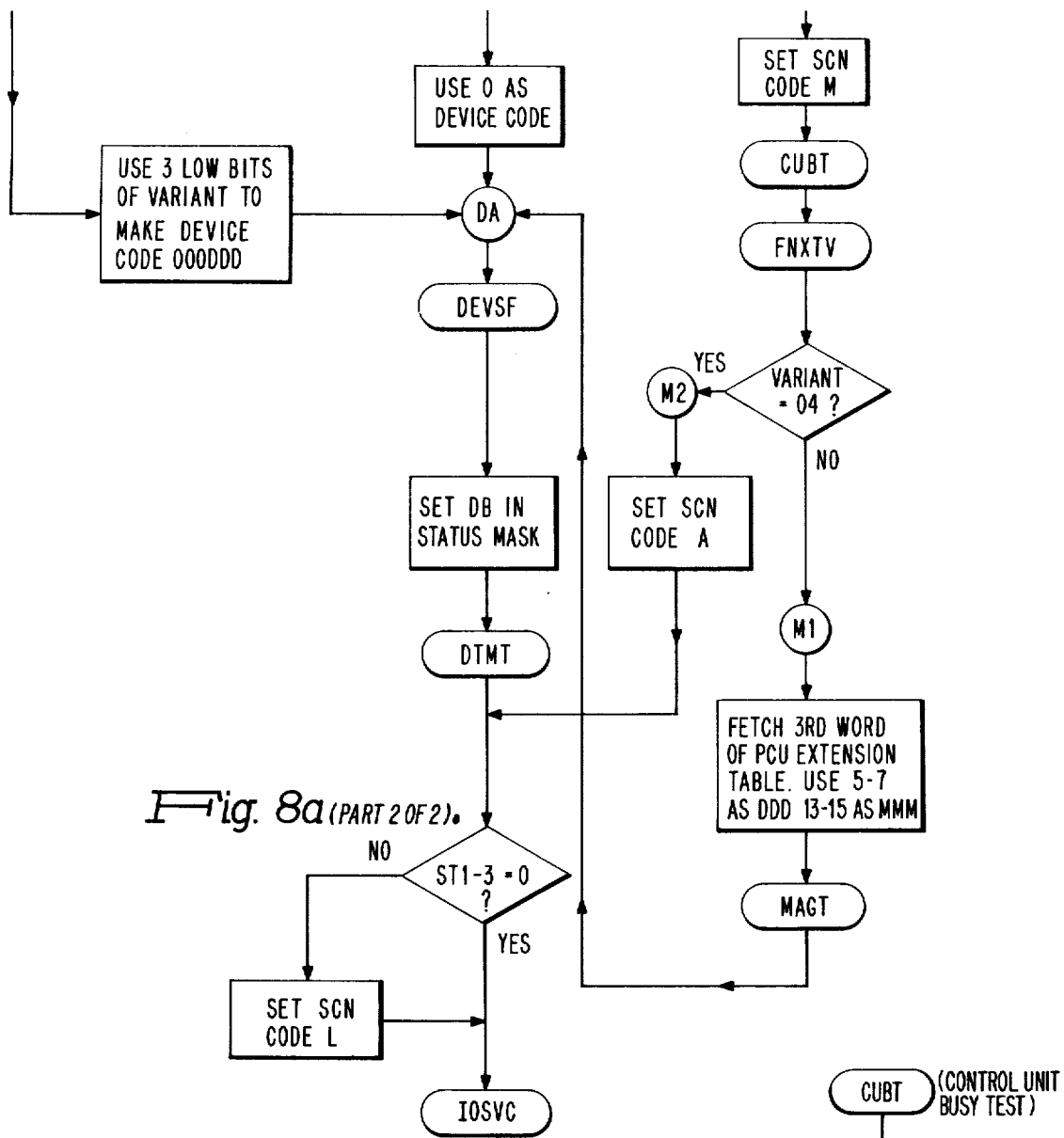
Fig. 8a (PART 2 OF 2).
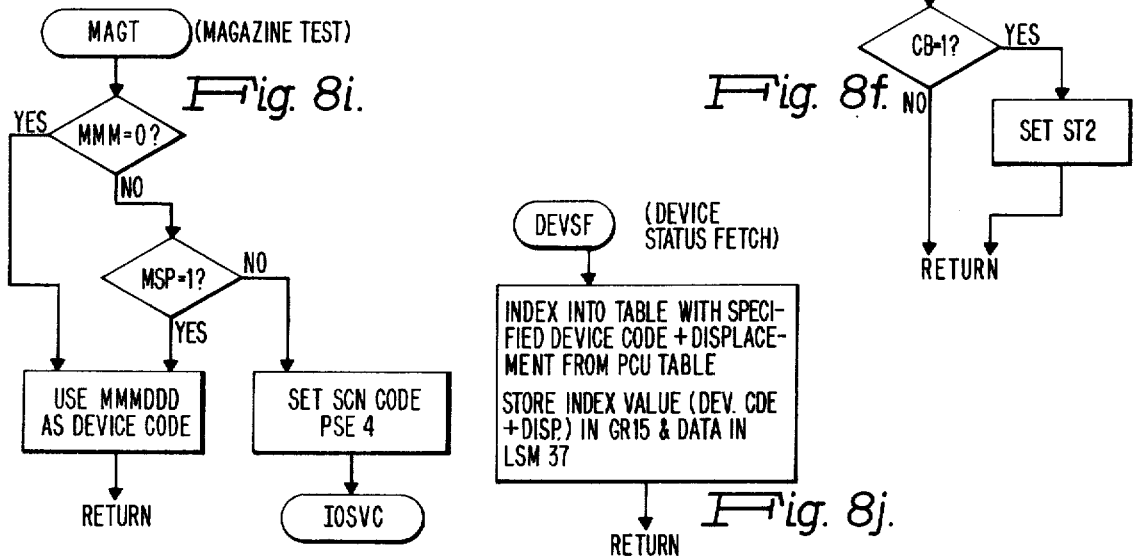
Fig. 8i.
Fig. 8f.
Fig. 8j.

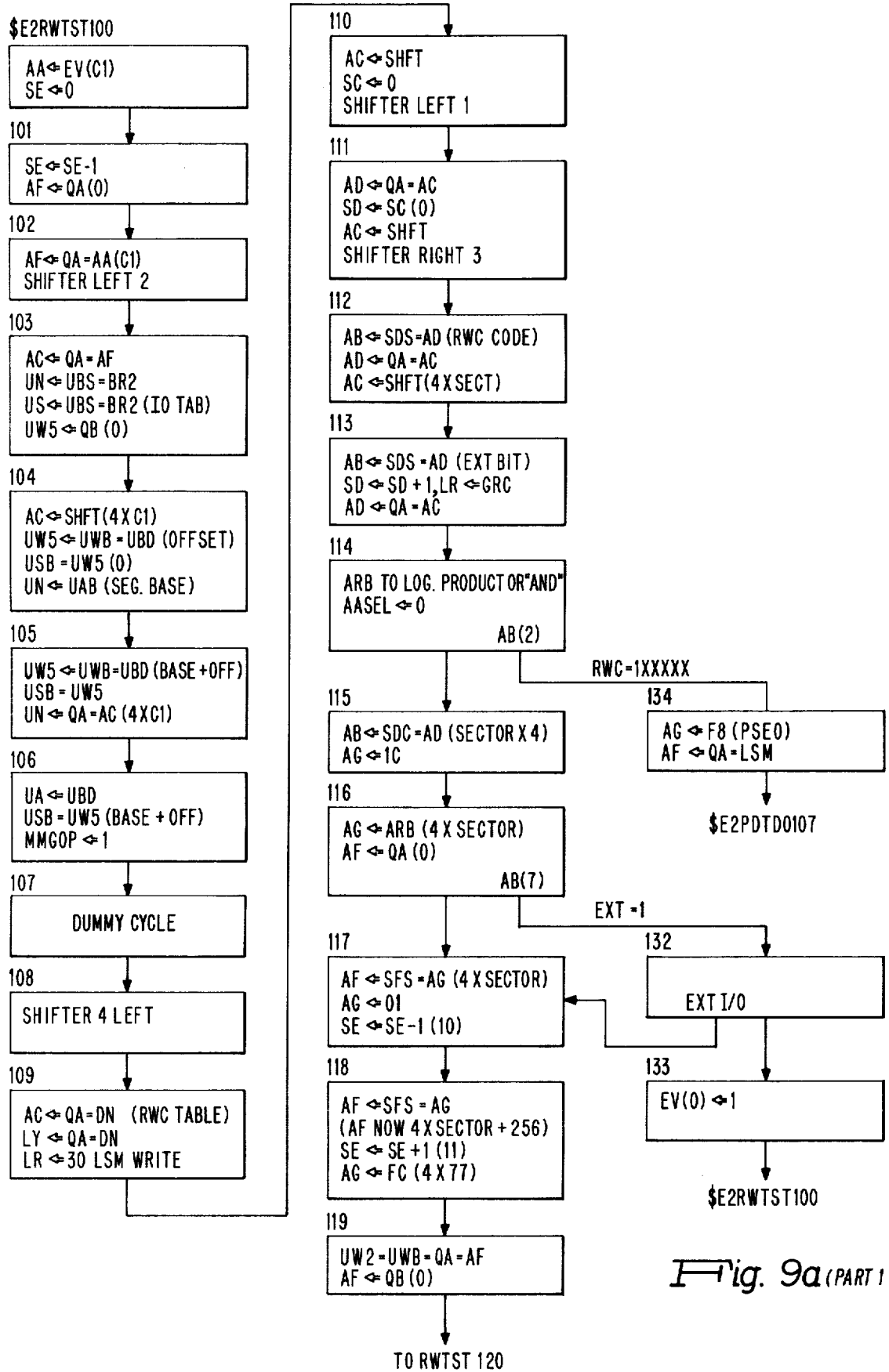
Fig. 9a (PART 1 OF 2).

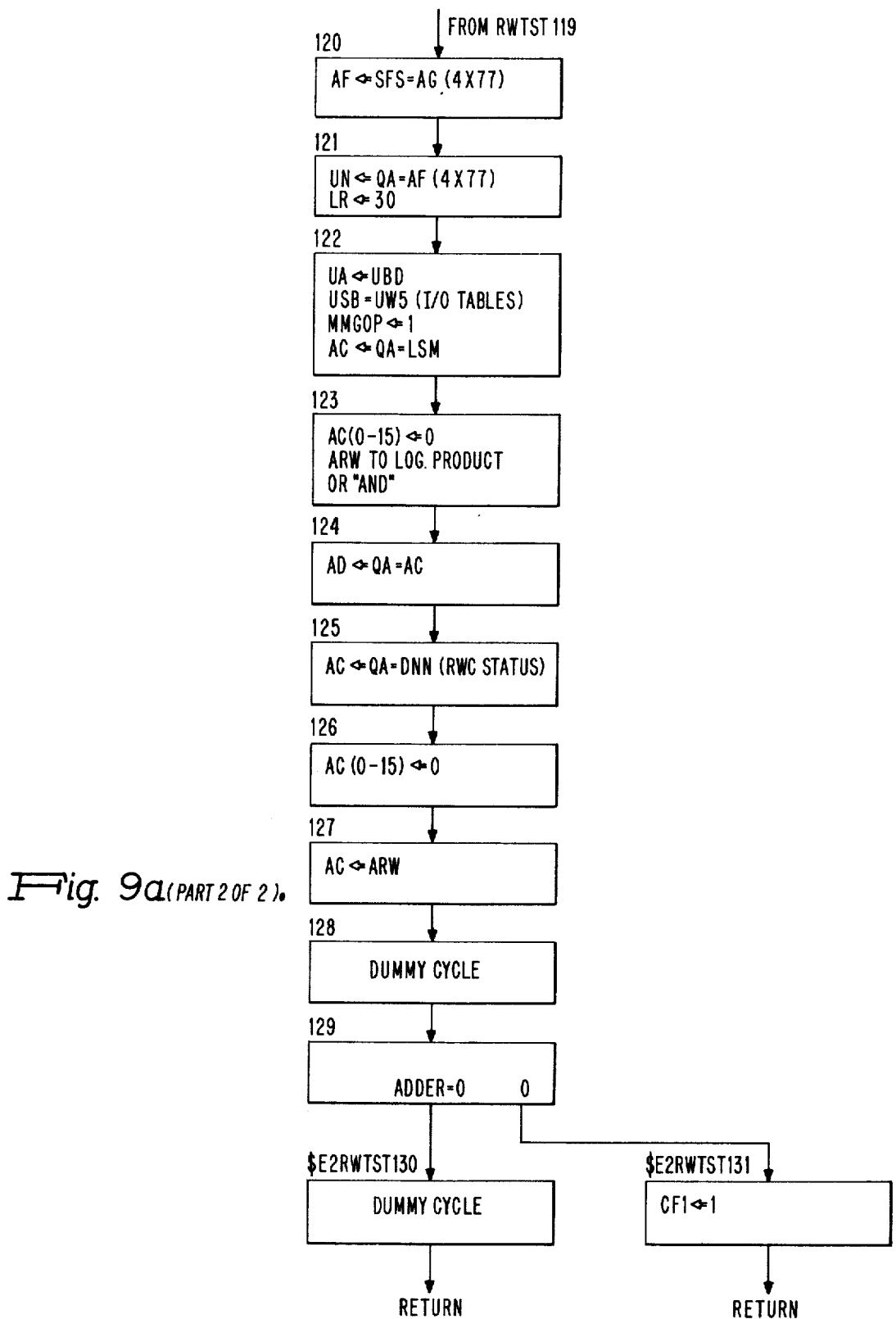
Fig. 9a (PART 2 OF 2).

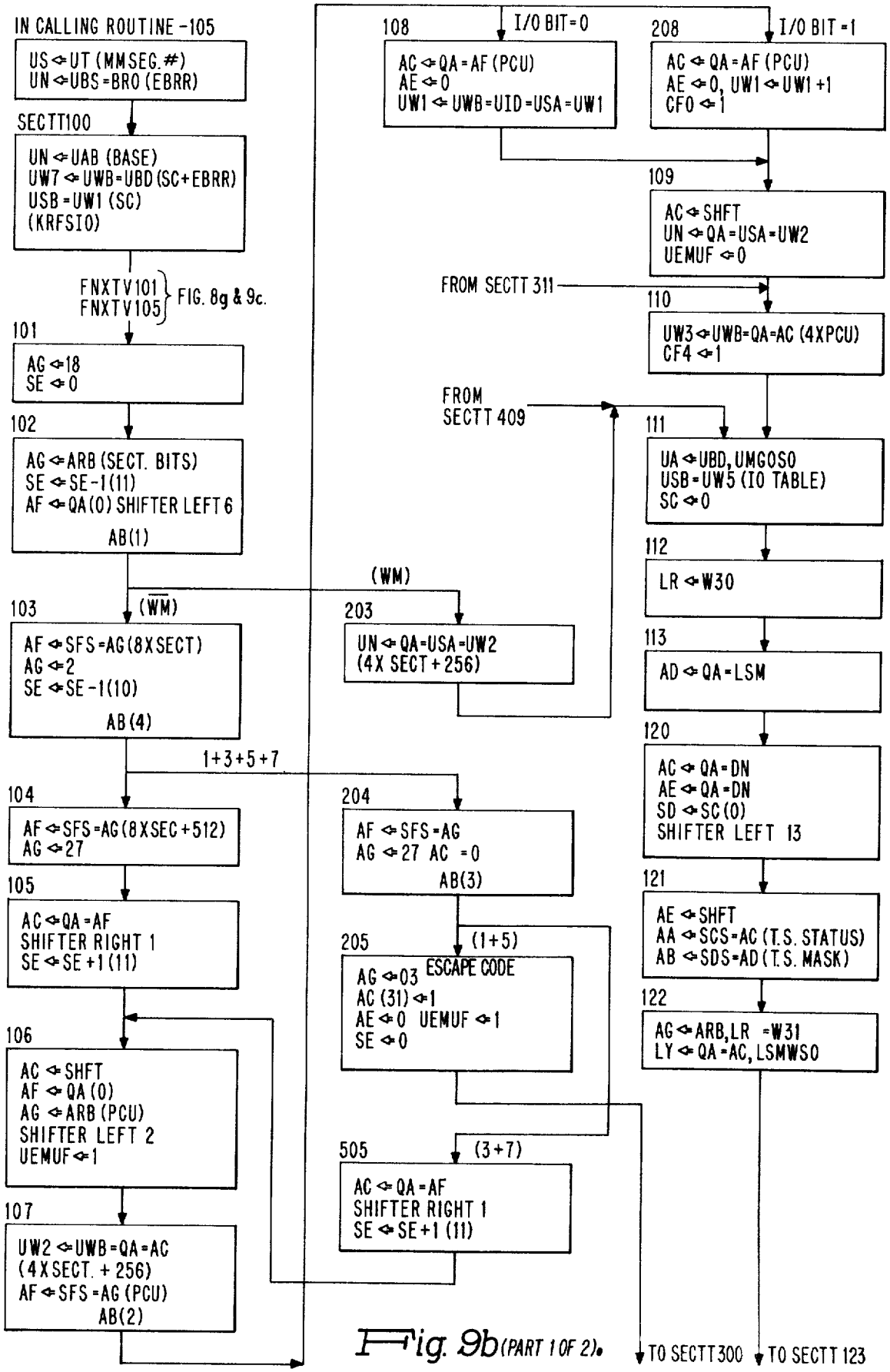
Fig. 9b (PART 1 OF 2).

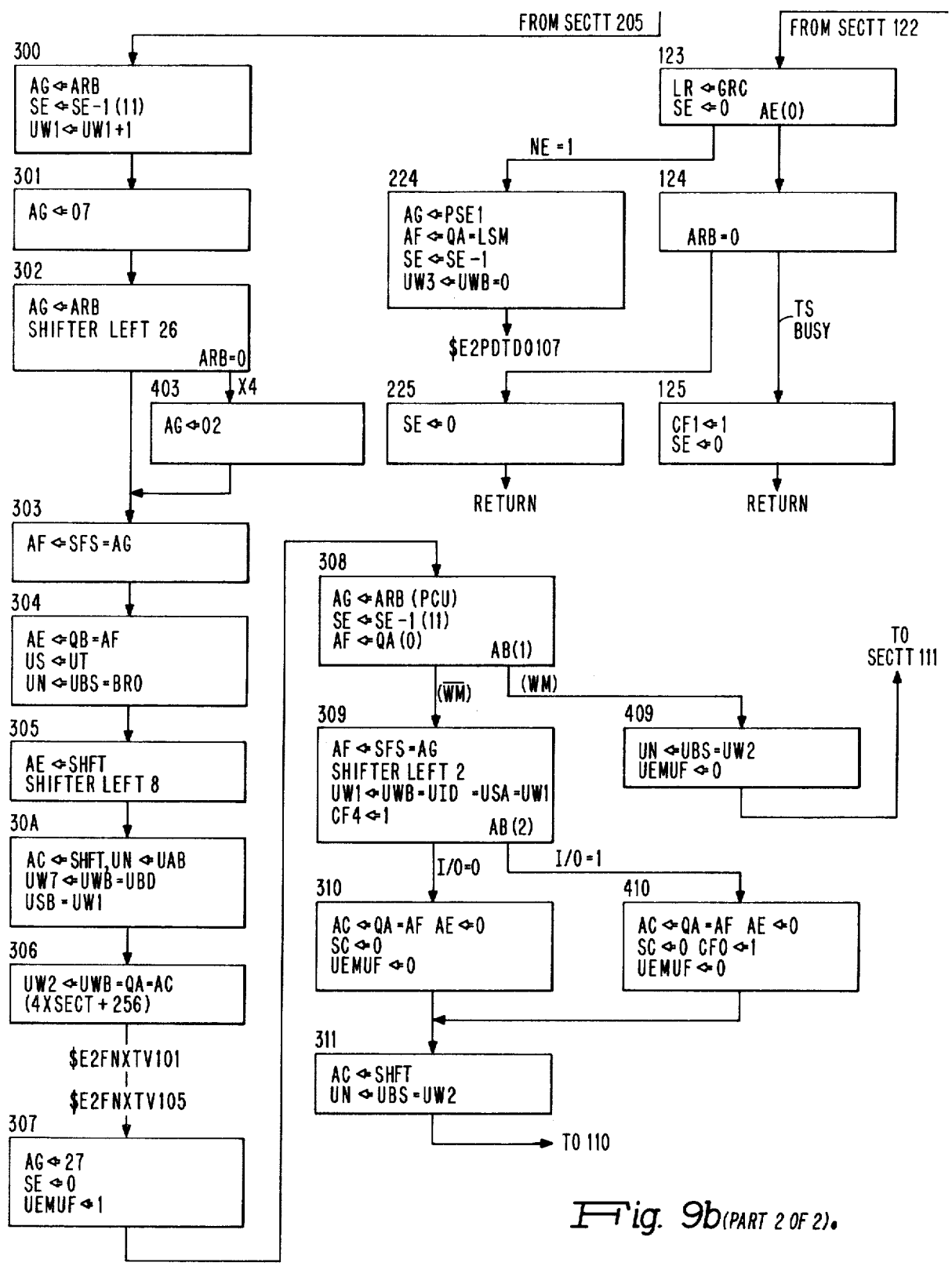
Fig. 9b (PART 2 OF 2).

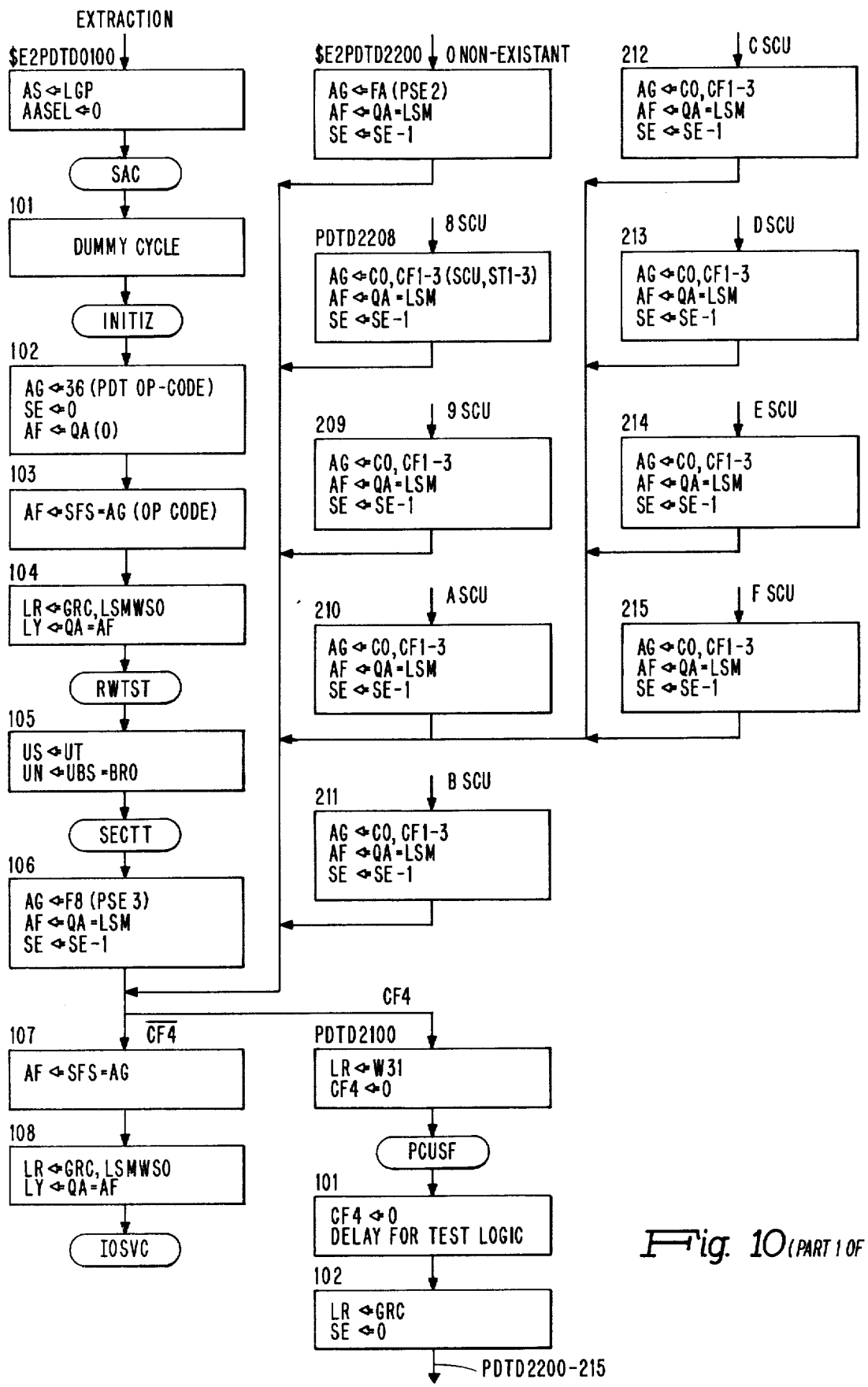
Fig. 10 (PART 1 OF 3).

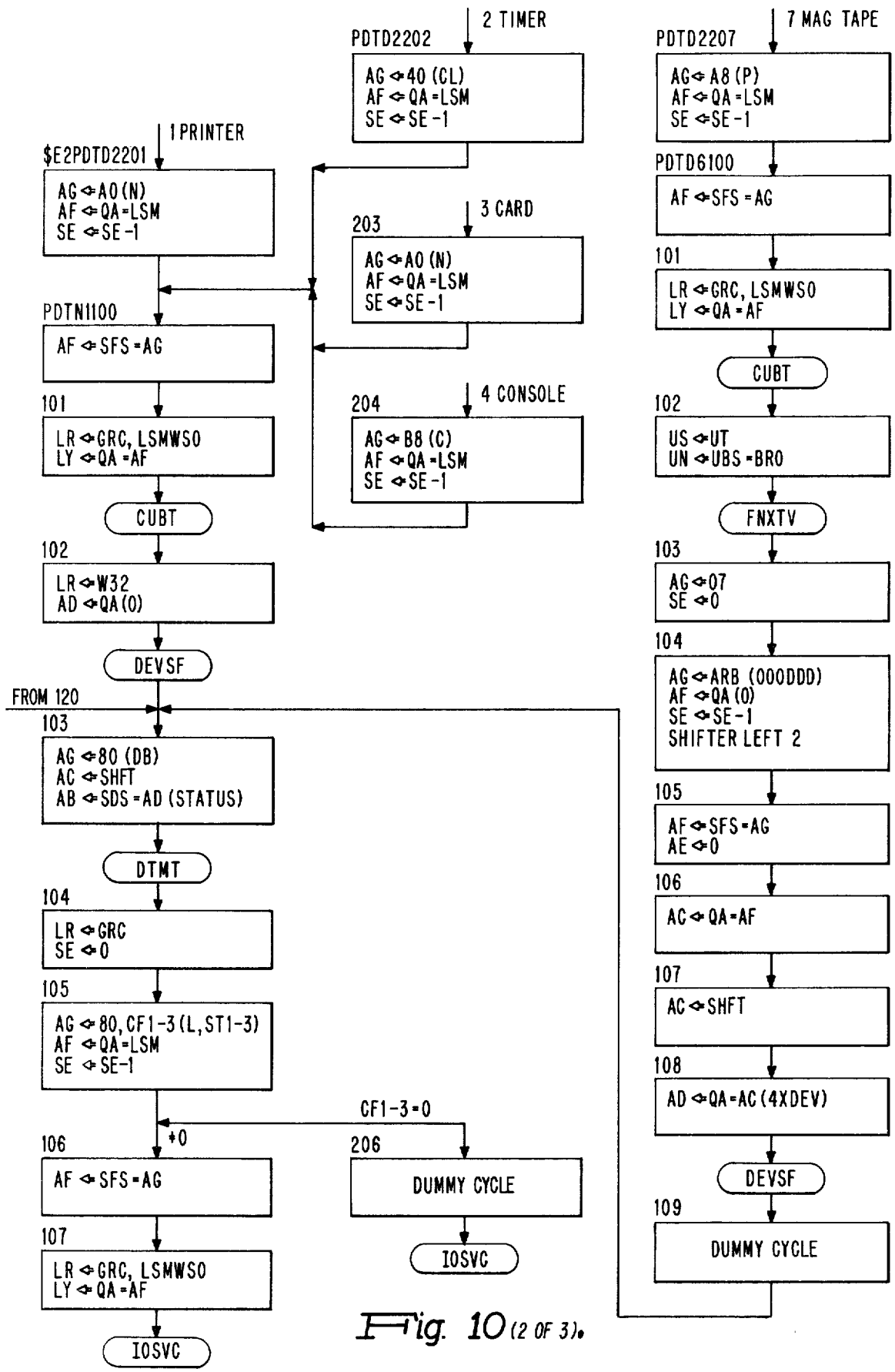
Fig. 10 (2 OF 3).

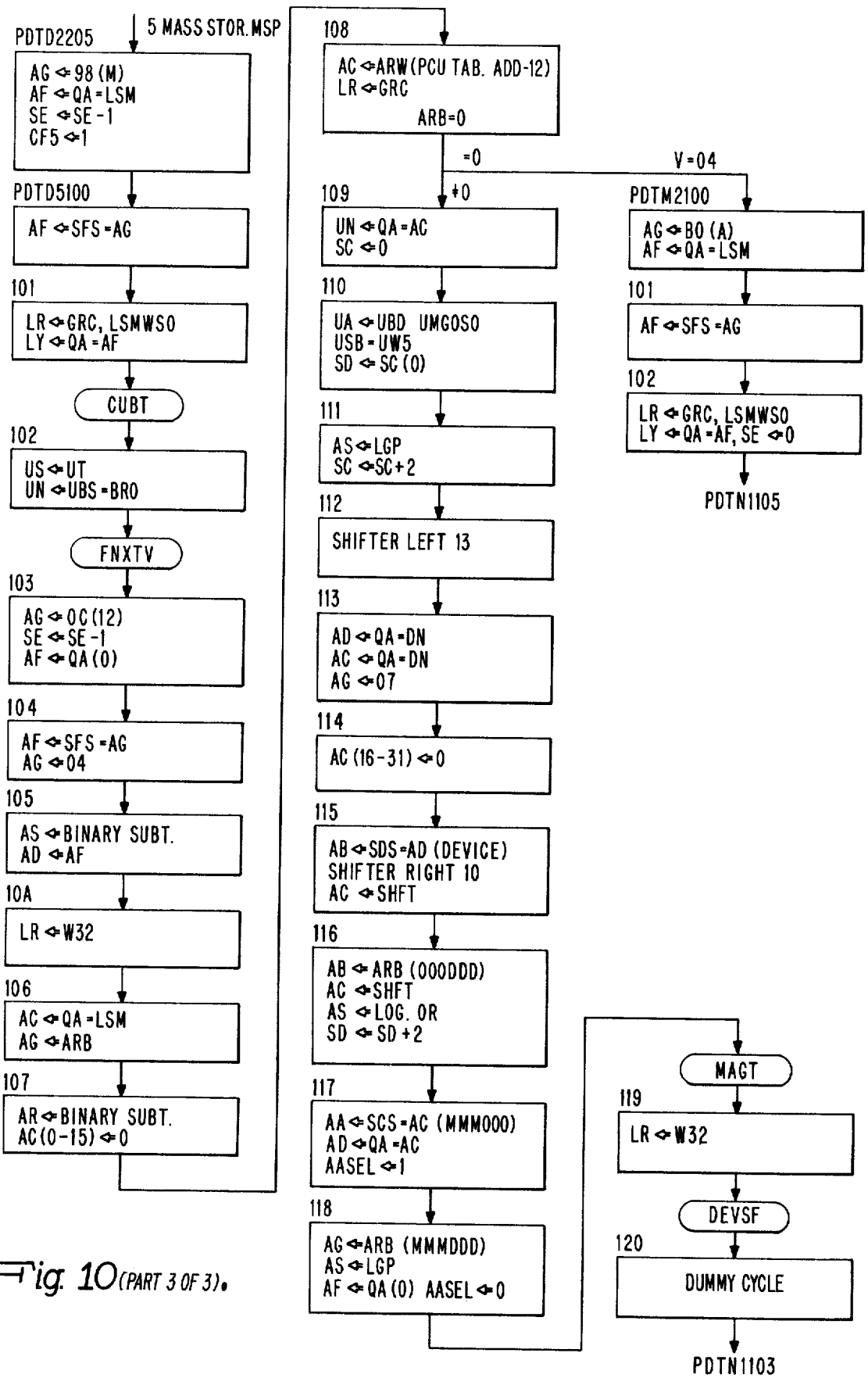
Fig. 10 (PART 3 OF 3).

TABLE DRIVEN EMULATION SYSTEM

BACKGROUND OF THE INVENTION

1. Field of Invention

The present invention relates to conversion apparatus and more particularly to apparatus for emulating a plurality of different target systems.

2. Prior Art

In general, when older data processing systems are replaced by a new system having significantly different architectural characteristics, a substantial amount of the jobs that were programmed for executing by the old systems must also be executed on the new system. Various well known techniques have been used in assisting the new system in executing jobs. One such technique is that of translating each instruction from the machine language of the old system into the instruction format of the new or host system. An example of a system which employs the foregoing is disclosed in the copending patent application titled "Method and Apparatus for peripheral device assignment and Validity Check and Relocation, if Assignment is Valid" bearing Ser. No. 228,776 invented by James B. Geyer et al which is assigned to the assignee named herein. Other techniques include simulation and emulation. These are discussed in the articles titled "Emulation of Large Systems" by S. G. Tucker, "1401 Compatibility Feature on the IBM System/360 Model 30 by M. McCormack, T. Schansman, K. Womack and "The Spectra 70/45 Emulator for the RCA301" by R. I. Benjamin, all of which appear in the December, 1965 issue of the publication titled "Communications of the ACM". Additionally, an article titled "System 370" Integrated Emulation under OS and DOS" by Gary R. Allred published in Volume 38 of the AFIPS Conference Proceedings, 1971 discusses these techniques.

One of the most important functions performed by an emulator is that of executing efficiently the input/output (I/O) instructions of a target system. In general, prior art systems have taken rather specialized approaches in emulating the I/O functionality of target systems. The result is that such systems are unable to emulate target machine operations for a number of target systems having different I/O requirements. Therefore, the prior art systems in order to accommodate requirements of different systems require a considerable amount of software and increased overhead to perform those operations necessary to emulate the I/O structure of each such system.

Accordingly, it is a primary object of the present invention to provide a system for emulating the input/output structure of a plurality of different target systems.

It is a further object of the present invention to provide an emulator system which reduces the number of operations which are performed by the support software of the system.

It is a still further object to provide a system which can with a minimum of complexity and maximum speed efficiently emulate the requirements of a variety of different input/output systems.

SUMMARY OF THE INVENTION

The above stated objects are achieved according to the microprogrammed data processing system of the present invention which includes firmware facilities or microprogramming facilities and a plurality of tables contained int the main storage of the system. The tables are organized into a number of classes corresponding to those resources required to be specified by a program to execute an input-output instruction in the target systems. The tables are accessed under the control of the microprogramming facilities in a predetermined manner.

A first table is coded on a per system basis to contain a plurality of entries, one entry for each channel resource which can be specified by a target system program. As well known, a "channel" is a data path across an interface between the main storage and a peripheral device of a system. The target systems to be emulated can utilize any number of read write channels included therein for affording "simultaneous" processing of I/O operations. Normally, whenever an I/O operation is to be performed, a code designating a programmer assigned read-write channel is required to be included within the instruction to complete the path between a designated peripheral device and main storage. For further details relating to the assignment of such channels, reference may be made to U.S. Pat. No. 3,369,221 to Walter R. Lethin and Louis G. Oliari, issued Feb. 13, 1968 which is assigned to the same assignee named herein and a publication titled Series 200 Programmer's Reference Manual (Models 200–4200) Copyright 1971 Honeywell Information Systems Inc. Order Number BA85.

In the preferred embodiment, the system includes a second table also organized on a per system basis which contains a plurality of entries coded to designate another type resource present in the target system and required to be specified by a target system input-output instruction. The table includes one entry for each sector which can be present in a target system. A "sector" in the target systems contemplated corresponds to a transfer path which connects a given number of peripheral devices in common. The aforementioned Lethin patent discloses a "single" sector system. In accordance with the present invention, the sector of a target system can accommodate a certain maximum character transfer rate (i.e. 500,000 characters per second). Each sector is allocated a fixed number of memory cycles (i.e. 6) termed "time slots" herein. In the target systems, consecutive memory cycles are offered to different read-write channels for transfer of characters between a peripheral device connected to a given sector and main storage via the assigned channel. Each of read-write channels of some target systems, such as those of the patented system are permanently associated with particular time slots. In systems of these types, increases in the transfer rate of a given channel are attained by "interlocking" several channels so that all of the cycles offered to the interlocked channels can be made available to a single transfer operation. Interlocking is accomplished by via the program instruction which initiates the data transfer operation.

A third table is organized on a per sector basis. This table includes a plurality of entries which are coded to designate each peripheral control unit (PCU) address (i.e. up to 16) which can be specified by a target program for the sector. In the target system, a PCU is an addressable device that interconnects a peripheral device to the central processor via a sector.

The number of devices which can be specified by the instruction of a target program for a given PCU is contained in a fourth table. This table is organized on a PCU basis and includes entries coded to specify all possible device address codes which can be specified by the target program to a given PCU.

In accordance with the present invention, the system under control of the microprogram control store is operative during the processing of each I/O instruction automatically accesses as required the contents of the four tables in a predetermined order to verify and validate the different portions of target program I/O instructions against the information contents which define the characteristics of the particular target system being emulated. Each table contains information which enables the system to access in sequence the correct table for each successive operation.

The first instance of an indication that the I/O instruction cannot or should not be executed, the system under microprogram control traps or signals emulation software included in the system and delivers status information to such software. More importantly, upon sensing that the I/O instruction can be executed, the system delivers one of a number of codes to the software indicating which one of a limited number of software routines are to be referenced to execute the instruction using the I/O facilities of the host system. In this way, the system reduces the number of software routines required to accommodate a variety of different target machines.

Additionally, the emulation apparatus of the present invention using the information contained in the tables is able to execute completely certain types of input-output control instructions as for example those which test for the availability of certain resources (e.g. RWC or peripheral control unit etc.) related to the completion of a previous data transfer operation and the status of an interrupt function during such operations. In those types of control instructions where the continued execution of the instruction results in loss of system processing time, the emulator signals the system in the same manner as in the case of data transfer instructions.

In accordance with the present invention, the entries inserted in the different classes of tables can be coded in a predetermined manner to enable a relaxing of certain "interlocks" or constraints imposed by the target systems programs where the logic of the particular program will not be affected. That is, the target system program does not require the interlocks to make the program run correctly. In this manner, the emulator can more efficiently execute those target systems programs which do not rely on certain restrictions present in the target systems. Thus, the emulator enforces only those interlocks required to make the target system program run correctly. This in turn can reduce system overhead.

The above and other objects of the present invention are achieved in the illustrative embodiment described hereinafter. The novel features which are believed to be characteristic of the invention, both as to its organization and method of operation, together with further objects and advantages thereof will be better understood from the following description considered in connection with the accompanying drawings. It is to be expressly understood, however, that each of the drawings are for the purpose of illustration and description only and are not intended as a definition of the limits of the invention.

BRIEF DESCRIPTION OF THE DRAWINGS

FIG. 1b shows the layout of the process control block included within the main store of FIG. 1.

FIG. 3 shows the layout of the local store memory of FIGS. 1 and 1c.

FIG. 4 shows the format of a call as coded in the local store memory.

FIG. 5 shows the formats of microinstructions used by the control store unit of FIGS. 1 and 2a.

FIG. 6 shows the layout of the I/O tables of a main store segment in accordance with the present invention.

FIG. 7a shows the format of a read-write channel table entry in accordance with the present invention.

FIG. 7b shows the format of a sector table entry in accordance with the present invention.

FIG. 7c shows the format of a peripheral control unit (PCU) table entry in accordance with the present invention.

FIG. 7d shows the format of a specific type of peripheral control unit (PCU) extension table entry in accordance with the present invention.

FIG. 7e shows the format of a device table entry in accordance with the present invention.

FIG. 7h shows the format of a termination table entry in accordance with the system of the present invention.

FIG. 8a is a flow chart illustrating the processing of an input-output instruction by the system of FIG. 1 in accordance with the present invention.

FIGS. 8b through 8j are flow charts illustrating certain operations performed by corresponding ones of the blocks included in the flow chart of FIG. 8a.

FIG. 9a is a flow chart which illustrates in greater detail the read write channel test of FIG. 8a.

FIG. 9b is a flow chart which illustrates in greater detail the sector test of FIG. 8a.

FIG. 9c is a flow chart which illustrates in greater detail the fetch next variant character routine of FIG. 8a.

FIG. 9d is a flow chart which illustrates in greater detail the peripheral control unit status fetch routine of FIG. 8a.

FIG. 9e is a flow chart which illustrates in greater detail the control unit bust test routine of FIG. 8a.

FIG. 9f is a flow chart which illustrates in greater detail the device status fetch routine of FIG. 8a.

FIG. 9g is a flow chart which illustrates in greater detail the device trap and status test routine of FIG. 8a.

FIG. 9h is a flow chart illustrating in greater detail the magazine test routine of FIG. 8a.

FIG. 10 is a flow chart illustrating in greater detail the portions of the main flow of FIG. 8a.

GENERAL DESCRIPTION OF THE SYSTEM

Figure 1:
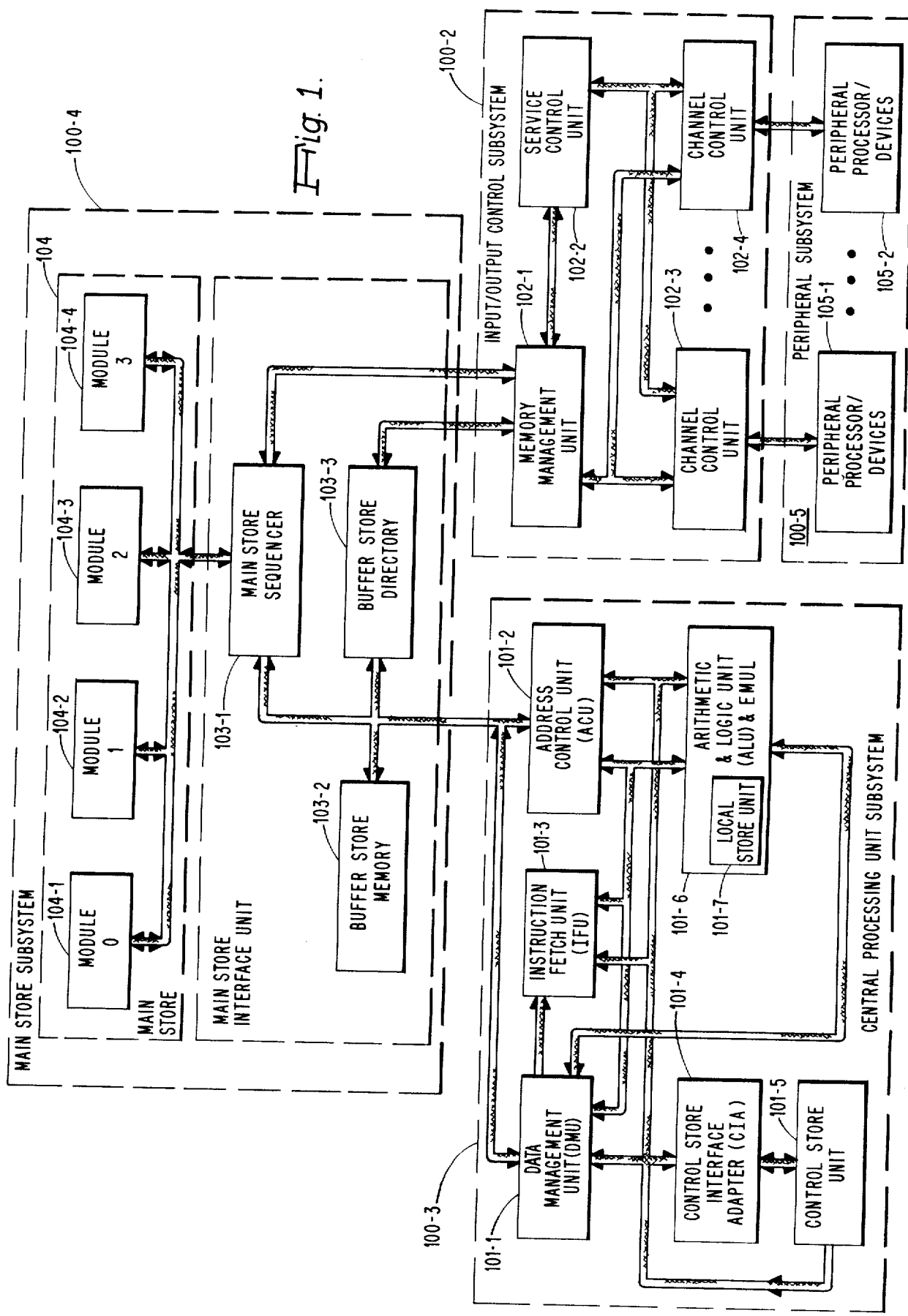
FIG. 1 is a block diagram of a system which incorporates the present invention.

Referring to FIG. 1, it is seen that the system of the present invention includes a plurality of subsystems 100-1 through 100-4. The subsystems, as shown correspond to a central processing unit subsystem 100-1, an input/output controller subsystem 100-2, a peripheral subsystem 100-3, a main memory subsystem 100-4 and a memory interface unit subsystem 100-5. The central processing unit subsystem 100-1 includes a data management unit (DMU) 100-1, an instruction fetch unit (IFU) 101-3, an arithmetic and logic unit (ALU) 101-6, a control store interface adapter (CIA) 101-4, and a control store unit (CSU) 101-5, all of which are arranged as shown in FIG. 1. The CPU subsystem performs the computational operations for the system and these operations proceed under the control of microinstructions stored in control store 105. In a preferred embodiment, these instructions are loaded into the control store 101-5 by a control store loader, conventional in design, external to the central processing unit subsystem 100.

The CIA, 101-4 includes the logic circuits necessary for directing the sequencing of control store 101-5 required for processing operations. For example, the CIA 101-4 provides the required address modification, address generation, testing, branching facilities based on signals representative of both internal and external conditions.

The various operations, computational in nature, are performed by ALU 101-6 which includes both word and byte data processing facilities. Additionally, the ALU has associated therewith the local store unit (LSU) 101-7 which includes a small scratch pad memory and associated logic circuits, conventional in design, which are operative to store control information as well as operands and partial results produced during various computational and data manipulation operations.

The address control unit (ACU) 101-2 which couples to ALU 101-6 includes apparatus for generating addresses for referencing information stored within the memory subsystem. Additionally, the ACU 101-2 couples to the IFU 101-3 which includes circuits for fetching instructions in advance so as to maintain instructions available before completion of an instruction being currently executed.

The DMU, 101-1, provides an interface between the CPU subsystem and/or a buffer store memory 300-2, as shown. The DMU includes circuits which specify which portion of the memory of the main memory subsystem contains information to be retrieved during subsequent memory cycles and is operative to transfer the information into the CPU subsystem at the appropriate time.

The main memory interface unit subsystem 100-3 includes a buffer store memory 103-2, a buffer store directory, 103-3, and a main store sequencer, 103-1.

The buffer store memory 103-2 provides temporary storage for information to be used next by the CPU subsystem as well as temporary storage for information that is to be utilized frequently during processing operations. The buffer store directory, 103-3, includes circuits for generating an address when the information called for by an operation is stored in the buffer store memory 103-2. The main store sequencer 103-1 provides an interface between the different modules of the main memory subsystem 100-4 and the various subsystems shown (i.e. the IOC 100-2 and CPU 100-1).

The main memory subsystem 100-4 which couples to the main store sequencer of the memory interface unit subsystem which in a preferred embodiment includes four memory modules 104-1 through 104-4. These modules are operated under the control of the main storage sequencer in a number of different modes including an interleave mode of operation. These modules provide storage for information required by the processing components of the system during the execution of current tasks. For further details relating to the main storage sequencer, reference may be made to the co-pending patent application titled "Memory Storage Sequencer" invented by John L. Curley et al bearing Ser. No. 295,331 filed in the United States on Oct. 5, 1972 and assigned to the assignee named herein.

As shown in FIG. 1, the IOC 100-2 couples to the peripheral subsystem 100-5. The subsystem includes a plurality of "peripheral processors" which control the operations of a number of peripheral devices connected therewith (e.g. such as magnetic tape drives, mass storage units such as disks and unit record equipment such as printers, card readers, card punchers). For convenient reference, the term peripheral processor and other terms used herein are defined in an Appendix included herein. The IOC controls information transfers between the peripheral subsystems and the main storage subsystem. For example, it can accommodate up to 16 peripheral subsystems, each of which as mentioned above manages a complement of magnetic tape, disk, card reader or punch devices, printers, etc. The IOC has an interface with the main storage system to trasfer information between main storage and peripheral subsystems and to fetch groups of related instructions called channel programs, from main storage and execute same without interrupting the operation of the central processing unit subsystem.

Additionally, the IOC has an interface with the central processing unit subsystem to deliver peripheral subsystems status information to the CPU for evaluation and/or action and to respond to CPU requests to begin execution of channel programs and to inform the CPU when channel program execution has been completed. Basically, in the preferred embodiment of the present invention, input/output operations are carried out under the control of a channel program which includes a complete set of instructions and addressing information for carrying out a particular input/output operation. The IOC includes both hardware/firmware required for executing a channel program. Execution of a program by the IOC is carried out through a plurality of channels. A channel is an access path from the CPU to the peripheral device for the purpose of executing an I/O operation. The channel includes the IOC facilities, a physical channel between the IOC and peripheral subsystem and a logical channel which includes the facilities in the peripheral subsystem required to execute a given I/O operation. In the preferred embodiment, a peripheral processor may handle up to 255 logical channels.

As seen from FIG. 1, the IOC subsystem includes a memory management unit 102-1, a service code unit 102-2 and a plurality of channel control units. Since the IOC can accommodate up to 16 peripheral subsystems, it includes a corresponding number of channel control units. As mentioned above, I/O operations are specified by channel programs. The channel programs are initiated by the peripheral processor over logical channels associated with the peripheral devices. The IOC maintains all information concerning the state of each logical channel and of the channel programs associated therewith. The channel programs are executed simultaneously with central processing operations thereby providing multiprocessing and multiprogramming facilities.

For the purposes of the present invention, the arrangement for executing input/output operations can be considered conventional in design. For additional information as to how channels are used to carry out input/output operations, reference may be made to the text titled "Computer Organization and the System/370" by Harry Katzan, Jr. published 1971 by Van Nostrand Rinehold Company.

Before describing the various components of FIG. 1, the organization of main store 104 will first be discussed with reference to FIG. 1a.

Figure 1A:
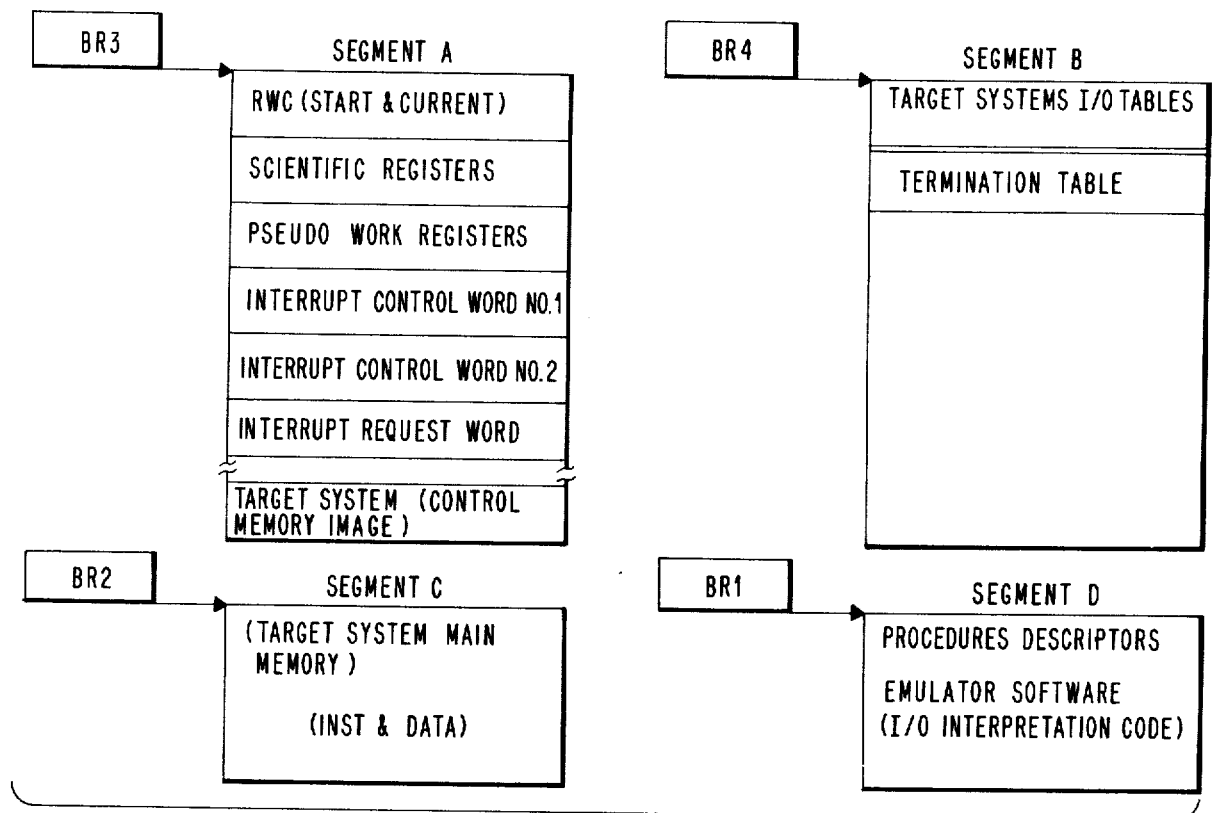
FIG. 1a illustrates diagrammatically the layout of main store in accordance with the present invention.

MAIN STORE - FIG. 1a

An area which corresponds to the low end of the main store address space is reserved for use by the system hardware and firmware. The upper boundary or limit of this area is specified by the contents of a "boundary address register" (BAR) which is accessable to the system software. Generally, the contents of the BAR are set to a predetermined value at system initialization time. The area or space below the address secified by the contents of the BAR normally contains tables used by the IOC which define the particular peripheral subsystem configuration, firmware instructions for controlling the operation of the CPU. As seen from FIG. 1a, memory is divided up into a plurality of segments which are accessable by a given process defineable by the operating systems software.

The main storage can be characterized as a segmented virtual memory in which the addresses of programs are data represented by the name of the segment in which they reside and a displacement within that segment. Protection rings are associated with the segments and protect the content of the segment from accesses. Also, the protection rings to which the segment belongs are part of the data associated with the segment. For additional information as to the implementation of virtual memory and program protection, reference may be made to the publication titled "The Multics Virtual Memory" published by Honeywell Information Systems Inc., Copyright 1972.

The main store emulator information and data structures as seen from FIG. 1a include a plurality of segments (A through D).

Segment A is coded to store an image of the target system control memory. As such, it contains the processing registers (e.g. read-write counters — starting and current, scientific registers, working registers, etc.). Segment A is identified to the system by the contents of base address register 3 (BR3). Segment B includes the input/output tables organized in accordance with the present invention. This segment is accessed by the contents of base address register 4 (BR4).

The target system main memory is allocated to segment C and the segment is identified to the emulation system by the contents of base address register 2 (BR2). The segment size is arranged to be equal to the memory size of the target system being emulated. Given an absolute address M or a character, that character would be located by indexing the contents of BR2 by M. In the preferred embodiment, the format of the information contained in main memory corresponds to the format of the information utilized by the target system. That is, both systems utilize a "character" which contains 8 bits, 6 data bits and 2 punctuation bits (i.e. a word mark bit - bit 1 and an item mark bit - bit 0). The only difference between the way information is represented in the host system is in the numbering of the bits from left to right as O through 7 instead of from right to left as 1 through 8.

Segment D includes the tables and routines for handling those functions not being carried out by the hardware or firmware of the system. For example, the software portion, emulation support package, (ESP), is operative to translate and execute input/output orders of the target systems. Also, it can simulate various hardware portions of the target systems architectures as well as certain operations heretofore performed by the target systems.

Of course, it will be appreciated that actual execution of the input/output operations proceed through the I/O structure of the host system. The tables included in segment D for example contain peripheral addresses used by the target systems and which correspond to the I/O system for a particular configuration under emulation. Other tables are used to record the status of a particular transfer, its control unit/device address as well as the status for all read/write channels of the target system.

Although not shown in FIG. 1a, there is a segment or portion of a segment in the main store which contains the process control block (PCB). The PCB contains the relevant information required to running or operating a given process. The type of information contained within a PCB is illustrated in FIG. 1b. As seen from the Figure, this information is all that is required to enable the system of FIG. 1 to emulate a particular target machine. The contents of the PCB will be described herein in connection with the present invention.

DETAILED DESCRIPTION OF THE CPU SUBSYSTEM

Now, the various portions of the CPU subsystem of FIG. 1 which are utilized for emulation will be described in greater detail.

Figure 2D:
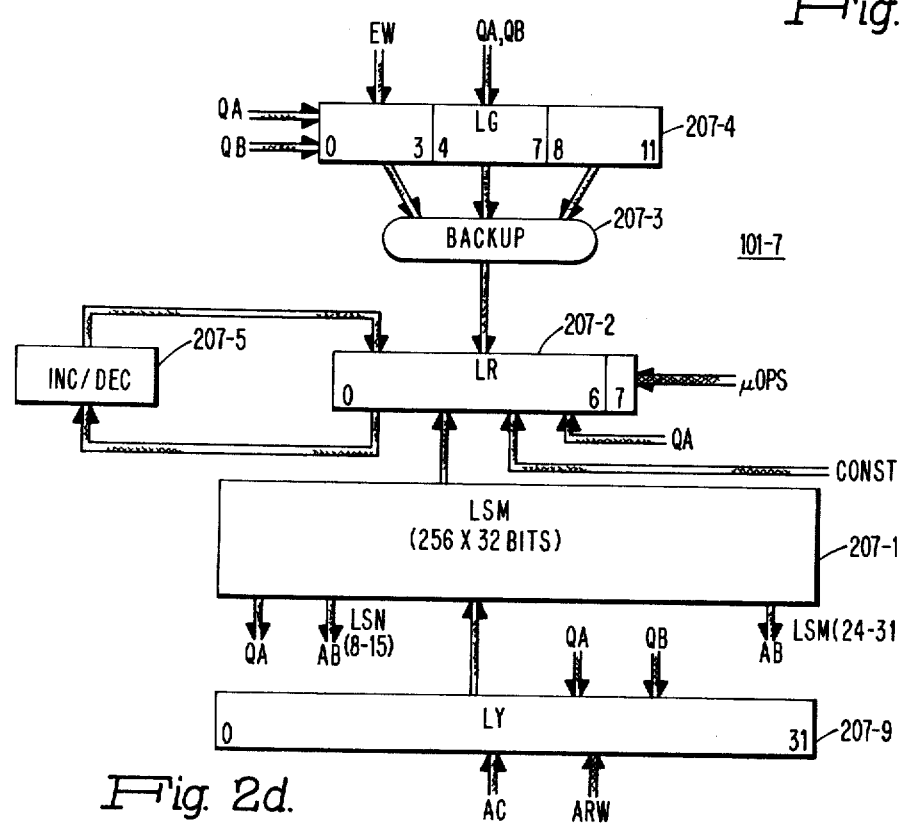
FIGS. 2b–2d show in greater detail the different portions of the ALU of FIGS. 1 and 1c.
Figure 2A:
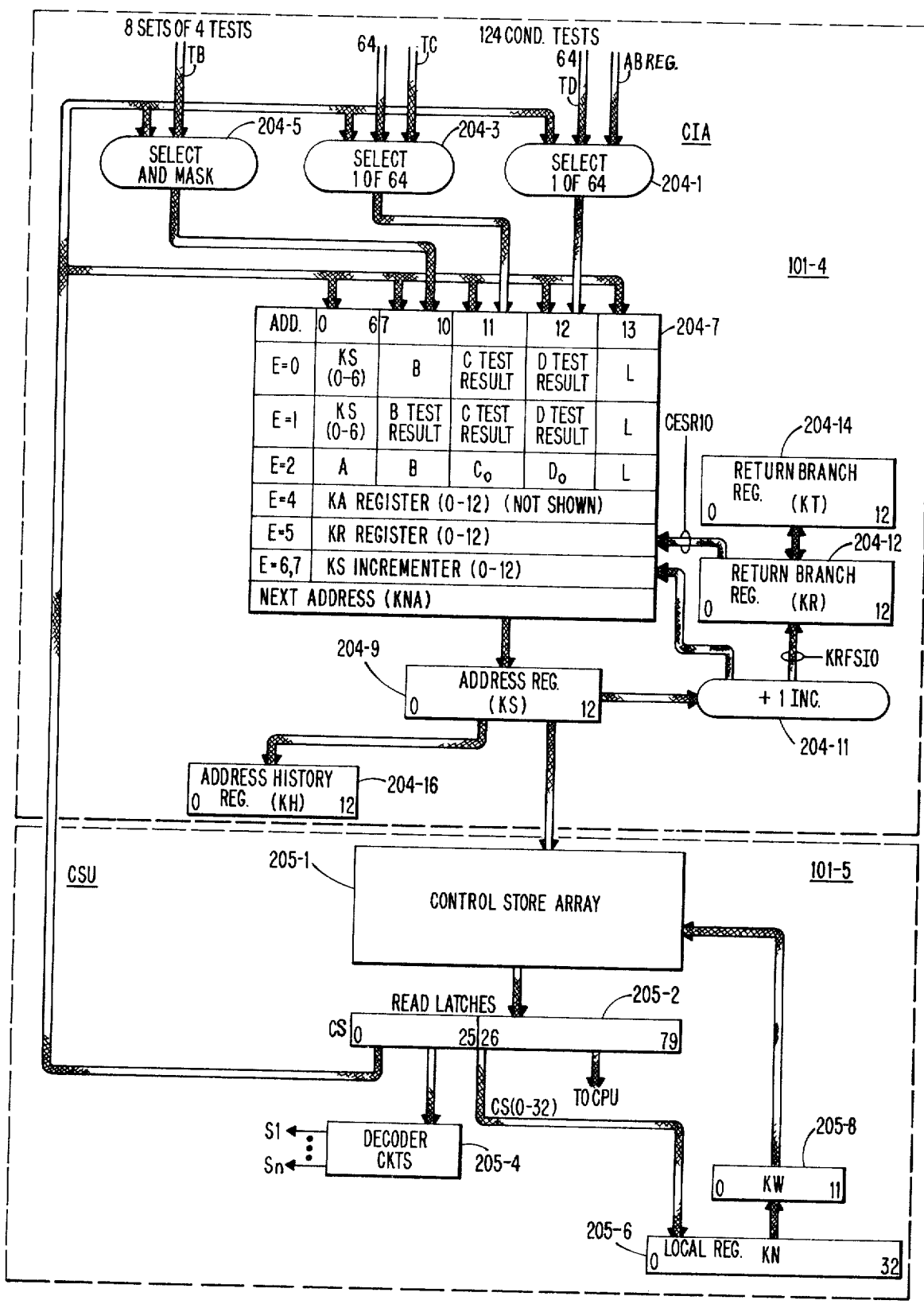
FIG. 2a shows in greater detail the control store interface adapter (CIA) and control store unit (CSU) of FIGS. 1 and 1c.

CONTROL STORE INTERFACE ADAPTER (CIA) AND CONTROL STORE UNIT (CSU) FIG. 2a

The control store array 205-1 of the CSU in the preferred embodiment includes both fixed and alterable sections. The fixed section can be constructed using a programmable read only memory (PROM) and the alterable portion of the memory includes integrated circuit read/write memory. The entire memory is addressable via an address register KS and its upper portion is alterable so as to provide capabilities for controlling the system in a variety of different modes. One such mode is that utilized in emulating the operation of a number of different target systems. Another includes diagnostic capability for diagnosing which system portion or portions may have failed. In the present embodiment, the control store array has a size of 7K (K = 1024 bits) and the width of each control store word is 84 bits. The control store array is divided into the following sections: 1K for microdiagnostics; 2K for emulation; and 4K for native mode operation. It will be obvious that the control store locations which comprise a given section can be either contiguous or non-contiguous. The 1K used for microdiagnostics is dynamically alterable as well as portions used for emulation and native mode operation. The remaining locations of the control store are non alterable or fixed. It will be appreciated that the structure of the control store array can change as a function of cost, speed and flexibility in addition to other considerations. For further details regarding read only memories, reference may be made to an article titled "Universal Logic Modules Implemented Using LSI memory Techniques" by Kenneth J. Thurber and Robert O. Berg which was published in the Fall Joint COmputer COnference, 1971.

Each control store word as mentioned is 24 bits in length and is divided into a plurality of fields (6) as illustrated in FIG. 5. A first field termed an E field is a branch control field which identifies the type of branch to be taken. As seen from FIG. 2a, there are up to 8 different types of branch codes designated E0 through E7.

The select circuits 204-1 through 204-7 of the CIA use the A, B, C, D and L fields of a microinstruction word to generate branch addresses. For example, when the E field is coded as all zeros, this specifies a conditional (or unconditional if no test is specified) of a 1 to 4 way branch operation using the C and D as test fields. The branch is made to a base address equal to the value of the A and B fields. This value is modified based on the results produced by circuits 204-1 and 204-3 from testing the conditions specified by the C and D fields. Each test field is six bits in length which allows for 64 different tests per field. The results of testing the conditions specified by the C and D fields cause the circuits 204-1 and 204-3 to set to binary ONES, the control address register bits 11 and 12 respectively. The control store address bit 13 is set to equal to the state of bit L.

When the branch control field, E, is set to a code of 1, this allows up to a 64 way branch using the B, C and D fields as test functions. The B field is used as a test mask when testing the test functions (i.e. the test functions are combined with the B test field in an and operation). When the E field is coded to contain a code of 2, this specifies an interrupt return operation which is not pertinent to the present invention and need not be further described herein. When the E field is coded to contain 3, this initiates a return from a microprogram subroutine operation and is followed by a further branching operation in order to complete the return. In this operation, the address contents of a KR return register 204-12 are used as a next control address. The return register 204-12 is normally loaded with a value corresponding to the address contents of a control store address register KS plus 1 via increment circuits shown. When the E field is coded as 4, this allows an incrementer 204-11 to increment the contents of the KS register 204-9 by 1. This occurs only after a conditional or return branch operation. Also, means not shown, are provided which force the address register KS to a predetermined value in response to certain external conditions.

As seen from FIG. 5, the control store word includes an additional field, K. This field is a 14 bit field, 6 bits of which are used to specify a constant, 4 bits are used to specify another constant or steering field and the last 4 bits are used as a steering field for a constant. A QA–QB field has 8 bits, four of which specify the information to be applied to a first bus (i.e., QA bus) and next four bits for controlling the information applied to another bus (i.e., QB bus). Both buses are bidirectional and couple the various units of the CPU for transmission and reception of data and control information.

In the absence of a branch operation, the control store during a cycle of operation is addressed by the contents of the KS address register 204-9 and the contents of the addressed location are read out into a plurality of data latches 205-2. Thereafter, a portion of the output signals (i.e., bits 26–79) from these latches are distributed or transferred to storage registers (not shown) included within each of the units of the CPU subsystem. Each such unit includes decoding logic circuits (not shown) which take the form of programmable read only memories (PROM) which produce the requisite subcommand control signals for their respective unit. In this manner, each unit can combine the control signals provided by its PROM, divide these signals into groups for combination with other signals generated within that unit as required for performing various operations. The decoder circuits 205-4 decode certain fields (e.g. branch fields) and generate signals required for sequencing operations.

Also, as seen from FIG. 2a, the control store unit includes a local register KN 205-6 which couples via register KW 205-8 to the control store array 205-1. This arrangement enables the writing back into an addressed location the information read out during a memory cycle of operation. Because of the register size, the information read out is written back into the control store array 12 bits at a time.

Figure 2B:
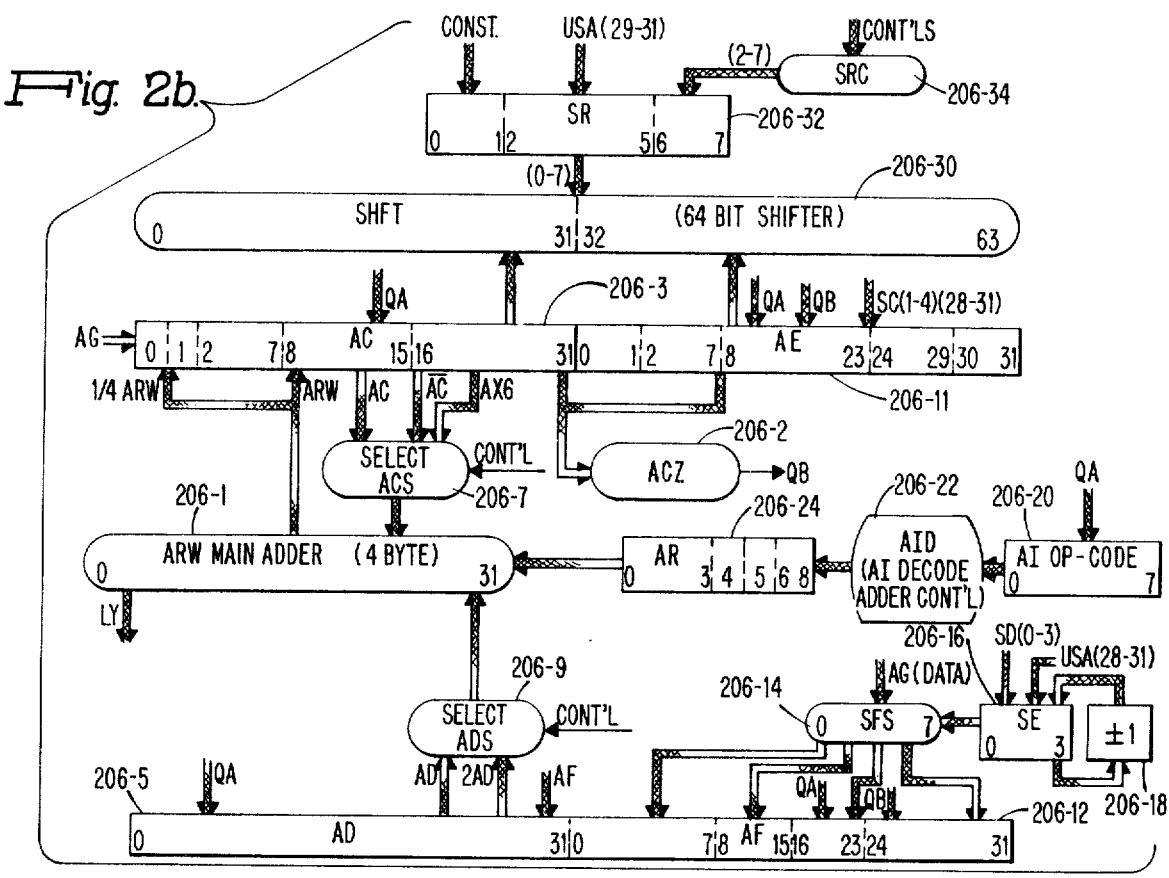
Figure 2C:
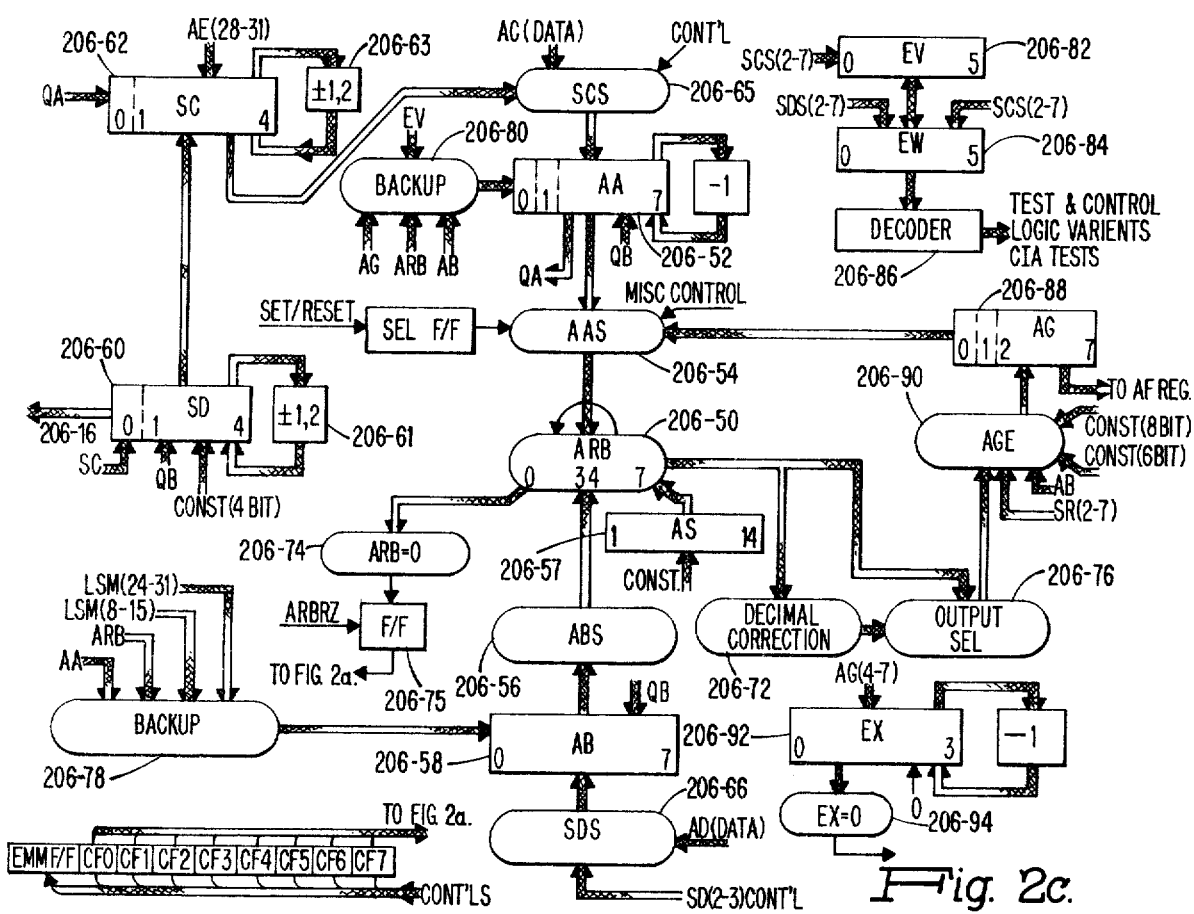

ARITHMETIC AND LOGIC UNIT - FIGS. 2b and 2c

Figure 1C:
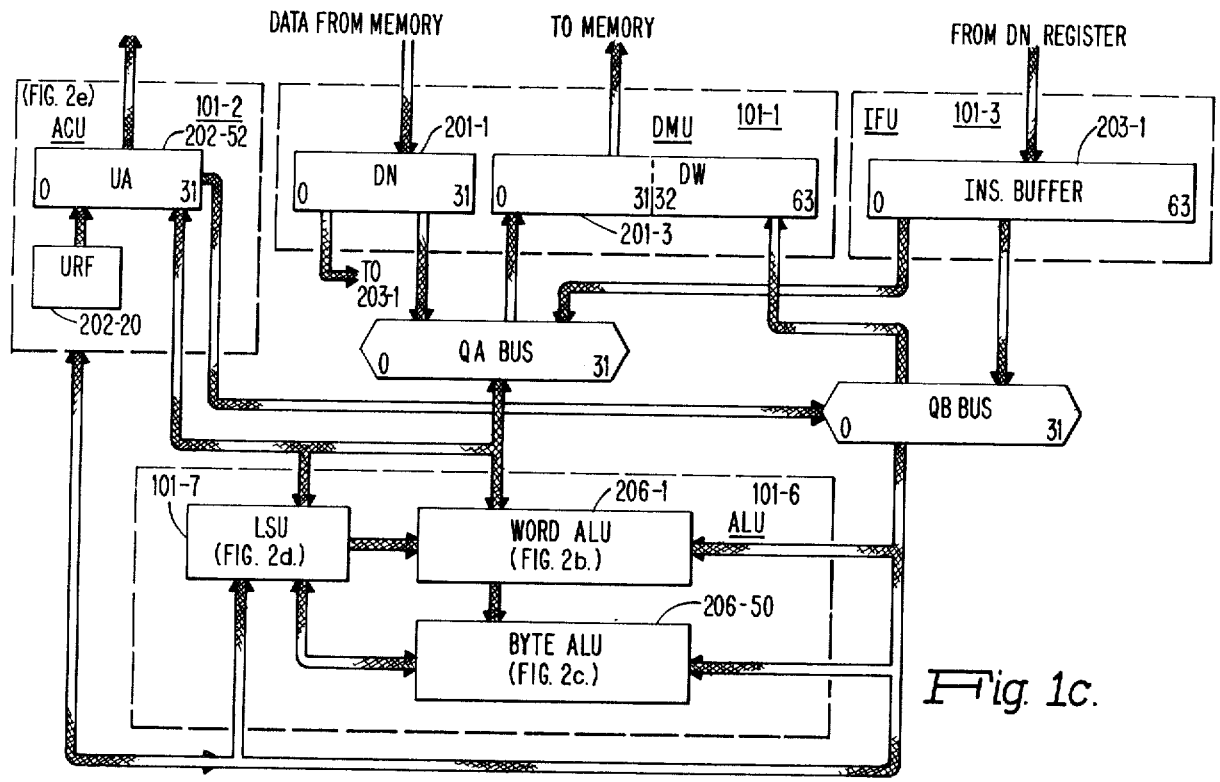
FIG. 1c illustrates in block diagram form the central processor subsystem of FIG. 1.

This unit which is shown in block diagram form in FIG. 1c performs all the required arithmetic and logic operations for the CPU subsystem. The unit includes a word ALU 206-1 shown in FIG. 2a, which performs arithmetic and logical operations upon a pair of operands which have a length of 4 bytes and are stored in a pair of operand registers 206-3 and 206-5. The contents of the operand registers 206-3 and 206-5 are applied via select circuits 206-7 and 206-9, conventional in design. The output result signals generated by word adder 206-1 are applied to register 206-3 and to register LY. A decoder circuit 206-2 tests the AC register for zeros.

A pair of registers 206-11 and 206-12 serve as auxiliary registers and couple to the elements and buses indicated. The AF register 206-12 also receives data signals from an AG register 206-88 via SFS selector circuit 206-14 in response to control signals from a three stage counter 206-16. The SE counter 206-16 is incremented/decremented by 1 via incrementer/decrementer circuit 206-18. This counter is loaded from registers included in the byte adder and in the CIA unit.

Also, the ALU includes an AI op code register 206-20, decoder circuits 206-22 and mode control register 206-24 arranged as shown. The contents of register 206-24 condition the adder to perform the operation designated by the op code of an instruction. Also, the ALU includes a 64 bit shifter 206-30 which can take the form of logic circuits such as those described in the co-pending patent application titled "Shifting Apparatus" invented by James Brown bearing Ser. NO. 320,011 which was filed Jan. 2, 1973 and is assigned to the assignee of the present invention. The shifter 206-30 couples to the AC and AE registers 206-3 and 206-11 and is controlled by an 8 bit control register 206-32. The register 206-32 is loaded directly from the sources shown or indirectly via a selector circuit 206-34.

As seen from FIG. 1c, the ALU includes a 8 bit (byte) adder 206-50 which is shown in greater detail in FIG. 2c. For the purposes of the present invention, the adder 206-50 can be considered conventional in design. The adder 206-50 operates on operands a byte at a time and includes decoding logic circuits which perform those operations required by the target systems. Additionally, the adder includes decimal correction circuits 206-72, zero result decoder circuits 206-74, output flip-flop 206-75, and output selector circuits 206-76. Also, the adder 206-50 includes a plurality of storage registers which couple to the common bus QA and QB and to one another as shown in FIG. 2c. It is seen that a register 206-58 couples to the common data/control bus QB and to sources designated LSM, AA and ARB via circuits 206-78. The source LSM corresponds to the scratch pad memory of FIG. 2d which is included within the local store unit 101-7 of FIG. 1. As mentioned previously, this memory provides temporary storage for the ALU as well as temporary storage for control information and address information pertinent to processing of a particular instruction. The uses made of certain storage locations within the local store memory are illustrated in FIGS. 3 and 4. The sources AA and ARB correspond to the register 206-52 and byte adder 206-50 respectively. The register 206-52 couples to both the QA and QB buses and to the AC register 206-3 via a selector circuit 206-65.

As seen from FIG. 2c, the AA and AB registers 206-52 and 206-58 primarily serve as A and B operand registers which couple to the byte adder 206-50 by way of the AAS and ABS selector circuits 206-54 and 206-56 respectively. A mode control register 206-57 directly couples to the adder 206-50 and the contents of the register condition the adder to perform the operation specified by a constant loaded into the register. The AB register 206-52 receives a designated one of 4 bytes stored in the AD register 206-5 of the word adder. The particular byte selected is defined by the contents of a SD counter 206-60 which includes an incrementer/decrementer circuit 206-61. The counter contents serve as a pointer designating one of the bytes to be next loaded into AB register 206-58. SImilarly, the SC counter 206-62 including an incrementer/decrementer circuit 206-63 serves as a pointer for designation which byte to be loaded into the AA register 206-52 from the AC register 206-3 of the word adder. That is, the SD and SC counters condition selector circuits 206-65 and 206-66 respectively to load the AA and AB operand registers from the AC and AD registers. Also, the AB and AA registers 206-58 and 206-52 can be loaded via gating circuits 206-78 and 206-80. The selector circuits 206-65 and 206-66 can load a pair of control registers 206-82 and 206-84. These registers provide temporary storage for certain variant control characters of an instruction being processed (e.g., op code and Cl characters). A decoder circuit 206-86 couples to register 206-84 for decoding the bits of the Cl character.

The storage registers include a further register 206-88 which is used to perform certain masking operations wherein signals are loaded into the register via a selector circuit 206-90 and in turn applied to byte adder 206-50 via selector circuit 206-54. Also, register 206-88 is used to load a three stage decrementing counter 206-92. This counter is used to keep track of the number of control characters processed by the emulator. The counter also includes a decoder circuit 206-94 which signals when the counter decrements to zero.

Additionally, the byte adder 206-50 includes a plurality of flip-flops utilized by the host system for control and storage purposes. One such flip-flop is an emulation mode (EMM) flip-flop 206-80 which is settable and resettable by firmware. Other flip-flops include a plurality of control flip-flops CF0 through CF7 which couple to the control store test circuits of FIG. 2a.

LOCAL STORE UNIT - FIG. 2d

FIG. 2d shows in greater detail, the local store unit of the ALU of FIGS. 1 and 1c. As seen from FIG. 2d, the unit includes an addressable 32 wide scratch pad memory 207-1. Memory contains up to 256 storage locations as illustrated. It is addressable via a LR register 207-2 which receives inputs from the QA bus as well as from the EW register 206-84 via a register 207-4 and gating circuits 207-3 as shown. The LR register 207-2 also includes an incrementer-decrementer circuit 207-5. During a cycle of operation, the contents of an addressed location are read out into an output register 207-9 and applied to the registers and buses shown.

As mentioned, FIG. 3 illustrates the layout of memory 207-1. Referring to that Figure, it is seen that the first 16 storage locations are assigned to store information corresponding to general registers GRO through GR15 of the PCB. As explained herein, these locations are used to call the ESP when coded to contain information arranged in a format such as that of FIG. 4. Another group of locations 30 through 3F serve as working locations which store information obtained from the I/O tables as described herein. The remaining locations are not pertinent to the invention and will not be further described.

Figure 2E:
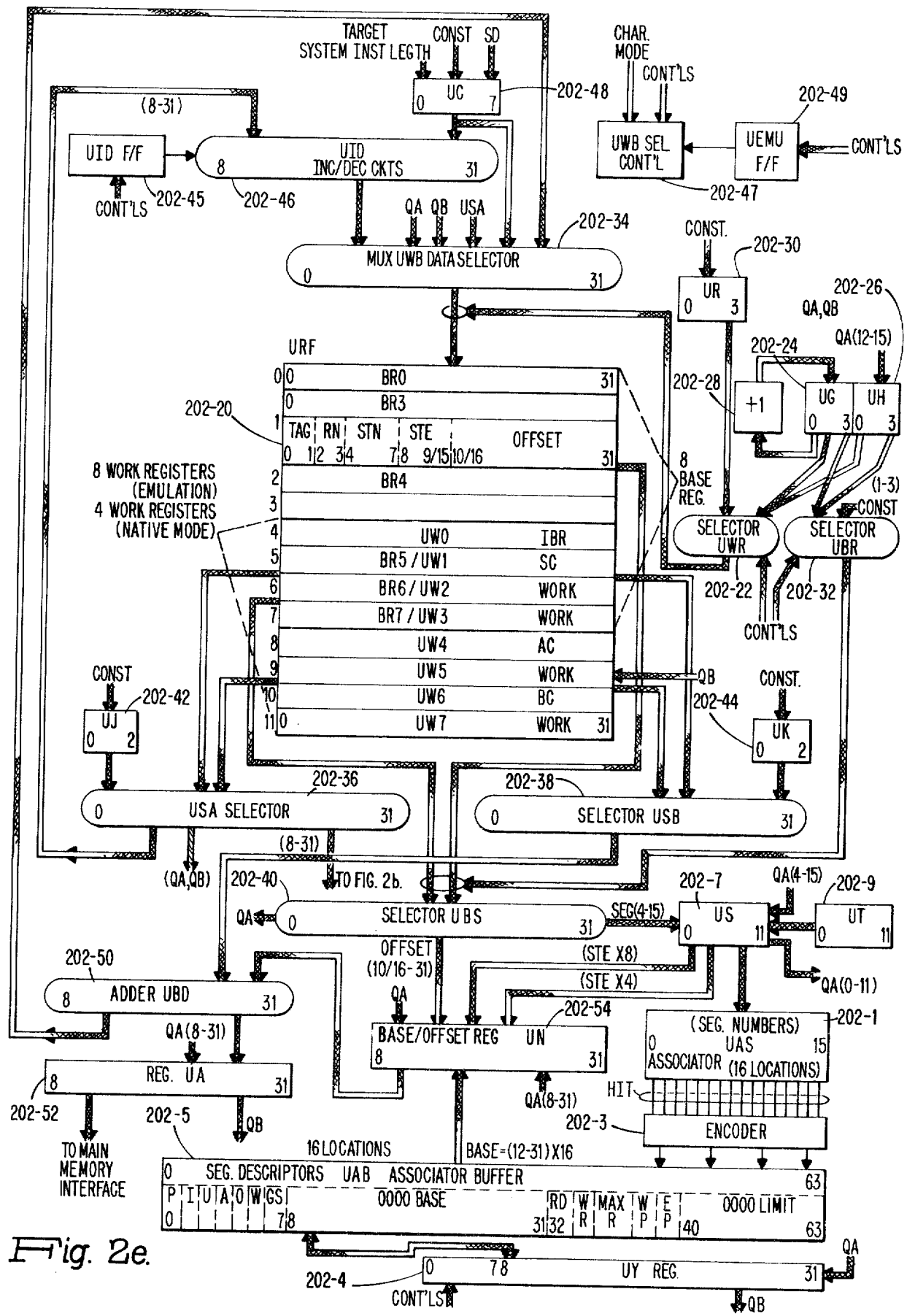
FIG. 2e shows in greater detail the address control unit (ACU) of FIGS. 1 and 1c.

ADDRESS CONTROL UNIT - FIG. 2e

FIG. 2e shows the circuits which generate effective and absolute addresses of a main store segment utilizing a 16 bit wide associator or content addressable memory 202-1. The memory 202-1 couples to an encoder 202-3 which in turn is used to reference the contents of a corresponding one of 16 locations of a 64 bit wide associator buffer memory 202-5. Information is written into the buffer via a register 202-4. Also, the UAS associator 202-1 couples to an input register 202-7 which receives segment number information from a register 202-9. As explained herein, the above arrangement is used to generate absolute address information for referencing the main store. This particular arrangement is the subject of a co-pending patent application titled "Address Development Technique Utilizing a Content Addressable Memory" invented by James L. Brown et al bearing Ser. No. 283,617 filed on Aug. 24, 1972 and assigned to the assignee named herein.

In greater detail, the address associator 202-1 includes the segment numbers STN/STE of up to 16 segment descriptors stored in associator buffer 202-5. Each of the 16 storage locations in the associator includes 12 data bits, plus 4 checking and control bits. During the development of an absolute address, the number of a desired segment is loaded into an US register 202-7. This register serves as an address register which has its contents applied in parallel to the 16 locations of the associator 202-1. When a true comparison is detected, the encoder 202-4 is conditioned by an output from the associator 202-1 to generate a four bit code which in turn selects the appropriate one of the sixteen locations containing the segment descriptor associated with that particular number. In the event that there is no true comparison, the descriptor for that segment number must be fetched from main store via the QA bus. The descriptor when fetched is written into the associator buffer 202-5 via register 202-4 and a hit bit associated therewith is set.

From FIG. 2e, it is seen that the ACU 101-2 also includes an unit register file (URF) 202-20 which includes a plurality of 32 bit wide base address register locations BR0-BR7 in addition to work register locations UW4 through UW7, all of which are addressed via a selector circuit 202-22 by the contents of registers 202-24, 202-26 and 202-30. Certain ones of these registers normally contain base register addresses derived from an instruction or microinstruction etc. applied via the QA and QB buses as shown. The URF is constructed using logic circuits ans is structured to permit the read out the contents of more than one register at the same time. The register 202-24 includes an incrementer circuit 202-28. During a write of cycle operation, the selector circuit 202-22 is conditioned by control signals generated by the control store to select the contents of the registers 202-24, 202-26 and 202-30 to designate the location into which information is to be written. Specifically, the address contents of each of the registers 202-24 and 202-26 are used to select one of the first 8 locations. The contents of register 202-30 are used to select one of the twelve register locations. In the absence of control signals from the control store, register 202-30 is selected as the source of address signals. Register 202-24 and register 202-26 are selected in response to certain control signals.

During a read cycle of operation, a selector circuit 202-32 operates to apply the address contents of one of the registers 202-24 and 202-26 or a constant from a register, not shown, to an output selector circuit 202-40 to select one of the first 8 locations for read out. Again, control signals designate the particular register to be selected by circuit 202-32.

Data applied via the QA bus, the QB, the selector circuit 202-36, byte address register 202-48 or via increment/decrement circuits 202-46 is written into an addressed location via a data selector circuit 202-34. Gating circuits of a selector control unit 202-47 in response to signals from the control store and an emulator mode (UEMU) flip-flop 202-49 generate signals which condition the selector circuit 202-34 to combine bits selected from the QB bus with bits from the appropriate source into the correct format according to the character mode specified. The ACU emulator mode flip-flop conditions the selector circuit control to generate signals for a character mode specified for processing target systems instructions. This flip-flop is initially switched on by firmware as explained herein.

The state of a control increment-decrement (UID) flip-flop 202-4 establishes whether the circuits 202-46 are to increment or decrement. Additionally, the increment-decrement circuits 202-46 receive signals from an addressed location via a selector circuit 202-36 and from a register 202-48. The circuits 202-46 may be constructed from conventional adder-subtractor circuits.

When registers 202-42 and 202-44 are loaded directly from the control store latch circuits, they condition selector circuits 202-36 and 202-38 respectively for selecting one of the last 8 register locations for read out. The selector circuit 202-36 applies signals to the QA and QB buses in addition to increment/decrement circuits 202-46. The selector circuit 202-38 applies signals to an adder circuit 202-50 which couples to an output register 202-52 and to selector circuit 202-34 while the selector circuit 202-40 couples to a base offset register 202-54 which has the other inputs shown.

During the generation of an absolute address, the segment number SEG of the base register address is loaded into the US register 202-7 via UBS selector circuit 202-40 while the offset value of the base register address is loaded into UN register 202-54. The contents of the UN register 202-54 thereafter are applied to adder 202-50 which adds the contents to a displacement value obtained from the address portion of an instruction being processed. The sum produced by the adder 202-50 is loaded into one of the work registers (e.g. UW2) via UWB data selector circuit 202-34 for further reference. The associator 202-1 is interrogated to determine whether the address of the segment in US register 202-7 is stored in the buffer 202-5. When it is, the segment base address stored in the buffer 202-5 is loaded into the UN register 202-54. The working register storage location containing the offset and displacement value for the segment is applied to the adder 202-50 via selector circuit 202-38 and is added to the segment base address. The sum constitutes an absolute address which is loaded into the UA register 202-52 to address main store. Also, the absolute address may be stored in a work register location of the unit register file for further reference (e.g. UW2).

For further information regarding the manner in which certain ones of the elements just described may be constructed (e.g. selector circuits, adder circuits, incrementers/decrementers, scratch pad memory etc.), reference may be made to the publication titled "The Integrated Circuits Catalog for Design Engineers" by Texas Instruments Inc., printed 1972. It will be appreciated that the disclosed adder circuits can be used to perform the type of incrementing/decrementing operations required.

I/O TABLES - FIG. 6

Before describing the operation of the present invention, reference will first be made to FIG. 6 which discloses the organization of the I/O tables in accordance with the present invention. In the present embodiment, as seen from FIG. 6, there are six general classes of tables. These include: a read/write channel table; a sector table; a termination table; peripheral control unit tables; PCU extension tables; device tables and device extension tables.

READ/WRITE CHANNEL TABLE

The read/write channel (RWC) table is organized on a per emulated target system basis. That is, there is one such table for each emulated system. The contents of base address register 4 (BR4) designates the beginning or base of the RWC table.

Each table includes an address space of 256 bytes. These bytes are grouped into 64 entries, one entry for each possible read/write channel code that can be specified by a target system program. Each entry is coded as illustrated in FIG. 7a. Referring to that Figure, it is seen that each entry contains a six bit time slot mask field, a six bit counter code field, a single extended I/O bit (EXT), a 3 bit sector code field and a 16 bit RWC busy mask field. FIG. 7a also shows an example of an RWC field entry specified for a particular target system. As seen from the Figure, a maximum of six time slots can be represented in an emulated target system (i.e., time slots 1, 1a through 3a). In this example, two time slots are required by the RWC code and correspond to a data transfer rate of 167 characters per second (CPS) in the target system. However, this field does not indicate what time slots are busy.

The counter code corresponds to the address in octal of the current location counter used for address storage by a data transfer instruction with the designated RWC code. In this example, the counter code address is 22 (OCTAL). The code normally has a value in the range 00 to OCTAL to 27 OCTAL.

Any read/write channel code which is illegal for the emulated configuration is designated as such by the counter code entry. For the RWC entry corresponding to a code of 00 OCTAL and for all RWC entries corresponding to RWC codes which are illegal in the target systems, the counter code field is coded with a high order bit of ONE (i.e., 1XXXXX). This counter code is treated in a special manner. Whenever the emulator detects a counter code with a high order bit of ONE detected during the processing of a data transfer input/output instruction, it generates a specification message as explained herein.

The EXT bit is zero which means that the extended I/O facility is not used and the entry fetched is used in processing the instruction. When this bit is set to a binary ONE, it indicates that it may be necessary to use an effective RWC code instead of the specified RWC code depending upon the status of an extended I/O target system indicator. If the indicator is a binary ONE (i.e., on), the information in the current entry is used. If the indicator is a binary ZERO, the information in an alternate entry is fetched and used. For those target systems which do not have this type of capability, this bit will always be set to a binary ZERO. The facility afforded by this feature is described in greater detail in the above referenced programming manual.

The physical sector associated with the RWC code is sector 2 as indicated by bits 13–15 of the sector field. In the case of control types of I/O instructions which require no data transfer and which contain only a C1 control character, the sector code bits 13–15 are used to fetch a correct time slot status entry as explained herein. In such cases, a test of a read write channel implies a test of the sector time slots. The reason is that there is a fixed relationship between the sector, a time slot and the selected RWC in the target systems. However, in the case of an instruction which requires a data transfer (e.g. a PDT instruction), the sector code bits are not used.

The 16 bit RWC busy mask field is used to indicate which read/write channels are required to be made busy (i.e. must be available for a data transfer instruction) or are to be tested (i.e. a control instruction). As illustrated in FIG. 7a, a target system can have a maximum of 16 read/write channels designated as shown. The letter A defines an auxiliary channel as contrasted from a primary channel. In some target systems, there is a fixed relationship between the read/write channels and time slots. In order to achieve higher transfer rates which require more than one time slot, read/write channels are interlocked which means that more than one channel and hence counter, is required to execute the instruction. In the example given, since two time slots are required for the 167 CPS rate, two read write channels are also required. Thus, the RWC busy mask field is coded to specify read/write channels 5 and 5a.

SPECIAL ENTRIES

There are two RWC table entries which are coded in a predetermined manner. These correspond to the entries stored in locations designated by address 00 OCTAL and 77 OCTAL. The RWC table entry at location $(00)_8$ always has a counter code field of (1XXXX). As explained above, this code is treated as illegal by the emulator in the case of a data transfer instruction. However, in the case of a control I/O instruction, the emulator bypasses certain test operations as explained herein and completes processing of the instruction.

The RWC table entry at location $(77)_8$ also has a counter code field of 1XXXXX which causes the emulator in processing a data transfer instruction, to generate a specification message as mentioned above. However, in the case of a control I/O instruction, the emulator forces a branch as explained herein. The RWC busy mask field in this table entry is used to indicate which read/write channels in the target system being emulated are currently assigned (i.e., busy). This field is updated by the ESP whenever a data transfer instruction is initiated or terminated. As explained herein, the emulator accesses but never alters the contents of this field when it is performing a RWC busy test with a legal RWC code not $(00)_8$ or $(77)_8$ for a data transfer instruction or control instruction.

SECTOR TABLE

Another type of table included within FIG. 6 is a sector table. One sector table as shown is present for each target system being emulated. The sector table has an address space of 32 bytes which as shown in FIG. 6 follows the last byte allocated to a RWC table. The sector table entries are coded as illustrated in FIG. 7b. As seen from FIG. 7b, the sector table entry includes a time slot status field (bits 0–5) which is coded to indicate which time slots on the sector are currently in use (i.e. busy status of all the sector time slots). A 7 bit field (i.e. bits 6–12) is reserved for use by the emulator software (ESP). The sector table entry also includes a three bit status field (i.e. bits 13–15) wherein bit 13 when a binary ONE indicates that the sector does not exist for the particular target system (i.e. non-existent). Bits 14 and 15 of the status field are reserved for future use. The last field (i.e. bits 16–31) of the sector entry is a 16 bit displacement field which defines the base location of the peripheral control unit (PCU)

table for the sector relative to the location specified or pointed to by the contents of base register 4.

An unique entry in the sector table is defined by adding to the contents of base address register 4, a value of $256_{10}$ plus a value of 4 times the sector code where the sector code corresponds to a three bit field formed as follows: a) if the first variant character C1 is the only variant character present in the instruction, the sector code is taken from the RWC entry referenced by the C1 character (control input/output instructions only - PCB); b) if the variant characters C1 and C2 are present in the instruction, the sector code is formed by taking the high order three bits of the C2 variant character and setting the high order bit to a binary ZERO; c) if the instruction includes a variant character C1 and an escape code character with or without the C2 variant, the sector code is formed by taking the low order three bits of the CE character. This will be explained in greater detail herein with reference to FIG. 11.

PERIPHERAL CONTROL UNIT TABLE

THe peripheral control unit (PCU) is a third type of table included in FIG. 6. There is one PCU table present for each sector in the target system being emulated. Also, there is one entry in the table for each possible PCU address that can be specified by a target system program. Thus, there are 16 entries in the table, each having 4 bytes.

The format of the PCU table is as illustrated in FIG. 7c. As seen from FIG. 7c, the entry includes information as to the type of PCU, the existence of the PCU and its busy/interrupt state. More specifically, a code of zero indicates that a peripheral control unit does not exist for this PCU address code. When the first four bits are coded as 0001, this value indicates that a target system printer control unit is being emulated. When these bits are coded as 0010, this value indicates that a target system timer or clock is being emulated. Similarly, when coded as 0111, this value indicates that a target system magnetic tape control unit is being emulated and when coded as 1000 through 1111, these values are used to indicate that the peripheral control unit being emulated is to be treated as a Special Unit. As explained herein, whenever a Special Unit code is detected, the emulator immediately traps the instruction to the ESP for all further processing.

Bit 4 when set to a binary ONE indicates that the peripheral control unit is not temporarily available or addressable. When this bit is a binary ONE, the PCU busy bit (CB) which corresponds to bit 7 is also set to a binary ONE. Bit 5 is a no status bit which when set to a binary ONE indicates that no status is present in bits 4 and 7–15 of this entry and that bits 10–15 contain an alternate C2 code which indicates the PCU table entry in which the desired information is located (on the same sector). In this instance, bits 4 and 7–11 are reserved for software.

When bit 5 is set to a binary ZERO, the bits 4 and 7–15 contain the status. In all instances, the displacement value of the device table field and the PCU type field are valid and bit 6 is set to a binary ONE. When bit 7 is set to a binary ONE, it indicates that the target system PCU being emulated is busy. Bits 8 and 9 are reserved for software use while bits 10 through 15 specify an alternate PCU or interrupt status depending upon the state of bit 5. More particularly, when the NS bit 5 is a binary ONE, this field contains another or alternate C2 code for the sector specified by the instruction. This alternate C2 code is processed in the same way as the C2 code of the instruction to obtain the address of the table entry which contains meaningful status information. The purpose of this arrangement is to be able to emulate target system peripheral control units which use more than one PCU address because they have more than one device attached but which can only support or control only one I/O operation at a time (e.g. non-simultaneous magnetic tape controllers, card reader - punch controllers). Thus, there are two entries in the PCU table which are addressed by a single PCU code and which share a common busy status bit interlocking the operations associated with the two entries as explained in greater detail herein.

If bit 5 is set to a binary ZERO, the field contains interrupt status defined as follows: bits 10 and 11 are reserved for software use; bit 12 is a control unit interrupt bit which when set indicates that the control unit interrupt function is set for the target system PCU in question; bit 13 is a control unit allow bit which when set to a binary ONE indicates that the PCU allow interrupt function for the target system PCU is turned on (i.e. interrupts are allowed); bit 14 is a device interrupt bit which when set to a binary ONE indicates that the device interrupt function for the target system PCU is turned on (i.e. a device interrupt is stored); bit 15 is a device interrupt allow bit which when set to a binary ONE indicates that the device interrupt allow function is turned on in the emulated control unit (i.e. device interrupts are allowed); and bits 16 through 31 are displacement bits which define the base location of the device table for the PCU relative to the location specified by the contents of base address register 4.

PERIPHERAL CONTROL UNIT EXTENSION TABLE

As seen from FIG. 6, a further table which corresponds to a peripheral control unit extension table can reside immediately above a device table to be described herein. There are two types of peripheral control unit extension tables, one for target system mass storage peripheral control units and one for magnetic tape peripheral control units being emulated. In general, the tables provide storage of status information for use by the host system with no direct counterpart in the target system or storage of information which exists in the target system and does not have a direct counterpart in the host system.

FIG. 7d shows the format of the mass storage peripheral control unit extension table. One such table exists for each target system mass storage peripheral control unit being emulated. As seen from FIG. 7d, each table comprises four contiguous words and occupies four main store words preceding and abutting word zero of the associated device table as seen from FIG. 6. In contrast to the other tables, the extension tables vary in size as a function of the type of controller. It will be noted from FIG. 6 that these tables start at the base of the fixed part of the table and the addresses go in an opposite direction as far as required to accommodate the sizes desired.

Each target system mass storage PCU extension table includes a 10 character address register which stores information specifying record addresses and status indicators. This information stored in the address register is mapped onto 10 contiguous bytes, only the low order 6 bits of each byte being used for this purpose.

The emulator software ESP, loads this area in response to a special instruction called a load address register PDT instruction. The emulator software subsequently transfers information in the format illustrated in FIG. 7d to the mass storage processor as part of the input-output instruction.

As seen from FIG. 7d, the area includes the following information: (a) a six bit field specifying the target system logical address of the device to be accessed by a subsequent read/write PDT instruction identified as a device field; (b) a six bit magazine field which specifies a group of devices that is to be accessed by a subsequent read/write PDT instruction (a device address refers to a device in the addressed magazine); (c) a 12 bit cylinder field which specifies the binary address of a cylinder on the device specified by the device and magazine fields; (d) a 12 bit track field which specifies the binary address of the track to be accessed by a subsequent read/write PDT instruction; and (e) a 12 bit record field which specifies the binary address of a record to be searched for by a subsequent search type PDT instruction.

Additionally, as seen from FIG. 7d, the information includes two status fields, S1 and S2, each of which includes 12 bits specified to contain the following status information. Bit 2 is a device inoperable bit which when set to a binary ONE indicates that the device specified by the address register is inoperable. Conditions which cause this bit to be set include that the device is off line, a hardware failure has been detected in the device or that the device has been incorrectly specified. Bit 3 is a device error bit which when set to a binary ONE indicates that a device error condition exists for the device specified by the address register. A device error condition exists whenever a control instruction such as a seek operation, attempts to position the read/write heads of the mass storage device to a cylinder address outside the cylinder addressing limits for the device in question. Bit 4 is a protection violation bit which when set to a binary ONE indicates that a search and write instruction was detected which violated the write permission conditions granted by the control unit file protection switches and/or the header flag character of the record being accessed. Bit 5 is a read error bit which when set to a binary ONE indicates that a read error was detected on the last read instruction executed on this specific device. Bit 6 is an instruction incomplete bit which when set to a binary ONE indicates that an instruction was not completed for certain specified reasons. Bit 7 is a track linking record (TLR) bit which when set to a binary ONE indicates that the last record referenced by a search and read/write instruction was a track linking record. Bit 10 is a format violation bit which when set to a binary ONE indicates certain illegal format conditions. Bit 11 is a track overflow bit which when set to a binary ONE indicates that a read/write instruction attempted to reference an index portion of a track and bits 12 through 15 are file protection bits specifying those items shown in FIG. 7d.

Additionally, the PCU extension table includes 16 general status bits which are used by the emulator software to simulate certain control switches present on the target system being emulated (write permit switches) and for storing various target systems indicators.

DEVICE TABLE

A further table included within FIG. 6 is a device table in which there is a device table per target system PCU in the emulated system. Each entry in the device table has four bytes of information and one entry is provided in the table for each possible logical device address that can be specified by the target system program to the particular type of PCU. The general format of a device table entry is illustrated in FIG. 7e. As seen from that Figure, the device table entry includes a 16 bit status field in which bits 0 through 7 are accessed by both the emulator firmware and software and bits 8 through 15 are reserved for emulator software use and are device specific. More specifically, bit 0 is a target system device busy bit which when set to a binary ONE indicates that the device in question is busy. Stated differently, it means that the device is temporarily unavailable to initiate a new peripheral operation because it is presently in the process of executing an operation. Also, this bit when set to a binary ONE may indicate a device error condition. Bits 1 through 6 are exception test bits, (XT1 through XT6), which are assigned and used in a device specific manner. Bit 7 is a device trap bit which when set to a binary ONE indicates that the emulator firmware is to trap orders addressed to this device to the emulator software for further processing. Stated differently, a trap call is made to the emulator software (ESP). Bits 8 through 15 are device specific status bits and bits 16 through 31 constitute a displacement field which defines the base location of the device extension table for the device relative to the address contents of the base address register 4.

Figure 7F:
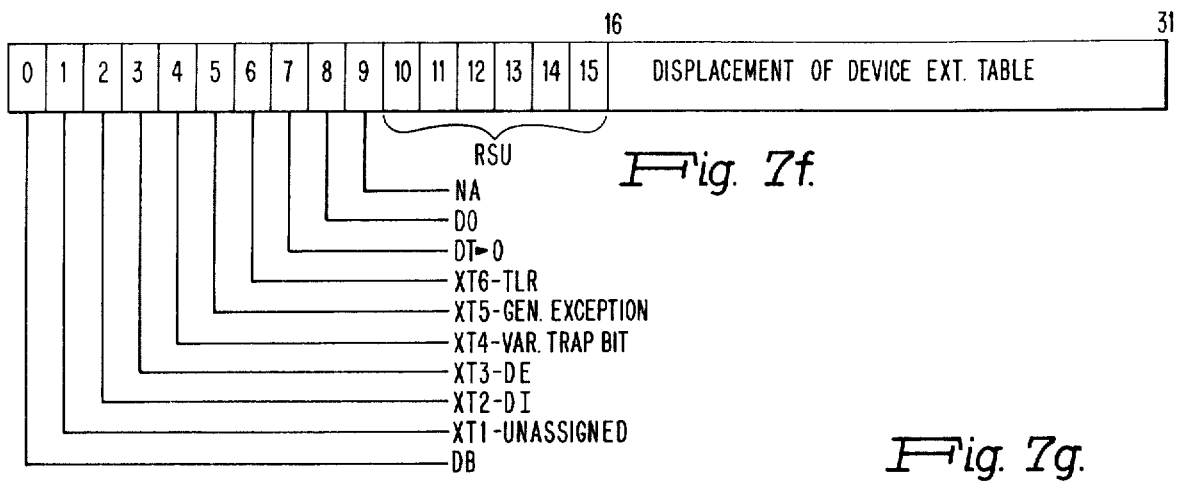
FIG. 7f shows the format of a specific type of device table entry in accordance with the system of the present invention.

FIG. 7f shows a specific format for mass storage device table entry. The entry is defined as follows. Bit 0 when set to a binary ONE indicates that the device is busy due to a data transfer, a seek operation or because it is not available. Bit 1 is not used and bit 2 is the device inoperable bit which when set to a binary ONE indicates the device specified by the address register is inoperable. The mass storage device of target system is considered inoperable for the following instances: the device is off-line; a hardware failure has been detected in the device or the device has been incorrectly patched or dialed into the system. Bit 3 is the device error bit which when set to a binary ONE indicates that a device error condition exists for the device specified by the address register. As mentioned previously a device error condition exists in a mass storage device whenever a seek instruction attempts to position the read/write heads to a cylinder address outside the cylinder address limits. Bit 4 is a variant trap bit which when set to a binary ONE indicates that illegal or unspecified variants of certain target systems I/O control instructions (peripheral control and branch instructions) are to be trapped by the emulator firmware and a call made to the emulator software. Bit 5 is a general exception bit which when set to a binary ONE indicates that an exception condition (e.g. those defined by the DI, DE, II, etc. bits) has been detected during the last data transfer instruction directed to the device specified in the address register. Bit 6 is a track linking record bit which when set to a binary ONE indicates that the last record searched and successfully read/written was a track linking record. Bit 7 is a trap bit which is always set to a binary ZERO in the case of a mass storage device. Bit 8 is a dialed out bit which when set to a binary ONE indicates that the device has not been selected or dialed in on a control panel switch of the target system. Bit 9 is a not available bit which is used by the emulator software to determine whether the device in question is performing a peripheral operational or whether it is busy because it is inoperable (bits 0 and 9 are used to make this determination). Bits 10 through 15 are reserved for software use and bits 16 through 31 constitute a displacement field which contains the displacement relative to the contents of base address register 4 of the associated device extension table for the device.

TERMINATION AND DEVICE EXTENSION TABLES

The last two types of tables included within FIG. 6 correspond to a termination table and device extension table. The termination table is accessed through a termination entry pointer table (TEPT). The TEP table includes 128 two byte entries representing logical device numbers (LDNS) 0 to 127. Each entry is either null which corresponds to a non-existent LDN or one that corresponds to a device not assigned to the emulator or contains an index value which when added to the value of the base register 4 points to the beginning of the termination table entry associated with that LDN. The logical device number (name) is a 16 bit binary number assigned to each attached host system device. This number is subsequently loaded by the emulator software into an I/O control block whenever a channel program has been constructed for the device in question.

The contents of a termination table entry are shown in FIG. 7h. It is seen that the entry includes a 16 bit field which serves as a RWC pointer. The value stored in this field when added to base register 4 points to the RWC entry in the RWC/PCU table associated with the current instruction. It is updated by the target system process for any I/O orders involving a RWC which has to be made busy.

A second field included within the termination table entry is a 16 bit CPU pointer field. The value contained in this field when added to bit to the contents of base address register 4 provides the address of the CPU entry for this device. A further field included as part of word 1 is a 16 bit PCU extension pointer field. The value contained in this field when added to the contents of base address register 4 gives the address of the PCU extension entry for this device. A further field of word 1 is a device table pointer. The value contained in this field points to the device table entry which contains the target systems status for this device. The first field of word 2 is a 16 bit target system logical name field. This field is the target system name expressed in the form of XN where X is an alpha character representing the sector and PCU and N is a numeric digit code representing the device. Words 3 and 4 of the entry include device type/subtype/device number fields. These fields are 5 characters in length and represent the emulated external name. Also, word 4 includes a 3 bit sector code field which identifies the target system sector code. Lastly, word 4 includes a device ready bit which represents the status of the emulating device.

Figure 7G:
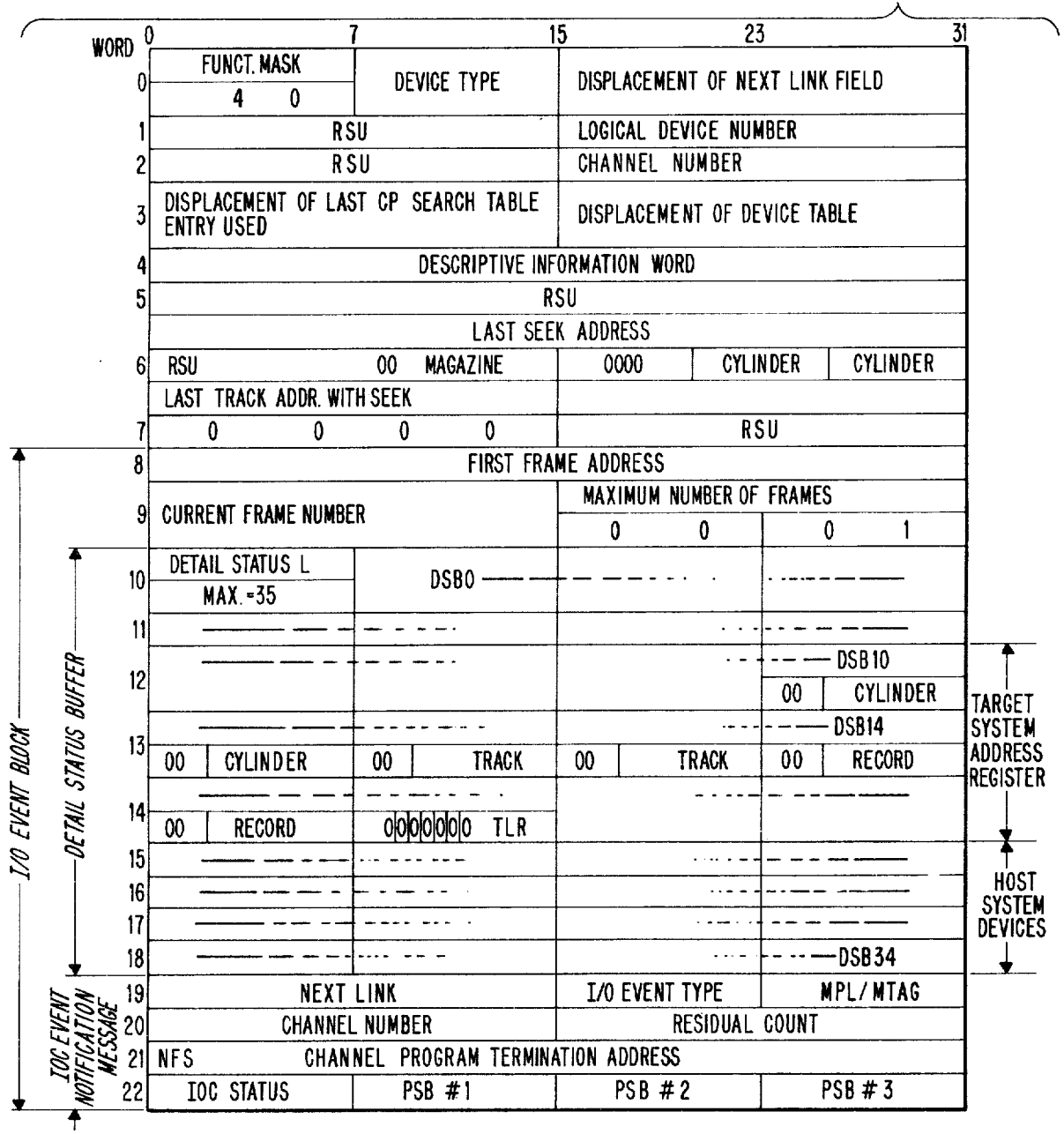
FIG. 7g shows the format of a specific type of device extension table entry in accordance with the system of the present invention.

FIG. 7g shows the type of entries occurring within one type of extension table which corresponds to the mass storage extension table of FIG. 6. In general, device extension tables serve purposes similar to those described for PCU extension tables. Referring to FIG. 7g, it is seen that the mass storage device extension table has 23 words which include varying types of information which take the form of address information, control information, detailed device status information, and IOC message information. This table will only be discussed as is pertinent to the present invention and has been included only for completeness. Obviously, the type of information stored in a device extension table will vary as a function of the device.

DESCRIPTION OF OPERATION OF PREFERRED EMBODIMENT

With reference to FIGS. 1 through 7h, FIG. 11 and the flow charts of FIGS. 8a through 8i, FIGS. 9a through 9h and FIG. 10, the operation of the emulator system of the present invention will now be described first in terms of processing an input-output peripheral data transfer (PDT) instruction included within a target system program. As mentioned, this instruction when executed in the target system causes a transfer of data characters between an area of main store and a peripheral device.

Referring to FIG. 8a, it is seen that first an instruction is initially fetched or extracted. Actually, the IFU of FIG. 1c fetches instructions in advance in order to provide a certain amount of "look ahead" in processing. The fetched instructions are stored in an instruction buffer 203-1 and thereafter applied to the QA and QB buses. As indicated in FIG. 8a, the op code address is stored in general register 7 in the main store. Additionally, the ACU 101-2 calculates the absolute addresses required and stores them in the AC register 206-3 of the word ALU of FIG. 2b. Additionally, the variant character contained within the instruction buffer 203-1 is stored in the appropriate register of the ALU which corresponds to the EV register 202-82 in FIG. 2c. At this time, the control store of FIG. 2a will branch on the bits of the op code of the instruction and enter the main routine as illustrated in FIGS. 8a and 10.

Figure 11:
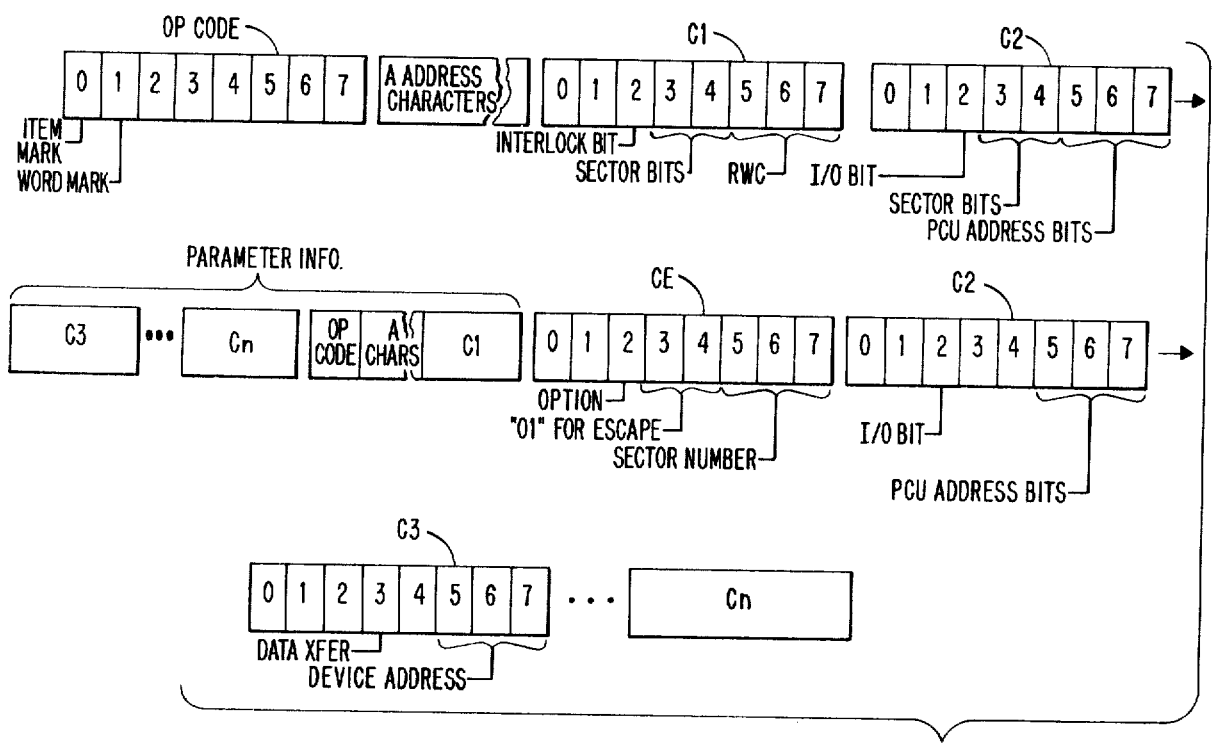
FIG. 11 illustrates in greater detail the coding of input-output data transfer instructions of the target systems processed in accordance with the present invention.

From FIGS. 6 and 11, it is seen that target system I/O instructions are capable of assuming a variety of different formats. In general, the PDT instruction of a target system program is formatted to include an op code character, A address character(s) and a number of control characters C1 through CN. As described in the aforementioned programming manual and Lethin et al patent, the PDT instruction causes data characters to be transferred between as peripheral device and a main memory area of the target system whose leftmost location is designated by the A address. When the IFU 101-3 fetches an instruction, it initially fetches the op code character, A address characters and a first control or variant character (i.e. C1 character) of the instruction. The number of characters included in the A address depends upon the character mode selected by the programmer (see program manual). The IFU 101-3 is arranged to terminate its operation after it has extracted or fetched the first variant character. That is, the IFU 101-3 includes format checking circuits (not shown) which are responsive to the PDT instruction op code character to terminate instruction extraction when the first variant character has been extracted. Stated differently, the IFU considers that an entire target system instruction to include only an op code, A address and a first variant character.

The particular op code previously caused the control store to branch to a particular point wherein microinstructions read out and decoded set up the various CPU units for emulation. For example, the decoded microinstructions generate subcommand signals which set to binary ONES the emulation mode flip-flop and the ACU control flip-flop 202-49 of the byte adder 206-50 and ACU 101-2 respectively. The emulation mode (EMM) flip-flop when set to a binary ONE state conditions the IFU 101-3 for making required format checks and for processing exceptions enabling the storing of status information indicating that the CPU had been emulating a target system upon the occurrence of an exception. The ACU control flip-flop when set to its binary ONE state conditions the ACU 101-2 to condition the data selector circuit 202-34 to load data into the URF in a format consistent with the character mode of operation of the target system.

Referring to FIG. 8a, it is seen that following extraction, the emulator software, ESP, initializes various registers within the CPU units to values which they normally would contain when a target system begins program execution. For example, the process control block (PCB) of FIG. 4 includes values contained within base address registers BR0 through BR7 which point to the different segments used by the emulator firmware. As mentioned previously, register BR2 points to the beginning of the target systems main memory, the register BR3 points to the beginning of the target systems control memory, and register BR4 points to the start of the I/O tables. As described above, these tables will contain information previously loaded therein by the emulator software, ESP, based upon information supplied to it which defines the target system I/O configuration. These operations take place during an initialization phase. Additionally, the emulator software loads various ones of the registers of the URF of FIG. 2e with information derived from the PCB of FIG. 1b. These values correspond to those stored in the relocation register (BR0), the index registers, barricade registers, sequence counter (UW1), AC and BC registers (UW1 and UW6). They are used for fetching information from main store during the processing of an I/O instruction. Values contained in these registers are updated and stored in the LSM of the LSU 101-7.

Thus, at the conclusion of extraction, the CPU will have executed a firmware sequence, common to the processing of all target system orders, using a sequence counter value transferred to main store for extracting an op code, A address characters and a first variant character of the instruction, will have calculated the effective address of the instruction and will have tested the op code character of the PDT instruction to find out how the instruction is to be executed. The sequence counter and AC counter will have been updated and used to get the instruction out and to index and form the working AC address.

Since the CPU is actually beginning the processing of the instruction, the contents of the various LSM register locations are not updated until actual execution of the PDT instruction is initiated. During the extraction phase, the CPU does not reference base address register 4 which points to the I/O tables. However, the CPU uses the contents of base address register 2 to fetch the I/O instruction from main store. The 6 bit op code character fetched and stored in the IFU 101-3 of FIG. 1c is used to condition the branch test logic circuits of FIG. 2a. More specifically, the bits of the op code are applied to a 64 way branching test circuits which select a first microinstruction within a sequence of microinstructions included within the control store array for emulating this type of instruction.

Referring to FIG. 8a, it is seen that first the firmware performs certain checks such as a starting address check (SAC). This check determines when storage protection is in effect whether there is an address violation. Assuming there is no address violation, next the firmware enters an initialization routine wherein it clears certain ones of the registers used to call the emulator software, ESP, which completes as required the processing of the target system instruction. Normally, this involves clearing to zeros the contents of different ones of the register locations of the LSM of FIG. 2d. Thereafter, the firmware via microinstruction 102-104 causes the op code character stored in the AC register 206-3 of the word ALU 206-1 to be loaded into the local register 207-9 of the LSM of FIG. 2c and then to be written into the storage location GRC. More specifically, as illustrated in FIG. 10, the PDT op code value 36 is transferred to the AG register 206-88 of FIG. 2c. From there, it is loaded into the AF register 206-12 of FIG. 2b via SFS selector circuit 206-14. The op code character is applied to the QA bus and loaded into the local register 207-9 and then written into location GRC which is specified by the contents of the address register 207-2.

RWC TEST ROUTINE

Figure 8B:
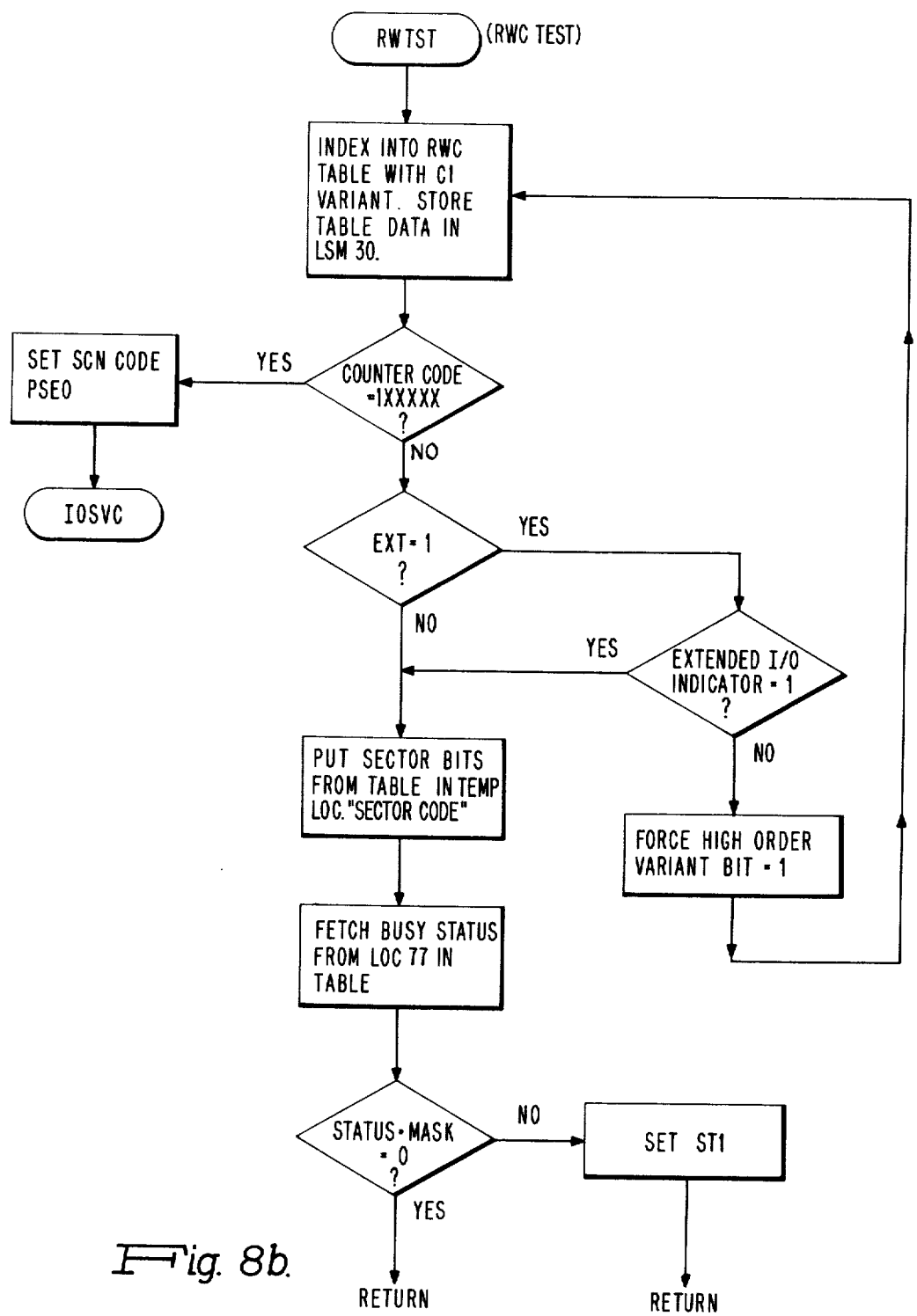

As seen from FIGS. 8a and 10, the firmware then enters a RWC status test routine of FIG. 8b. This routine is shown in greater detail in FIG. 9a. Referring to that Figure, there is shown the operations which are performed in order to reference the appropriate entry stored in the RWC table using the C1 variant character as an index value. First, microinstructions 100-102 when executed convert the 6 bit C1 variant character into an 8 bit character ($C1_H$). This value is then added to the absolute starting address of the I/O tables herein termed base value. That is, microinstruction 103 first transfers the C1 character to the AC from the AF register via the QA bus. Next, the offset value for the I/O table is fetched from location No. 2 of the URF (BR2) and stored in UN register 202-54 while the segment number (STN, STE) is transferred into the US register 202-7.

Microinstruction 104 causes the offset value to be written into working location UW5 of the URF and the shifted C1 character to be loaded into the AC register 206-3. Also, location UW5 is selected by selector circuit 202-38 and the segment base from the buffer 202-5 is loaded into UN register 202-54. Microinstruction 105 causes the sum which is the base + offset produced by adder 202-50 to be written into work location UW5 via selector circuit 202-34. Now, working location UW5 contains the calculated base value. Also, the base value is applied to the adder by USB selector circuit 202-38 and the shifted C1 character is loaded into the UN register 202-54 via the QA bus.

The sum produced by UBO adder 202-50 is loaded into output register 202-52 and this value is used to fetch the particular RWC table entry designated by the C1 character.

Microinstruction 106 generates a signal MMGOP which signals the main memory interface circuits to begin a memory cycle of operation to fetch the contents of the designated location. The contents fetched from the main store constitute a 4 byte entry which is loaded into the DN register 201-1 of FIG. 1c and thereafter applied to the word adder 206-1. A microinstruction 108 sets the shifter 206-30 to shift left by 4 bit positions. The RWC entry contents of the DN register 201-1 are then loaded into the AC register 206-3 and written into location 30 of the LSM. As indicated by FIGS. 8b and 9a, the firmware then proceeds to test the RWC counter code to determine whether it is illegal. This is accomplished by testing the state of the high order bit. If that bit is set to a binary ONE, this means that the RWC counter code is illegal to use on the particular target system. This causes the control store to force a predetermined code (i.e. "11111") into the AG register 206-88. This code is a service class number (SCN) code which signals the ESP that the RWC counter code is illegal. The all ONES SCN code is written later into a portion of location GR12 of the LSM shown in FIG. 4. Also, the other information is also included so that the ESP can execute the next instruction in sequence. For example, the sequence counter SC will have been set to indicate the address of the operation code of the next instruction, the variant portion of location GR0 contains the C1 variant character of the I/O instruction while location GR12 contains the op code character of the instruction. The other locations will contain information initially loaded therein by the ESP (e.g. INA, INB, INC, BC and AC portions etc). Still other locations are modified to include additional status information when the I/O instruction has been further processed. As explained herein, these operations are performed by an I/O service routine.

The above test will be considered in greater detail with reference to FIG. 9a. The information stored in the AC register fetched from the RWC table has a format disclosed in FIG. 7a. In response to microinstructions 110 through 112, the contents of the AC register are aligned by being shifted left which enables the selection and transfer of the RWC entry bits 6 through 11 from the AD register 206-5 to the AB register 206-58 for testing. Also, as indicated, the AC register 206-3 at the completion of microinstruction 112 contains the sector code bits 13 through 15 shifted left by 2. Microinstruction 113 when executed produces signals which loads the EXT bit 12 from the AD register 206-5 into bit position 7 of the AB register 206-58 via SDS selector circuit 206-66. The contents of SD counter 206-60 are also incremented by 1 by circuit 206-61 at that time. Additionally, location GRC of the LSM is addressed and its contents read out into the LY local register 207-9. From FIGS. 3 and 4, it is seen that the GRC location corresponds to storage location GR12 which includes the SCN code field. Also, microinstruction 113 causes the sector code to be transferred into AD register 206-5.

Microinstruction 114 when executed conditions the byte adder 206-50 to perform a logical product operation wherein various bit positions of the AB register 206-58 are masked to enable testing the state of certain bit positions. The state of bit position 2 of the AB register 206-58 which corresponds to the first bit of the counter code is tested by microinstruction 114. The results of the test causes the control store either to advance to the next microinstruction or branch to microinstruction 134. When the test is positive, the control store branches to microinstruction 134 which signals that the RWC counter code is illegal. Microinstruction 134 when executed forces an all ones code into AG register 206-88 which is subsequently written into location GRC of the LSM.

As seen from FIG. 9a, microinstruction 115 is executed next and causes the sector code contents of the AD register 206-5 to be loaded into the AB register 206-58 via SDS selector circuit 206-66. Also, it forces a predetermined constant code from the control store into the AG register 206-88 so as to mask the bits in the AB register 206-58 to test the state of bit position 7 which contains the EXT bit. Microinstruction 116 causes the sector code bits to be loaded into the AG register 206-88 from the byte adder result bus ARB while the AF register 206-12 is cleared to zeros. Also, the microinstruction causes the control store test circuits to execute a two way branch operation based on the state of the EXT bit 12 of the RWC entry.

As mentioned previously, the EXT bit indicates whether the particular target system being emulated has an extended I/O capability. This means that the sector code defined by the I/O instruction cannot be readily translated into a code designating a particular sector. Thus, the state of EXT bit 12 defines whether the RWC code is affected by the extended I/O capability. It will be appreciated that the extended I/O bit represents the state of status indicators associated with the target systems. In a target system, this indicator is switched on and off under program control.

When the EXT bit is a binary ZERO, the RWC code is treated as a different RWC code as explained herein. However, when EXT bit 12 is a binary ONE, it is treated in a different fashion using the contents of the RWC table entry previously fetched. In greater detail, when the extended I/O bit 12 is a binary ZERO, the control store branches to microinstruction 132 followed by microinstruction 133 which sets the high order bit of the C1 character stored in the EV register 206-82 to a binary ONE. As seen from FIGS. 8b and 9a, the control store then returns to microinstruction 100 and begins again indexing into the RWC table using the modified C1 variant character. The entry fetched from the RWC table will also have the format shown in FIG. 7a. However, the coding of such entry changes as required by the particular type of target system being emulated. For example, such coding will specify different time slot mask codes, etc.

Assuming that a valid RWC table entry has been processed and the EXT bit 12 tested, the control store now executes microinstruction 117. As seen from FIG. 9a, this causes the sector code contents of the AG register 206-88 to be loaded into the AF register 206-12 via the SFS selector circuit 206-14. Also, it causes a constant of 01 from the control store to be loaded into AG register 206-88 and the circuit 206-18 to decrement SE counter 206-16 by one. In response to microinstruction 118, the constant contents of AG register 206-88 are loaded into the AF register 206-12 which now stores a value corresponding to the sector code shifted left twice plus a value of 256. The circuit 208-18 increments SE counter 206-16 by 1 and a constant from the control store is loaded into the AG register 206-88 in order to fetch the target system RWC busy status information from location $77_8$ of the RWC table of FIG. 6. In response to microinstruction 119, the sector bits from the table are temporarily stored in sector code location UW2 of the URF of FIG. 2b.

Microinstruction 120 when executed loads the contents of the AG register 206-88 into the AF register 206-12 while microinstruction 121 causes the further transfer of the address from the AF register 206-12 into UN register 202-54. Also, the address register of the LSM is set to address location 30. Microinstruction 122 causes the base value of the I/O tables to be loaded into adder 202-50 from working location UW5 of URF 202-20. The resulting address which corresponds to location 77$_R$ is forwarded to the main store along with a memory signal MMGOP. During the same cycle, the RWC entry from location 30 is loaded into AC register 206-3.

As mentioned previously, location 77$_R$ of the RWC table contains the RWC busy status of the target system of the program being processed. As indicated in FIG. 6, the low order bits of location 77$_R$ store values indicating the current busy status of all target system RWC's and these bits correspond to the RWC busy mask field of FIG. 7a being emulated. In contrast, the RWC busy mask field of the RWC entry represents the particular RWCs that this particular instruction desires to use to execute the particular I/O operation. The firmware using these two values tests whether the I/O operation could have been executed on the particular target system. As FIG. 8b indicates, this test is carried out by performing a logical AND of the low order 16 bits from the RWC table entry (RWC busy mask) for the RWC code and the comparable 16 bits fetched from location 77$_R$ of the I/O table. It then tests if the result of the logical AND is zero. If it is zero, this means that the particular operation can be performed and the processing proceeds.

With reference to FIG. 9a, it will be seen that microinstructions 123 through 129 are used to accomplish the above test. Microinstruction 123 clears bit positions 0 through 15 of the AC register 206-3 and sets the word adder 206-1 to perform a logical product operation. Microinstruction 124 when executed causes the AC register contents to be transferred to AD register 206-5 which allows the status information fetched from location 77$_R$ to be loaded into AC register 206-3 from DN register 202-1 of FIG. 1c. Again bit positions 0 through 15 are cleared to zeros and the result produced by the word adder 206-1 is loaded into AC register 206-3 and the test circuits of the control store test the output of the adder for zero in response to microinstruction 129.

As indicated by FIGS. 8b and 9a, when the adder output is zero, the control store executes microinstruction 130 and returns to the main routine of FIGS. 8a and 10. If any ONE bits cause the adder output not to be zero, this indicates that the particular RWC that the operation would like to utilize is already busy. It will be appreciated that if this instruction was the first input/output instruction to be issued by the target system program since the process was initiated, the RWC busy status field would contain all zeros. Assuming this is the case, the first I/O instruction would also result in the test being positive. In those instances where this was not the first such input/output instruction being issued and the RWC requested was in fact busy, the control store would access microinstruction 131 which is operative to force CF1 control flip-flop to a binary ONE state (see FIG. 2b). In the example given, it is assumed that the fetched RWC entry is coded as indicated in FIG. 7a. This means that both RWC5 and 5a are required for the I/O operation. Unless both of corresponding bit positions of the RWC mask field of location 77$_R$ contain binary ZEROS, the RWC requested is deemed busy. In those instances where the restriction requirement for interlocking the RWCs can be relaxed, the RWC mask field of the entry is altered to specify only one RWC (e.g. only RWC5). This alteration which involves changing the binary ONE in bit 25 to a binary ZERO can be done either by the operating system or by the programmer such as via an instruction introduced from the system console. Thus, when a logical AND of both fields is performed, only RWC5 will be required to be not busy to produce a zero result.

SECTOR TEST ROUTINE

As seen from FIGS. 8b and 10, the control store after performing the above test returns to the main flow of FIG. 8a to perform a sector test. In order to perform this test, the firmware must determine over which sector the I/O operation is to take place. As seen from FIGS. 6 and 11, a sector can be defined by a C1 character (control I/O instructions only), C2 character, or an escape code (CE) character, depending upon the format of the instruction. Because this is a PDT instruction, the next instruction control or variant character must be fetched in order to determine the particular character format (i.e. whether it is a C2 or CE character). First the contents of sequence counter location of the LSM are used to fetch the next portion of the PDT instruction (i.e. 4 bytes) and the particular byte corresponding to the next variant character is selected by SDS selector circuit 206-66 and stored in AB register 206-58. Thereafter, the character is transferred to the AG register 206-88 to perform the required testing.

Figure 8G:
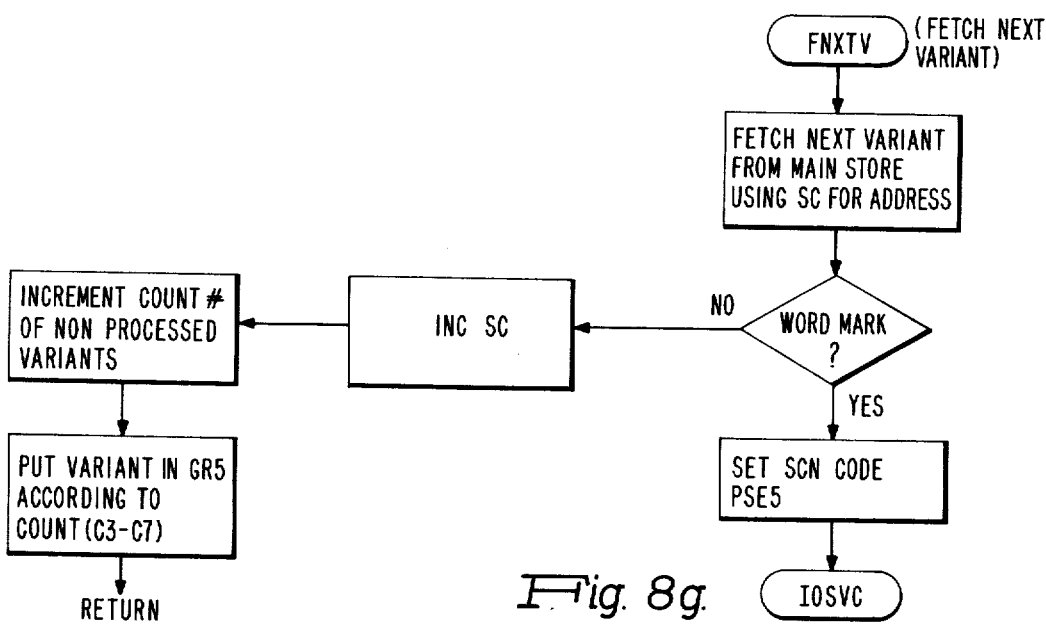
Figure 8H:
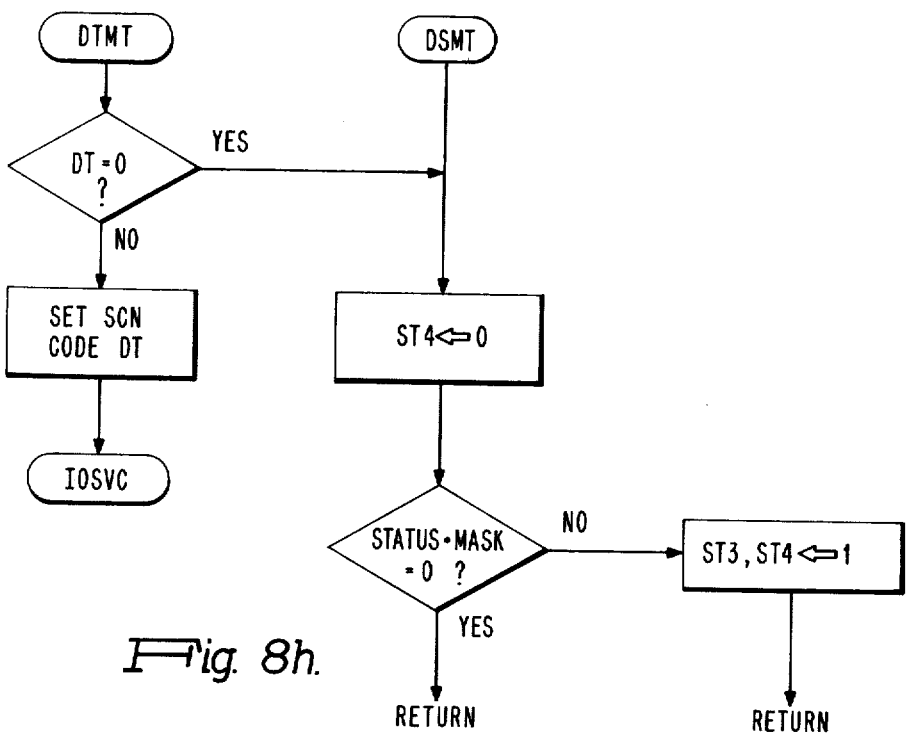
Figure 9C:
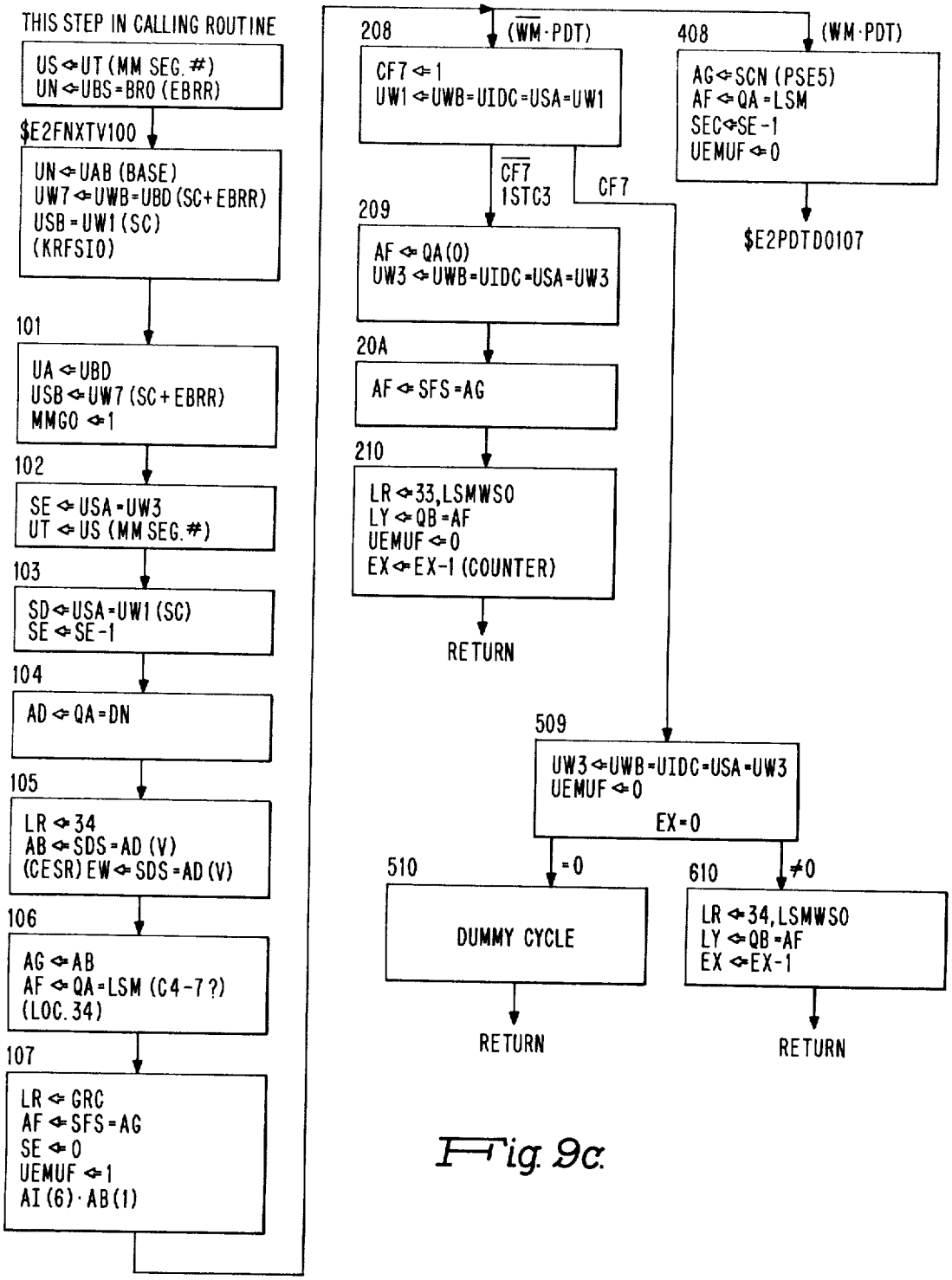

Considering the above in greater detail with reference to FIGS. 8b and 9b, the microinstructions 105 and 106 are executed and cause the next 4 bytes of the I/O instruction stored in the target system main memory areato be fetched using the sequence counter address contents (SC). That is, the main memory segment number applied to US register 202-7 from the UT register 202-9 causes the base number value for that sector stored in UAB associative memory 202-5 of FIG. 2e to be loaded into UN register 202-54. Also, the address of the current microinstruction t1 is loaded into the return branch register 204-12 of the control store of FIG. 2a in response to signal KRFSIO and then the control store branches to the fetch next variant routine of FIGS. 8g and 9c. Microinstructions 101 through 105 perform the operations for producing the memory address. For example, they forward the address generated by UBD adder 202-50 to main store via UA register 202-52. Also, the contents of working location UW3 are loaded into the SE counter 206-16 and the sequence counter address is stored in working location UW1. The bytes fetched from main store are loaded into the AD register 206-5 and then written into working location 34 of the LSM. The first variant character (i.e. C2 or CE character) is selected for examination and loaded into AB and EW registers 206-58 and 206-84. Also, microinstruction 105 generates signal CESRIO which loads the address contents of the return branch register 204-12 into address register 204-9. This returns the control store to the sector test routine of FIG. 9b.

Microinstruction 101 when executed forces a constant of 18 into AG register 206-88 and the SE counter 206-16 to zero. The shifter is set to shift left by six positions. Microinstruction 106 conditions the branch test circuits of FIG. 2a to perform a two way branch based upon the state of word mark bit 1 of AB register 206-58.

Since this is a PDT instruction, there should be no word mark in the variant character since the instruction would be incomplete (i.e. require either a C2 or CE character). If however the variant character does contain a word mark, the control store executes a series of microinstructions in the main routine of FIG. 10 which abort further processing of the instruction and cause the emulator to generate a peripheral specification error (PSE) as explained herein. Assuming there is no word mark, the emulator now begins testing of the value of the high order digit of the variant character stored in AB register 206-58 to determine whether the variant character is a CE or C2 character. In greater detail, microinstruction 103 as shown in FIG. 9b loads the sector code contents of AG register 206-88 into AF register 206-12 and then loads a constant into AG register 206-88. The microinstruction also decrements SE counter 206-16 by 1. Microinstruction 103 tests the state of bit 4 to determine whether the high order digit has a value of 1, 3, 5 or 7. When bit 4 is a binary ONE, the control store branches to microinstruction 204 which tests whether the value of the high order digit is 1, 5 or 3, 7.

Figure 8C:
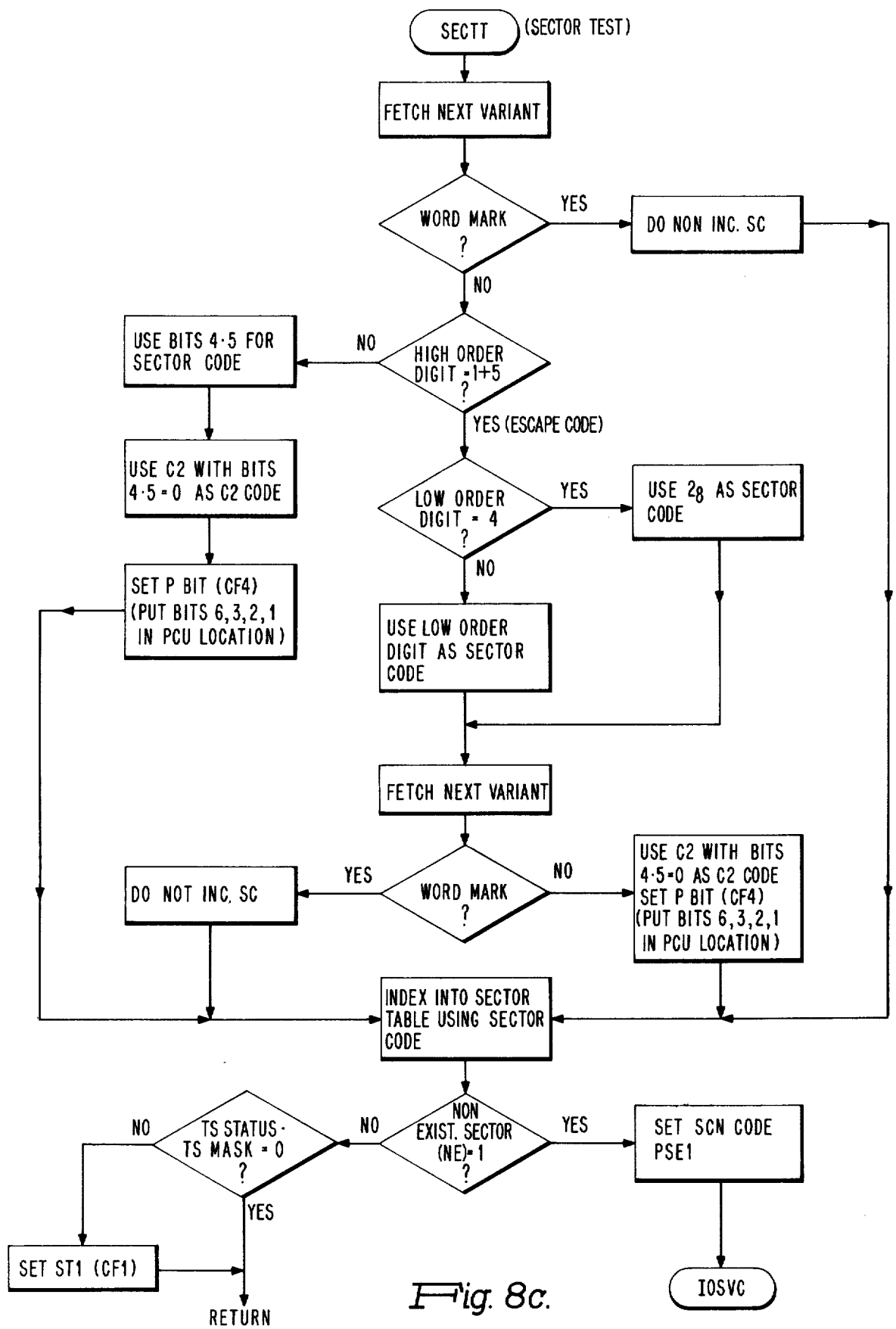

As indicated by FIGS. 8c and 9b, when the octal value is 1 or 5, the character is a CE character. Here, the low order bits (i.e. low order digit) of the variant character define the sector code as indicated by FIGS. 8c and 11. When the low order 3 bits have a value of 4, a sector code of 2 is used. Further, when the high order digit does not have a value of 1 or 5, the character is a C2 character. Here the high order 3 bits (i.e. high order digit) of the variant character define the sector code (see FIGS. 8c and 11).

In greater detail, microinstructions 205, 300–305 perform those operations required for processing an escape code character (CE) character). Microinstructions 505, 105–110 perform those operations required for processing the C2 character.

These operations will be considered in greater detail with particular reference to FIG. 9b. Since there is no word mark, microinstruction 103 is executed which takes the sector code contents X8 stored in AG register 206-88 and loads it to AF register 206-12 via circuit 206-14. The microinstruction also forces a constant of 2 into AG register 206-88 and decrements SE counter 206-16 by 1. Also, the microinstruction causes the control store to execute a two way branch based on the state of bit 4 of AB register 206-58. As mentioned, if the sector code has a value of 1, 3, 5 or 7, microinstructions 204, 205, 505 are then executed to determine whether the value of the sector code is 1, 5 or 3, 7. As seen from FIG. 9b, microinstruction 204 loads the sector code in AG register 206-88 to AF register 206-12 and forces a constant of 27 into AG register 206-88. This allows a test to be made on bit 3 of AB register 206-58 to determine whether the high order digit has a value of 1 or 5 or 3 or 7. If the digit has a value 1 or 5, it is an escape code and the control store then executes microinstruction 205 which begins a sequence including microinstructions 300 through 302 which further test if the low order digit of the escape code has a value of 4. When it does, the control store branches to microinstruction 403 which forces a code of 2 into AG register 206-88. This value is used as the sector code.

When the low order digit does not have a value of 4, the control store sequences to microinstruction 303 which takes the low order digit contents of AG register 206-88 and loads it into AF register 206-12. The AF register contents are then transferred to AE register 206-11 in response to microinstruction 304. Also, the segment number contents of UT register 202-9 are stored in US register 202-7 and the contents of base register location BR0 of the URF are read out into UN register 202-54.

Microinstruction 305 shifts the AE register contents left by 8 and microinstruction 30A transfers the shifted contents into AC register 206-3. Also, the base address stored in UAB associative memory 202-5 is read out into UN register 202-54 and the results generated by UBO adder 202-50 are written into working location UW7 of URF 202-20. The contents of working location UW1 are addressed and applied to USB selector circuit 202-38. Microinstruction 306 causes the updated sector address contents of AC register 206-3 to be written into working location UW2 (i.e. sector code updated). As seen from FIG. 9c, these contents include the sector code shifted left by 4 plus the value 256.

The sector test routine again enters the fetch next variant routine to fetch the next portion of the I/O instruction which includes the remaining control characters (i.e. see FIG. 11). Also, as indicated in FIGS. 8c and 9b, the emulator tests next variant character to determine whether it contains a word mark (i.e. executes microinstruction 308 which tests the state of bit 1 in AB register 206-58). If it does, again this is an incomplete instruction and the emulator handles it in the same manner as described above. Assuming that there is no word mark, the control store executes a series of microinstructions which tests the state of the I/O bit of the C2 character as explained herein.

It is seen from FIGS. 6, 8c and 11 that when the high order digit of the sector code has a value other than 1 or 5, bits 4 and 5 of the C2 character (i.e. bits 3 and 4 of the C2 character in FIG. 11) specify the sector in the target system. Referring to FIG. 9b, it is seen that microinstruction 105 causes shifter 206-30 to shift right the sector code bits transferred into AC register 206-3 and then increment the SE counter by 1. Microinstruction 106 causes the shifted results to be loaded into AC register 206-3, the shifter 206-30 to be set to shift left by 2 the ACU mode flip-flop to be set to a binary ONE and AF register 206-12 to be cleared to zeros. The result generated by byte adder 206-50 is transferred into AG register 206-88 and this result corresponds to certain predetermined bits of the PCU code (i.e. C2 bits 6, 3, 2, 1 in FIG. 6 and C2 bits 2, 5, 6, 7 in FIG. 11).

Microinstruction 107 causes the updated sector address information to be written into working location UW2 of URF 202-20. Also, it loads the PCU bits from AG register 206-88 into AF register 206-12. The microinstruction 107 also tests the state bit position 2 of AB register 206-58 which contains the I/O bit of the C2 character defining the direction of transfer. If this bit is a binary ONE indicating that the data is to be read from a device, the control store branches to microinstruction 208 which transfers the PCU bits to AC register 206-3 and sets the CFO flip-flop to a binary ONE state. Also, the sequence counter address contents of working location UW1 are incremented by 1 and written back into working location 1 in the appropriate address format. When the I/O bit is set to a binary ZERO, then the control store executes microinstruction 108 which carries out similar operations with the exception of setting the CFO flip-flop to a binary ONE.

The control store then reads out microinstructions 109 and 110. Microinstruction 109 transfers the contents of the shifter 206-30 to AC register 206-3 and reads out the contents of working location 2 to the UN register 202-54. Microinstruction 110 causes the AC contents which contains the PCU code shifted left by 2 to be written into working location 3o of URF 202-20. Also, the CF4 flip-flop is set to a binary ONE.

As seen from FIG. 9b, a series of operations similar to the above are performed in response to microinstructions 309 through 311 which also result in the PCU code bits being written into working location 3 of URF 202-20 in response to microinstruction 110.

Referring to FIGS. 8c and 9b, it is seen that following the completion of testing the sector code bits of the variant characters, the firmware beginning with microinstruction 111 indexes into the sector table using the sector code previously obtained. Microinstruction 111 causes the contents of working location UW5 containing the I/O table segment information to be applied to the USB selector circuit 202-38. Microinstruction 112 conditions the LSM for read out of the contents of working location 30 which contains the previously fetched RWC table entry.

Microinstruction 113 causes the RWC table entry contents to be read out into AD register 206-5 and microinstruction 120 when executed conditions shifter 206-30 to shift its contents left 13 and also loads the sector table entry contents of DN register 201-1 into AC and AE registers 206-3 and 206-71 of word adder 206-1. Following this, microinstruction 121 when executed loads the sector table shifted bits into AE register 206-11.

The sector table entry fetched from the sector table of FIG. 6 has the format shown in FIG. 7b. The time slot status bits 0 through 5 of the entry are loaded into AA register 206-52 of byte adder 206-50 via the SCS selector circuit 206-55. The time slot mask bits which correspond to bits 0 through 5 of the RWC entry previously stored in AB register 206-58 are loaded into AB register 206-58 via SDS selector circuit 206-66. Next, microinstruction 122 causes the result produced by byte adder 206-50 to be stored in AG register 206-88 and conditions the LSM for addressing working location 31 for storing the fetched sector table entry.

Microinstruction 123 conditions the LSM for read out of the contents of working location GRC and forces SE counter 206-16 to zeros. Also, the microinstruction tests the state of bit position 0 of AE register 206-11 to verify whether the particular sector specified does exist in the target system. This bit position stores bit 13 of the sector table entry which was previously loaded into AE register and shifted left 13 positions.

As seen from FIG. 9b, the control store branches to microinstruction 224 when bit 13 is set to a binary ONE. Microinstruction 224 forces a predetermined constant (i.e. PSE 1) into AG register 206-88. This constant is coded to indicate to the ESP that the PDT instruction specifies a non-existent sector and hence the instruction is illegal for the target system it represents. This code is written into the SCN field of location GRC of the LSM. Also, counter SE 206-16 is decremented by 1 and the contents of working location UW3 are cleared to zeros. The firmware then terminates processing of the instruction and enters the I/O service routine.

Assuming that bit 13 is a binary ZERO indicating an existing sector, the control store sequences to microinstruction 124 which tests the results of the time slot busy test. Again, this test is performed in the same manner as the RWC busy test. That is, the byte adder 206-50 performs a logical AND of the time slot status from the sector table entry and the time slot mask bits from the previously fetched RWC table entry. Microinstruction 124 tests the results of the logical AND and when byte adder 206-50 does not poduce an all zero result (i.e. set flip-flop 206-75 to a binary ONE), the control store sequences to microinstruction 125. This microinstruction sets the state of control CF1 flip-flop to a binary ONE indicating that there are not sufficient time slots to perform the instruction from the target system program (i.e. time slots are busy). Microinstruction 125 also clears SE counter 206-16 to zeros and the control store returns to the main routine of FIG. 8a. Assuming that there are sufficient time slots, the control store branches to microinstruction 225 which sets SE counter 206-16 to zeros and returns to the main routine without setting the CF1 flip-flop.

In the example assumed, there are two time slots required for the 167K characters per second rate. This means that the two designated time slots required must be designated in the time slot status field as being available (i.e. the field must contain zeros in those time slots positions). When the time slots on either sector 2 or 2A are indicated as being busy, then the emulator will signal that the instruction cannot be executed.

In a manner similar to that described, the contents of the time slot mask can be altered to relax the sector traffic limits required by the program. For example, after it is determined that it is not necessary to the proper operation of the program that the sector traffic limits required by the time slot mask be enforced, these restrictions can be removed by inserting zeros in the mask. Therefore, when the emulator accesses the sector table entry and performs a logical AND of all zeros against the time slot status bits the result will always indicate that there are time slots available. Thus, the time slot traffic limits of a sector would be removed.

Continuing on with the above example, it is seen from FIG. 8a that the main routine first tests the state of one of the control flip-flops (i.e. CF4) (i.e. see microinstruction 106 of FIG. 10) to determine whether in fact a PCU had been defined in the instruction (i.e. the PDT instruction contained a C2 character) and as such processing should proceed. Since it has been assumed previously that the proceed CF4 flip-flop was set to a binary ONE (i.e. P=1 in FIG. 8a), the control store enters a PCU status routine. It is seen from FIG. 8a that in the event the CF4 flip-flop had not been switched to a binary ONE, the control store references microinstructions (e.g. microinstructions 106–108 of FIG. 10) for setting a predetermined code (PSE3) the SCN field of working location GRC of the LSM indicating that no PCU had been specified (i.e. see FIG. 4). Thereafter, the emulator terminates processing of the PDT instruction via the I/O service routine.

PCU STATUS FETCH ROUTINE

Figure 8D:
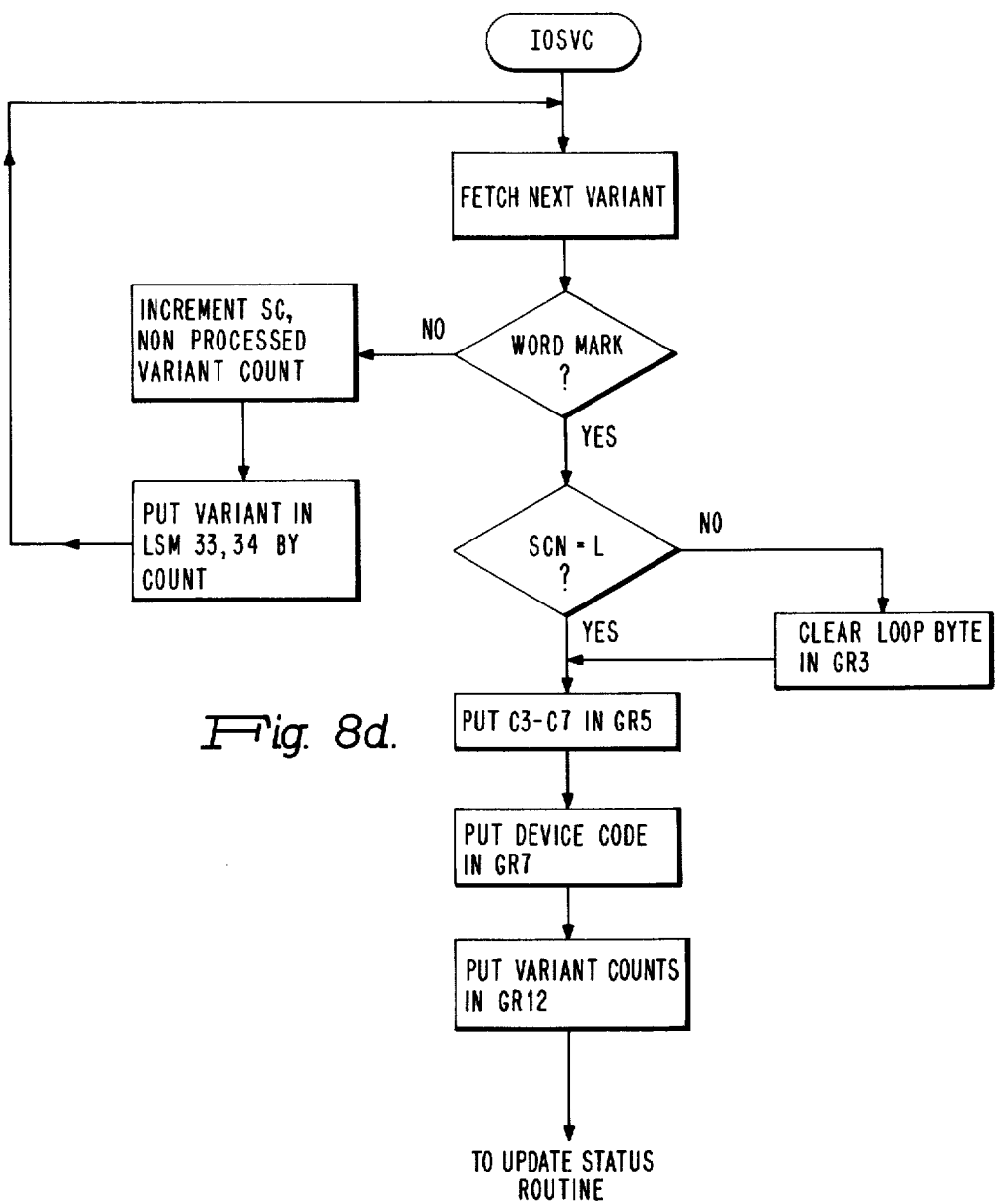

The PCU Status Fetch Routine causes operations similar to those described above to take place which results in the fetching of a PCU table entry from the PCU table associated with a particular sector. Although the sector table allows for 8 entries, there are actually only a maximum of 6 sectors for a given target system (i.e. sectors 1, 2A, 2B, 2C, 2D and 3. As indicated by FIG. 8d, the PCU status fetch routine indexes into the PCU table using the PCU code obtained from the C2 character. The various operations are shown in greater detail in FIG. 9d.

Figure 9D:
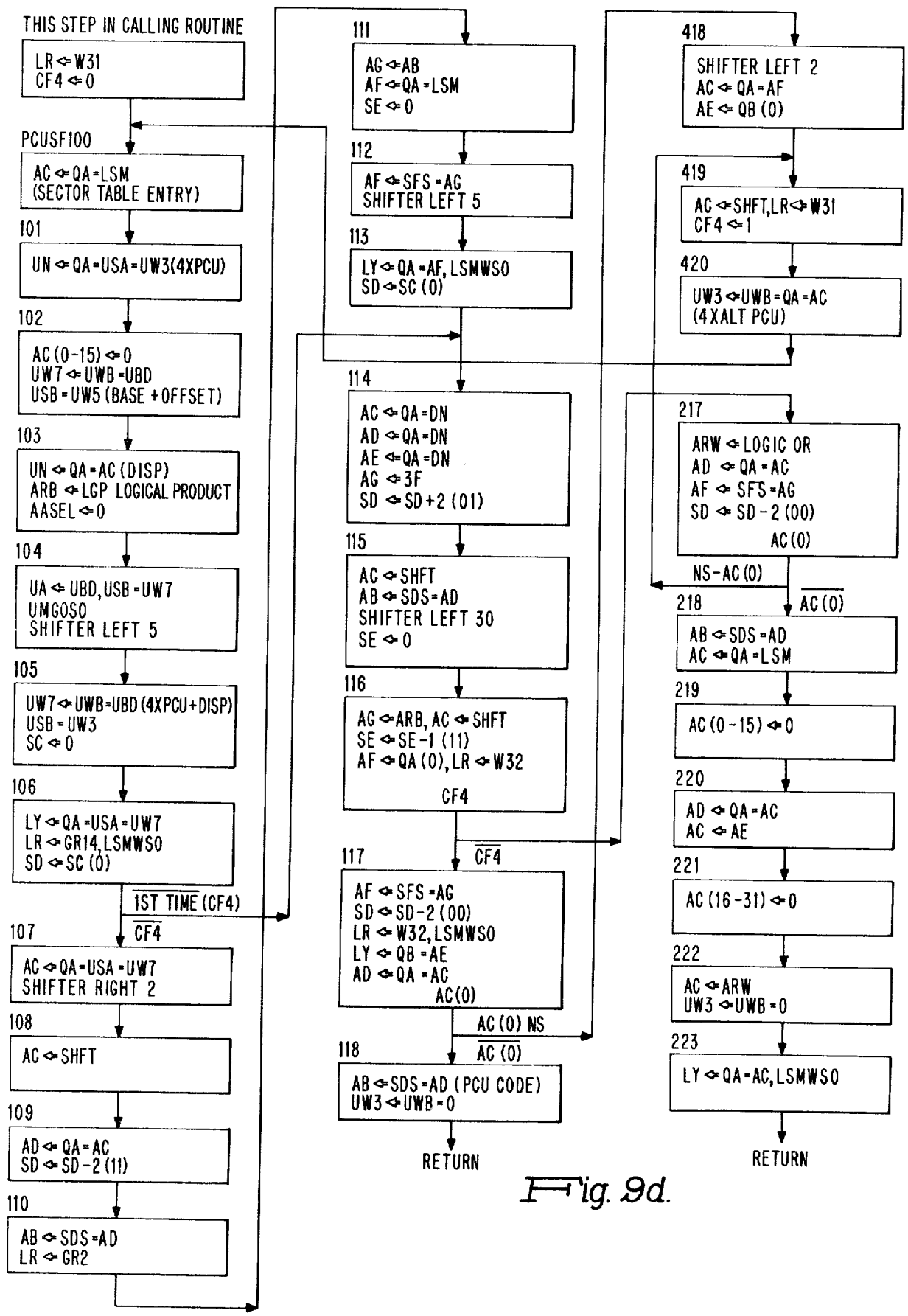

Referring to FIG. 9d, it is seen that the calling routine (i.e. main routine of FIG. 10) executes microinstruction 100 which conditions the LSM for read out of the contents of working location W31 which contains the sector table entry. Also, the microinstruction causes the CF4 flip-flop to switch to a binary ZERO. Next, the control store reads out microinstruction 100 of the PCU status fetch routine which when executed transfers the sector contents of working location W31 into AC register 206-3. Microinstruction 101 reads out the PCU code contents of working location UW3 (i.e. value 4X PCU) of URF 202-20 into UN register 202-54. Microinstruction 102 forces the first 16 bits of AC register 206-3 to zeros and conditions URF 202-20 for addressing working location UW7 to store the value from UW3. Also, the base plus offset values contained in working location UW5 are applied to USB selector 202-38. Microinstruction 103 when executed transfers the displacement value of the sector table entry stored in AC register 206-3 to UN register 202-54 (i.e. bits 16 through 31 as shown in FIG. 7b). Also, the microinstruction sets byte adder 206-50 to perform a logical product operation and forces the AA selector circuit 206-54 to zero (e.g. resets sel. flip-flop).

Microinstruction 104 causes the index address sum produced by the UBD adder (i.e. 4XPCU + displacement) to be loaded into UA register 202-52 for forwarding to the main store along with memory control signal UMGOSO. Also, the USB selector circuit 202-38 is set to read out the contents of working location UW7 and shifter 206-30 is set to shift left 5 positions. Next, microinstruction 105 when executed conditions URF 202-20 for storing the index value produced by UBD adder 202-50 into working location UW7. The USB selector circuit 202-38 is then set to select the PCU code contents of working location UW3 for read out and the SC counter contents are forced to zeros. Microinstruction 106 when executed loads LY local register 207-9 of LSM 207-1 with the index contents of working location UW7 and writes the calculated index value into location GR14. Also, the microinstruction transfers the zero contents of SC counter 206-62 to SD pointer register 206-60 and tests the state of the CF4 flip-flop to determine whether this is the first time through this sequence of microinstructions.

Because the CF4 flip-flop is a binary ZERO, the control store reads out microinstruction 107 which when executed fetches the index contents of working location 7 and transfers them to AC register 206-3. Additionally, shifter 206-30 is set to shift right by two positions. Microinstruction 108 takes the shifted contents and returns them to AC register 206-3 while microinstruction 109 transfers the contents of AC register 206-3 to AD register 206-5 and decrements SD pointer register 206-60 by 2. Next, microinstruction 110 when executed sets SDS selector circuit 206-62 to apply the character contents specified by the SD pointer register (i.e. low order byte of the index value) from AD register 206-5 into AB register 206-58. Also, the LSM is conditioned to address location GR2.

Microinstruction 111 when executed transfers the PCU code contents of AB register 206-58 into AG register 206-88 and the contents of the addressed LSM location into AF register 206-12. Also, SE register 206-16 is forced to zeros. Microinstruction 112 transfers the PCU contents of AG register 206-88 to AF register 206-12 and sets shifter 206-30 to shift left by 5 positions. Following that, microinstruction 113 transfers the shifted PCU contents of AF register 206-12 into LY local register 207-9 of LSM 207-1 and stores them in location GR2. Also, SC and SD registers 206-62 and 206-60 are forced to zeros. This completes the loading of the PCU ID code into the high order byte position of location GR2 (see FIG. 4).

The PCU table entry fetched from main store and loaded into DN register 201-1 is also loaded into AC, AD and AE registers 206-3, 206-5 and 206-11 in response to microinstruction 114. Additionally, microinstruction 114 forces a constant 3f into AG register 206-88 and increments SD register 206-60 by 2. Next, microinstruction 115 transfers the contents of shifter 206-30 into AC register 206-3.

It also loads the high order byte of the PCU table entry into AB register 206-58 via SDS selector circuit 206-66. Shifter 206-30 is set to shift left 30 and SE register 206-16 is cleared to zeros. Microinstruction 116 causes the result of byte adder 206-50 to be loaded into AG register 206-88 and the shifted contents to be stored in AC register 206-3. The SC register contents are decremented by 1 via circuit 206-63 and AF register 206-12 is cleared. Also, LSM 207-1 is conditioned to address the contents of working location W32. Lastly, the state of the CF4 flip-flop is tested and since it is a binary ZERO, the control store next reads out microinstruction 117.

Microinstruction 117 when executed transfers the contents of AG register 206-88 to AF register 206-12 and forces SD register 206-60 to zeros. The PCU table entry stored in AE register 206-11 is then loaded into LY register 207-9 via the QB bus and then written into working location 32.

Figure 8E:
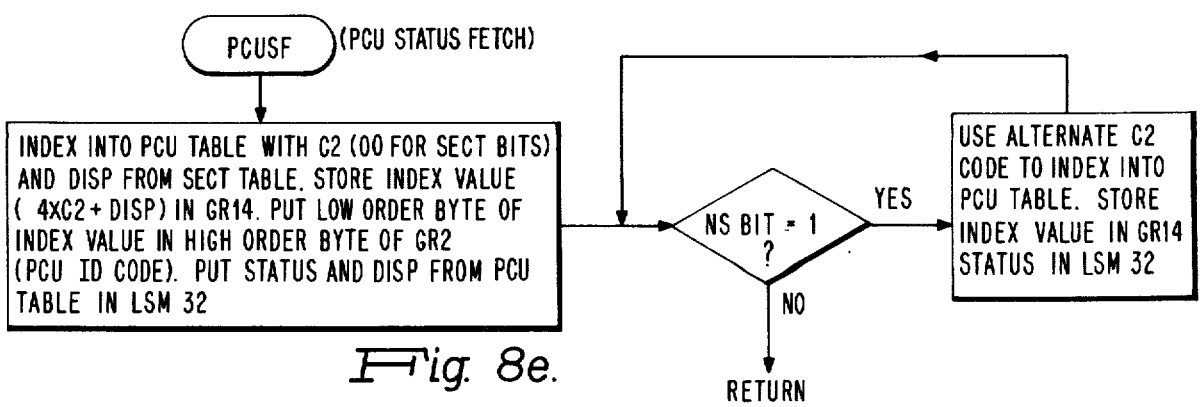

Microinstruction 117 also loads the contents of AC register 206-3 into AD register 206-5 and tests the same AC register contents for zeros. This is done as indicated by FIG. 8e to determine whether or not an alternate C2 code is to be used to index into the PCU table. If NS status bit 5 (see FIG. 7c) is set to a binary ONE, the result equals zeros and the control store branches to microinstruction 418 which when executed arranges the alternate C2 code bits of the PCU table entry so as to index into the PCU table. As seen from FIG. 9d, microinstructions 419 and 420 are executed and then the alternate C2 code is used to index into the table by repeating those operations described previously. When no alternate code is specified which means that AC does not equal zero, the control store fetches microinstruction 118. This microinstruction causes the PCU code bits stored in AD register 206-5 to be loaded into AB register 206-58 via the SDS selector circuit 206-66. Also, working location UW3 is cleared to zeros. Following this, the PCU status fetch routine returns to the main routine of FIG. 8a. Microinstructions 217 through 223 are executed when processing the alternate C2 code after the first time through the PCU status fetch routine and perform operations similar to those performed by microinstructions 115 through 118.

As mentioned previously, the alternate PCU code is used to restrict the target system to a single level of simultaneity. When the program to run properly does not require a single level of simultaneity to exist, then this constraint can be relaxed. This is done by changing the coding of certain bits of the entries in the PCU table so that each PCU address has its own busy status, interrupt bits and thus can support two simultaneous operations. For example, some target systems include a card reader/punch which are assigned two addresses, a read address and a write address. However because both devices share a common control unit, both operations cannot be done at the same time (i.e. single level of simultaneity). Where the target system program was written to take advantage of this arrangement to obtain some kind of interlock for enabling the program to run properly, then the alternate PCU code arrangement provided would have to be enforced by the emulator in the host system. Thus in this situation, the NS bit 5 in the PCU table entry will be set to a binary ONE. This requires testing of a common busy bit to determine whether the instruction can be executed.

Where it is not important to the target system program that this constraint be imposed, it can be relaxed. To relax it, the contents of the particular entry using the alternate PCU code (i.e. bits 10–15) are changed. Specifically, the NS bit 5 in the entry is set to a binary ZERO. This means that all the busy status and interrupt status bits are now usable/valid for the entry. The ESP will update the state of the busy bits 7 of the appropriate entry each time the operation is performed. Thus, the emulator will not be emulating a card read operation interlocked with a card punch operation. Of course, in terms of the target system, the changing of the entry is equivalent to including two separate control units, one of each device, with each unit having separate status indicators. It will be obvious that similar changes can be made for relaxing such constraints imposed upon other types of target system devices.

Referring to FIG. 10, it is seen that following the above test, the main routine then executes microinstructions which condition LSM 207-1 to read out the contents of location GRC and the branch test circuits to perform a N way branch based on the hexidecimal value of the code stored in AB register 206-58. Specifically, bits 2 through 5 of AB register 206-58 are used to condition the control store branch test logic circuits to select one of N microinstructions for completing the processing of the PDT instruction. It will be seen from FIG. 8a that depending upon the type of device, a microinstruction is executed which causes a particular code to be stored in the SCN field of working location GRC (See FIG. 4). It will be also noted from FIG. 10 that if the device is non-existent, (i.e. has a hexidecimal value of ZERO), a microinstruction 2200 is executed which forces a code "PSE2" (i.e. 11111010) into AG register 206-88 indicating that the PDT specified no PCU. Thereafter, the emulator calls the ESP via the I/O service routine of FIG. 8b. In the cases where hexidecimal codes a through f are designated indicative of a special case unit, the microinstructions indicated in FIG. 10 are executed which store indications of the states of control flip-flops CF-1 through CF-3 into AG register 206-88 for writing into location GRC of LSM 207-1 (i.e. 11000, ST1, ST2, ST3).

Assuming by way of example that the PCU is a mass storage device, the microinstruction 2205 of FIG. 10 is executed which sets a code of 98 (M) into AG register 216-88. Also, the CF5 flip-flop is set to a binary ONE and SE register 206-16 is decremented by 1. The main routine microinstructions 100 and 101 are then executed which transfers the coded AG register contents to AF register 206-12 and writes them into the SCN code field location GRC of the LSM (i.e. see FIG. 4). Next, the main routine enters a control unit busy test routine of FIG. 8f.

CONTROL UNIT BUSY TEST ROUTINE

Figure 9H:
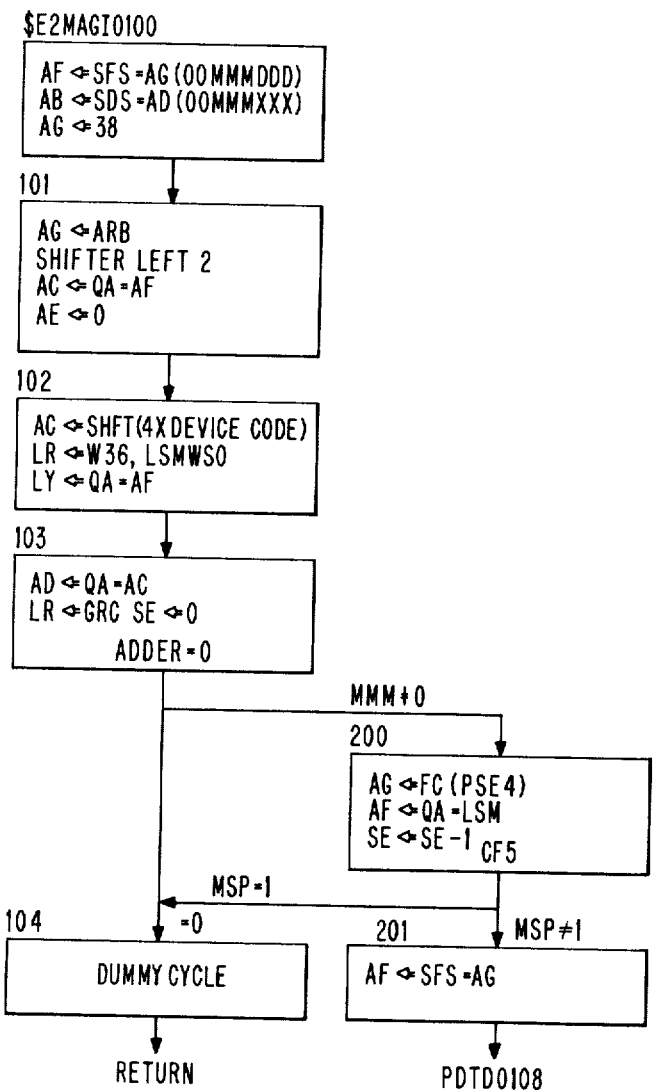
Figure 9E:
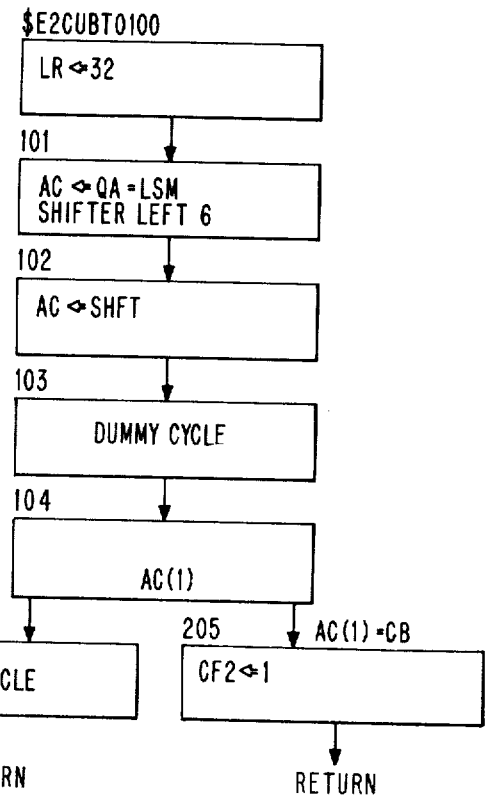
Figure 9F:
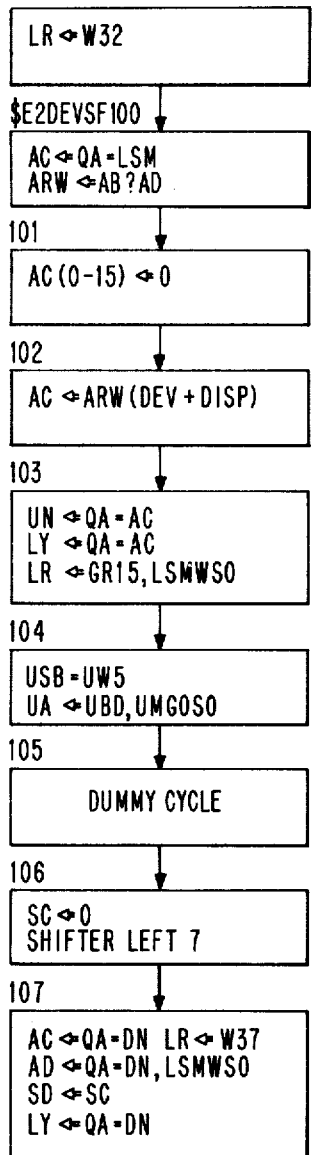

The control unit busy test routine tests the state of the busy status bit 7 of the PCU table entry (i.e., see FIG. 7c) and is disclosed in FIGS. 8f and 9e. Referring to FIG. 9e, it is seen that microinstruction 100 which executed conditions the LSM for read out of the PCU table entry contents from location 32. Microinstruction 101 when executed transfers the contents of location 32 into AC register 206-3 via the QA bus and conditions shifter 206-30 to shift left 6 positions. Microinstruction 102 when executed loads the shifter contents into the AC register 206-3. Microinstructions 103 and 104 are executed with microinstruction 105 causing a branch to be executed based on the state of bit position 1 of AC register 206-3. This bit position stores bit 7 of the PCU table entry. When bit 7 is set to a binary ONE, this indicates that the device control unit is busy which results in the control store branching to microinstruction 205. This microinstruction in turn sets the CF2 flip-flop to a binary ONE and then returns the control store to the main routine. When the device control unit is not busy (i.e. bit 7 = 0), the control store references microinstruction 105 and then returns to the main routine.

Assuming that the device PCU is not busy, it is seen from FIGS. 8a and 10 that the emulator enters the fetch next variant routine of FIG. 8g. This routine as mentioned previously fetches a next portion of the I/O instruction being processed using the address stored in the sequence counter location. Also, it tests for a word mark as illustrated in FIG. 8g. When no word mark is encountered, the sequence counter and count for number of nonprocessed variant characters are incremented and a return is made to the main routine after storing the variant characters in location GR5.

Considering the above operations in greater detail with reference to FIG. 9c, it is seen that the microinstructions 100–105 fetch the next portion of the PDT instruction in the manner as mentioned previously. Microinstruction 106 when executed stores the variant characters in location 34 of LSM 207-1 and loads the next character (e.g. C3 character) from AB register 206-58 to AG register 206-88. During the next cycle bit position 6 (i.e. PDT op code) and bit position 1 (word mark bit) of the AI register 206-20 and AB register 206-58 are tested by microinstruction 107 to determine the presence of a word mark. When both bits are binary ONES, the control store branches to microinstruction 408. This microinstruction when executed causes a predetermined code (i.e. 11111101) to be loaded into AG register 206-88 termed PSE 5 indicating that the instruction contains an insufficient C3 variant character string (i.e. no C3 character as required for this type of device). Also, the contents of LSM location 34 are read out and loaded into AF register 206-12 via the QA bus and SE register 206-16 is decremented by 1. The control store returns to the main routine of FIG. 10 whereupon it executes microinstructions 107 and 108 and then the I/O service routine. This causes the code stored in AG register 206-88 to be loaded into AF register 206-12 via SFS selector circuit 206-14 and then written into location GRC of LSM 207-1.

In the absence of a word mark, the control store executes microinstruction 208 which forces the CF7 flip-flop to a binary ONE and increments the sequence counter contents by 1 and returns the incremented value to working location UW1 of URF 202-20. During a first time through the sequence, microinstruction 107 causes the control store to sequence to microinstruction 209 (i.e., CF7 flip-flop not considered previously set to a binary ONE). This microinstruction when executed clears AF register 206-12 to zero and increments a count contained in working location UW3. Microinstructions 20A and 210 when executed load the C3 variant character into AF register 206-12 via SFS selector circuit 206-14 and write the C3 character into location 33 of the LSM. Also, the contents of EX counter 206-12 are decremented by 1 during this cycle of operation and the control store returns to the main routine.

From FIGS. 8a and 10, it is seen that the C3 variant character is tested for a specific value (i.e. value of 4) to determine whether the instruction requires an actual data transfer or is specifying a load or store address register operation wherein an address register in main store are loaded with the A address specified by the data transfer instruction (i.e. see FIG. 7d) and do not require an actual I/O transfer. In the target system an instruction was required to transfer such address information since the address register was not located in main store but in the control unit.

It is assumed that the C3 character does not have a code of 4 and the contents of the address register which include device and magazine information previously loaded are fetched from the PCU extension table which contains information such as that shown in FIG. 7d.

The above operations will now be considered in greater detail. With reference to FIG. 10, it is seen that microinstructions 103 through 108 condition the byte adder circuit 206-50 via AS register 206-57 to perform a binary subtract operation for determining whether the C3 character has a value of 04. Also, the microinstructions cause the word adder to be conditioned for a binary subtract operation for deriving an address from PCU table entry fetched from location 32 of the LSM which used to fetch the magazine and device code contents from third word position of the mass storage PCU extension table of FIG. 6. This table is illustrated in greater detail in FIG. 7d. Microinstruction 108 when executed tests the results of the byte adder subtraction and when it is zero (i.e. C3 = 04), the control store branches to microinstruction 2100. Assuming that it is not zero in this example, the control store executes microinstruction 109 which transfers the PCU table address into UN register 202-54 and forces SC register 206-62 to zero.

Microinstruction 110 causes UBD adder 202-50 to add the base value stored in working location UW5 to the contents of UN register 202-54. The result is then loaded into the UA register 202-52 and forwarded to the main store. Also, SD register 202-60 is cleared to zero. Microinstruction 111 when executed conditions word adder 206-1 to perform a logical product operation and increments SC register 206-62 by 2. Microinstruction 112 conditions the shifter to shift left 13 positions and microinstruction 113 when executed loads the PCU extension table entry fetched from main store into AD and AC registers 206-5 and 206-3 in addition to forcing a constant 07 into AG register 206-88. After microinstruction 114 causes bit positions 16-31 of AC register 206-3 to be cleared to zeros, microinstruction 115 when executed loads the byte containing the device code into AB register 206-58 via SDS selector circuit 206-66. It also conditions shifter 206-30 to shift right 10 positions and loads the shifted contents into AC register 206-3.

Microinstruction 116 when executed loads the result (i.e. 000DDD) produced by byte adder circuit 206-50 into AB register 206-58, the shifted contents into AC register 206-3, conditions byte adder 206-50 to perform a logical OR operation and increments the SD register 206-60 contents by 2. Microinstruction 117 when executed causes the byte specified by the contents of SC register 206-62 to be loaded into AA register 206-52 from AC register 206-3 via SCS selector circuit 206-65. Also, at this time, the shifted contents of AC register 206-3 are loaded into AD register 206-5 via the QA bus and the selector flip-flop is set to a binary ONE. The result (i.e., MMMDDD) of the logical OR performed by adder circuit 206-50 on the contents of AB and AA registers 206-58 and 206-52 is loaded into AG register 206-88. Also, byte adder 206-50 is conditioned to perform a logical product operation, AF register 206-12 is cleared to zero and the select flip-flop is reset to a binary ZERO state. This completes this portion of the main routine and next the control store enters the magazine test routine of FIG. 8i.

MAGAZINE TEST ROUTINE

This routine shown in greater detail in FIG. 9e is used to generate the proper device code. Referring to FIG. 9h, it is seen that microinstruction 100 when executed loads the contents of AG register 206-88 into AF register 206-12 and the contents of AD register 206-5 into AB register 206-58. Also, microinstruction 100 forces a constant of 38 into AG register 206-88. Microinstruction 101 when executed returns the result generated by byte adder circuit 206-50 into AG register 206-88 and sets the shifter 206-30 to shift left twice. Also, it loads the contents of AF register 206-12 into AC register 206-3 and clears AE register 206-11 to zero. Microinstruction 102 when executed loads AC register 206-3 with the shifted device code bits and conditions LSM 207-1 to address location 36 and write the mass storage device code from AF register 206-12 therein (see FIG. 4).

Microinstruction 103 when executed loads the contents of AC register 206-3 into AD register 206-5 via the QA bus, and conditions LSM 207-1 for addressing location GRC. Also, it forces SE register 206-16 to zeros and conditions the control store circuits to execute a branch based on the result produced by the byte adder 206-50 (i.e., state of flip-flop 206-75). If the byte adder result is not zero, the control store branches to microinstruction 200 which is operative to force a predetermined code (i.e. 11111100, designated PSE4) into AG register 206-88 which is to be written into location GRC of the LSM (see FIG. 4). Also, SE register 206-16 is decemented by 1. The PSE4 code indicates the use of an illegal/magazine code for a mass storage device. However, before being actually written into the location, the state of the CF5 flip-flop is tested via microinstruction 200. Since the flip-flop will have been set to a binary ONE (i.e. see FIG. 8a) the control store branches to microinstruction 104 and returns to the main routine as shown in FIG. 9h. When CF5 flip-flop is not set to a binary ONE, the control store executes microinstruction 201 which transfers the PSE4 code stored in AG register 206-88 to AF register 206-14. The control store executes microinstruction 108 of FIG. 10 which writes the PSE4 code into location GRC. The firmware then enters the service call routine. Since it is assumed that the mass storage device code is legal, the main routine then enters the device status fetch routine of FIG. 8f after executing microinstruction 119 of FIG. 10.

DEVICE STATUS FETCH ROUTINE

As seen from FIG. 8j, this routine is used to index into the device table utilizing the specified device code and displacement value obtained from the PCU table entry stored in location W32 of LSM 207-1. This routine is shown in greater detail in FIG. 9f. Referring to that Figure, it is seen that microinstruction 100 when executed loads the PCU contents of location W32 (i.e., see FIG. 7c) into AC register 206-3 via the QA bus and applies the specified device code from AD register 206-5 to word adder 206-1. Microinstruction 101 when executed clears the low order 16 bits of AC register 206-3 and microinstruction 102 loads the result produced by adder 206-1 into AC register 206-3. Microinstruction 103 when executed loads the contents of AC register 206-3 into UN register 202-54 and LY register 207-9. Additionally, the device plus displacement index value contents are written into location GR15 of the LSM 207-1 (see FIG. 4).

Microinstruction 104 when executed applies the base value contents of working location UW5 to USB selector circuit 202-38 for addition to the index value generated by adder circuit 202-50. Also, the result is loaded into UA register 202-52 and a main store cycle is initiated by forcing signal UMGOSO to a binary ONE. Microinstruction 106 conditions shifter 206-30 to shift left by 7 positions and microinstruction 107 when executed loads the entry fetched from the device table of FIG. 6 into AC register 206-3 and AD register 206-5. Also, during this cycle, the device table entry is written into location W37 of LSM 207-1. The device status fetch routine then returns to the main routine.

As seen from FIGS. 8a and 10, the control store executes a microinstruction 103 which forces a predetermined constant (80) into AG register 206-88, loads the contents of shifter 206-30 into AC register 206-3 and loads the status bits from AD register 206-5 (see FIG. 7f) into AB register 206-58 via SDS selector circuit 206-66. Next, the emulator enters the device trap and status routine of FIG. 8h.

DEVICE TRAP AND STATUS TEST ROUTINE

Figure 9G:
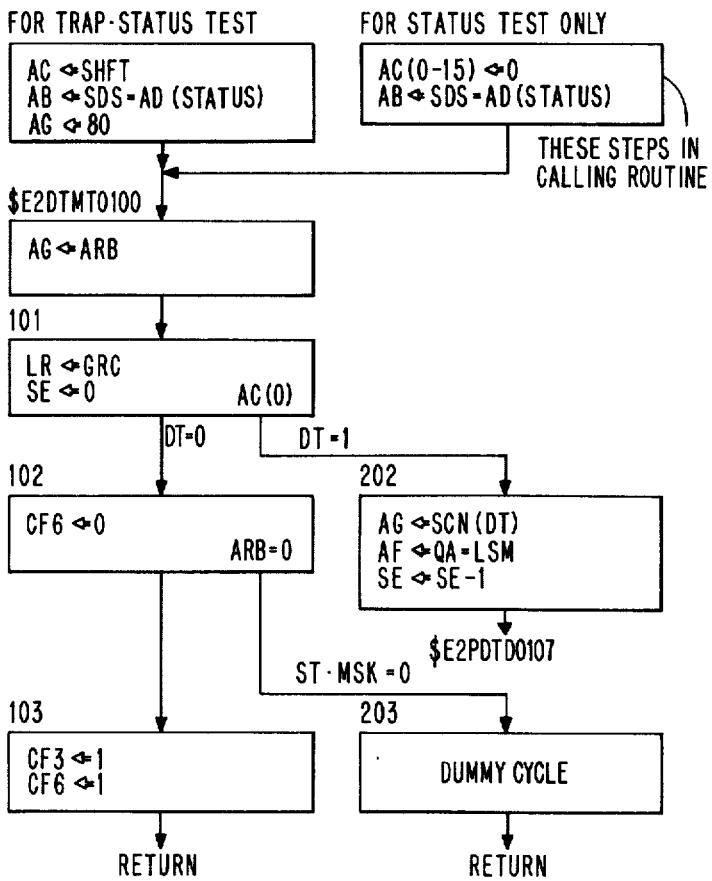

This routine tests to determine if the specified device is busy and the operations performed by the routine are shown in greater detail in FIG. 9g. Referring to that Figure, it is seen that microinstruction 100 when executed loads AG register 206-88 with the result produced by byte adder circuit 206-50 and microinstruction 101 causes location GRC of LSM 207-1 to be addressed in addition to forcing SE register 206-16 to zero. Also, microinstruction 101 conditions the branch test circuits to test the state of bit position 0 of the AC register 206-3. This tests the state of bit 7 of the device entry which is normally a binary ZERO unless the instructions addressed to this device are required to be trapped to the ESP for further processing. When this bit is a binary ONE, the control store branches to microinstruction 202 which when executed forces a predetermined code (i.e. 11001000 designated as DT) into AG register 206-88, transfers the contents of location GRC to the AF register 206-12 and decrements SE register 206-16 by 1. The firmware returns to the main routine of FIG. 10 wherein it executes microinstruction 107 which writes the contents of AF register 206-12 into location GRC.

Assuming that the device trap bit 7 is a binary ZERO, the control store executes microinstruction 102 which forces the CF6 flip-flop to a binary ZERO and conditions the branch test circuits to test the result produced by byte adder circuit 206-50 via circuit 206-75. That is, bits 0 through 7 of the device entry (see FIG. 7f) are masked with a constant 80 stored in AG register 206-88 to test the state of bit 0 which is the busy bit. The byte adder circuit 206-50 performs a logical product operation upon these bits (i.e. conditioned previously) and when the result is zero, this indicates that the device is not busy. If it is not busy, the control store branches to microinstruction 203 and returns to the main routine of FIG. 10. When the device is busy, the control store executes microinstruction 103 which forces both the CF3 and CF6 flip-flops to binary ONES and then returns to the main routine.

From FIG. 10, it is seen that the control store executes microinstructions 104 and 105 which condition LSM 207-1 to read out the contents of location GRC into AF register 206-12, decrement SE register 206-16 by 1 and load AG register 206-88 with a constant. Microinstruction 105 also causes the branch test circuits to test the states of the CF1-3 flip-flops. When all of the flip-flops are binary ZEROS, this means that the I/O instruction can be executed and the control store branches to microinstruction 206 and returns directly to the I/O service call routine. In the event that any one of these flip-flops does not equal zero, the firmware executes microinstructions 106 and 107 which load the contents of AG register 206-88 and bits indicating the states of the CF1-3 flip-flops into predetermined bit positions of the SCN field portion of location GRC of LSM 209-1 (see FIG. 4). Referring to FIG. 4, it is seen that indications of the states of the CF1-3 flip-flops are stored as bits 5–7 of the SCN field. When the emulator sets bit 5 designated as RWCB to a binary ONE, this signals the ESP that the RWC is busy. When bit 6 designated PCUR is set to a binary ONE, this signals the ESP that a PCU is busy or in the case of a control I/O instruction that there was a positive response to an interrupt query. Lastly, when bit 7 designated DEVR is set to a binary ONE, this signals the ESP that the device is busy or in the case of a control I/O instruction that there was a positive response to a device related inquiry.

I/O SERVICE CALL ROUTINE

As soon as the firmware completes the processing of I/O instruction, it enters the I/O service routine of FIG. 8d. It is this routine which is used to fetch the remaining variant control characters of the PDT instruction and load the approriate information into the respective locations of LSM 207-1. As seen from FIG. 8d, this routine returns to the fetch next variant routine which fetches the remaining variant characters in the manner described previously and loads them into the appropriate locations of LSM 207-1 (see FIG. 4). When the firmware detects a word mark signalling that all of the variant characters have been fetched from the target system main memory, the remaining microinstructions when executed load the pertinent portions of the PDT instruction processed into the locations of LSM previously indicated by FIG. 4 and FIG. 8d. This completes the processing of the PDT instruction whereupon the firmware signals the ESP by having the control store access microinstructions starting at a predetermined location. These microinstructions when executed fetch the next native instruction following the instruction which placed the system in an emulation mode. Also, at this time, the flip-flops associated with the mode are reset. By having the firmware return to the portion of the control store used by the system when it is not executing an instruction of a target system obviates the need for performing operations required for activating and inactivating processes associated with these operations.

PERIPHERAL CONTROL AND BRANCH INSTRUCTIONS

It is assumed by way of example, that the next instruction fetched is from the same target system program. Normally, this instruction will be a type of peripheral control and branch (PCB) instruction used to find out when a data transfer operation has been completed.

In the present example, it is also assumed that the ESP has issued the PDT instruction just processed and hence the resources required by the PDT instruction are in use or busy. Now the ESP fetches a PCB instruction which tests whether the operations specified by the PDT instruction have been completed thereby making available the assigned resources.

The PCB instruction can have all of the formats shown in FIGS. 6 and 11. Thus, the PCB instruction in contrast to the PDT instruction can have a format which only includes a single control variant character (i.e. C1 character). In this example, it is assumed that the PCB instruction has the particular format just mentioned. Briefly in the target systems PCB instructions can initiate several types of operations including non data transfer operations which involve strictly mechanical peripheral device operations, test and branch operations, mode change operations and peripheral interrupt operations. A test and branch operation tests the status of a PCU and/or a read/write channel(s). If the condition being tested is present (e.g. PCU/RWC is busy), a program branch is made to the instruction at the location specified by the A address of the PCB instruction. The C1 control character designates the read/write channel or combination of channels whose status is to be tested. When a RWC test is not desired, the C1 character is coded to contain all zeros. The C2 character when present designates the address of the PCU to be tested and it is coded the same as for a PDT instruction. The C3-cn characters when present designate the control and test operations. For further information regarding the use of PCB instructions, reference may be made to the aforementioned programming manual.

It is assumed that the PCB instruction contains an A address which is the same as A address of the PCB instruction being processed. Therefore, when the PCB instruction is executed in the target system to test the condition specified it branches to itself in the event that the test is positive and is executed again by the target system. Repeated execution of a PCB instruction is done when the target program requires that a particular operation be completed before the next instruction is fetched (e.g. need resources).

By contrast, the arrangement of the present invention prevents the host system from emulating repeated execution of the same instruction. This makes the system resources available for other processes. In general, this is accomplished by having the emulator firmware when the test is positive perform an address check after it has performed the indicated test. It examines the address to which the instruction is to branch and compares it against the address included within the instruction itself. When the addresses are equal signaling that the instruction is branching on itself, the emulator firmware places a particular call to the ESP thereby enabling release of the host system to perform other tasks. In the event that the test performed by the PCB instruction indicates that the instruction is not branching on itself, the emulator firmware stores the pertinent information required and supplies the correct address to fetch the next instruction. Similarly, when the test is negative, the emulator firmware returns to fetch the instruction following the PCB instruction.

Figure 12A:
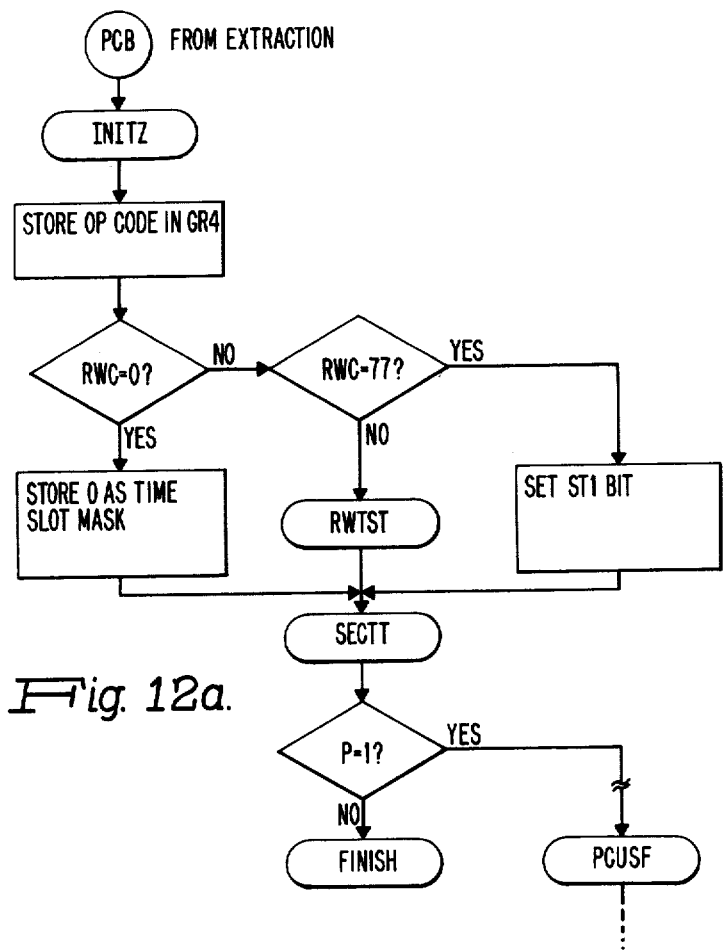
FIGS. 12a and 12b illustrate the operations performed in processing of a specific type of input-output control instruction.
Figure 12B:
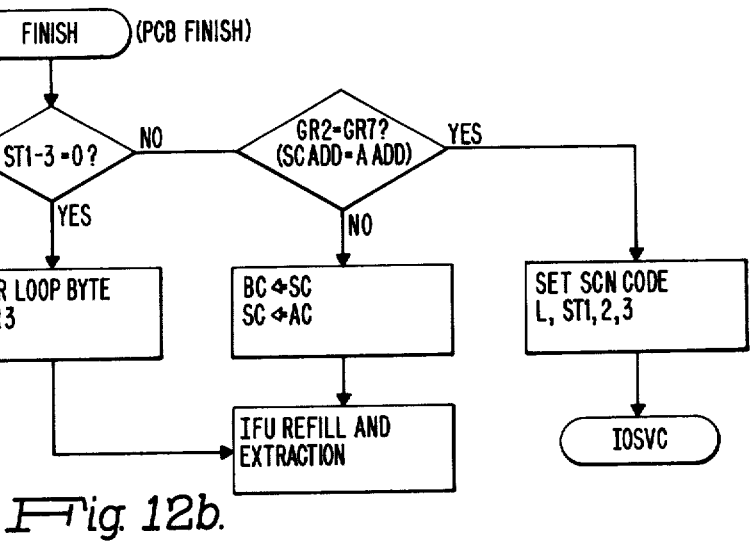

The operations performed by the emulator in processing a PCB instruction are shown in FIGS. 12a and 12b. For ease of explanation, it is assumed that the PCB instruction specifies a RWC busy test and therefore includes only a C1 character. Referring to FIG. 12a, it is seen that the PCB instruction is extracted and initially processed in the same manner as the PDT instruction. Next, the emulator tests the RWC code to determine whether it has a value of zero or 77. These tests can be considered to be like the initial testing of the RWC code of the PDT instruction. For example, the C1 character stored in EV register 206-82 is loaded into AC, AA and EW registers 206-3, 206-52 and 206-84 following extraction of the PCB instruction. Thereafter, the branch test circuits test the contents of EW register and AC register for values of $77_x$ and 00 respectively. When the contents have a value of zero, this means that the PCB instruction is to perform a test upon the PCU specified by the C2 character (i.e. RWC not busy). In this case, the emulator firmware is required to omit the RWC test routine of FIG. 8b, enter the sector test routine followed by other required test routines to complete the test specified. When the RWC code has a value of 77, the emulator firmware also immediately enters the sector test routine but first executes a microinstruction which sets the CF1 flip-flop to a binary ONE. This signals the ESP that the RWC is busy.

Assuming that the RWC code does not have a value of either ZERO or 77, the emulator firmware enters the RWC test routine of FIG. 8b. This routine causes those operations described in connection with the PDT instruction to be performed by the firmware. At this time, the sector bits from the RWC entry fetch from the RWC table of FIG. 6 are stored in the location designated sector code. As mentioned in connection with the PDT instruction, this value is altered in accordance with the values contained within the C2 or CE control characters depending upon the particular instruction format. However, in this example, this value remains unchanged since the PCB instruction being processed only includes a C1 control character.

As seen from FIG. 12a, the emulator then enters the sector test routine of FIG. 8c. Referring to that Figure, it will be seen that since the format of the PCB instruction includes only a C1 character, the next character fetched will contain a word mark. Thus, the work mark test is positive which means that the sector code value stored in the designated location is used to index into the sector code table (i.e., there is a fixed relationship between the sector and RWC). Following the fetching of the sector table entry, the same operations which were performed in connection with the PDT instruction are then performed. It will be noted from FIG. 8c that since the instruction only contains a C1 character, the emulator does not set the P bit (i.e. CF4 flip-flop) to a binary ONE.

Following the completion of the sector test, the emulator returns to the main routine upon testing the state of the CF4 flip-flop (i.e. P bit) via a microinstruction. Since it is still a binary ZERO, the emulator branches to the finish routine of FIG. 12b. Referring to FIG. 12b, it is seen that this routine tests the states of flip-flops CF1-CF3 for zeros. When all of these flip-flops are binary ZEROS, this means that the data transfer has been completed. The emulator then begins extraction of the next instruction.

Thus, it is seen that the emulator is able to carry out completely a test for determining the availability of a resource using the information contained within the I/O tables of FIG. 6. When it has determined that the resource is available indicating the completion of the data transfer operation, the emulator begins extraction of the next instruction.

When the resource specified, here the RWC, is busy, one of the flip-flops CF1-CF3 will be set to a binary ONE (i.e. CF2 flip-flop). This causes the emulator to execute a microinstruction which compares the sequence counter address contents stored in location GR2 representing the A address of the PCB instruction being executed with the A address specified in the PCB instruction stored in location GR7. This test determines whether or not the PCB instruction requires that it branch on itself. When the addresses are equal, the emulator causes a predetermined code designated as L as well as the states of flip-flops CF1 through CF3 to be stored in the SCN code field of location GRC (see FIG. 4). This signals the ESP that the same PCB instruction will be repeated until a particular I/O operation is completed. The host system is then able to use the time available to process other programs.

When the addresses are not equal, the emulator loads the address contents of the sequence counter location of the LSM into the BC location of LSM 207-1 and the address contents of the A counter location into the sequence counter location of the LSM. This effects the branch operation. Next, the IFU 101-3 fetches instruction specified by the branch address as indicated in FIG. 12b.

From the foregoing, it is seen that the arrangement of the present invention is able to expeditiously process any number of different types of I/O instructions specifying various system requirements. Moreover, the emulation system of the present invention is able to determine quickly at the earliest point in time during processing whether the I/O instruction of the target system is valid for execution. When it is determined that it is not, it immediately calls the ESP and returns to status information as to the reason why the instruction was not found to be valid. In those instances where the I/O instruction was found that it could be executed, the emulator provides information which enables the emulator software, ESP, to more expeditiously perform those operations required for executing the I/O instruction utilizing the facilities made available by the host system.

In addition to the above, the emulation apparatus of the present invention using the information contained in a number of tables is able to execute completely certain types of input/output control instructions of target system programs. Also, the emulation apparatus in accordance with the present invention, signals those instances where continued execution of a control instruction will result in a loss of system processing time. This arrangement results in improving the overall performance of the host system.

Also, in accordance with the present invention, various types of entries included within the tables referenced during the processing of target system instructions can be coded to relax certain interlocks or constraints imposed by the target systems programs. In this manner, the emulation apparatus of the present invention can more efficiently execute those target system programs which do not rely for proper execution upon certain restrictions present in the target system. This arrangement can reduce considerably system overhead. Other advantages of the present invention will be readily appreciated by those skilled in the art.

To prevent undue burdening the description with matter within the ken of those skilled in the art, a block diagram approach has been followed with a detailed functional description of each block and specific identification of the circuits it represents. The individual engineer is free to select elements and components such as flip-flop circuits, shift registers, etc. from the individual's own background or from available standard references such as those referenced herein.

Also, the exact coding patterns for the individual microinstructions were not disclosed since the engineer is free to select alternate forms of coding. For further details and insight into techniques for deriving such coding see the text titled "Microprogramming Principles and Practices" by S. S. Husson published by Prentice-Hall, Inc., Copyright 1970. For convenient reference, the following appendix is included which defines certain terms which have been used in describing a preferred embodiment of the present invention.

APPENDIX GLOSSARY OF TERMS

Absolute Address - the physical address of a hardware byte in main store.

Address Development - a hardware function which operates on a number of address elements to compute an absolute address which is used to refer to a location in main storage.

Addressing - locating an object by any of a number of virtual, logical, and physical means.

Address Space - the set of logical, segmented addresses corresponding to a process that the CPU is permitted to transform into absolute addresses during execution of that process.

Address Space Word - one of two words in a process control block which point to the segment table word array. The segment table word array defines the segment tables associated with the process.

Address Syllable - a logical address recognized by CPU hardware, normally an operand of an instruction.

Base Register - the primary element in segment addressing, referenced by number in every address syllable.

Boundary Address Register - a visible hardware register that defines the lowest memory address accessible to software.

Central Processor Unit - a part of a computer that includes circuits controlling the interpretation and execution of instructions.

Channel - a means of communicating between the processor subsystem and a peripheral subsystem. There are two types of channels, physical and logical. A physical channel is the hardware connection between the IOC and the PCU. A logical channel is a software communications path between main memory and a single peripheral device.

Channel Command Entry (CCE) - an instruction in a channel program.

Channel Command Word - an element of a channel command entry. Two channel command words constitute a channel command entry.

Channel Program - A sequence of instructions that cause a specific I/O operation to be performed by a peripheral device.

Compatibility Feature (CF) - the hardware/firmware included in the host system to provide for emulation.

Effective Address - a logical, as opposed to physical, address consisting of a segment table number, a segment table entry, and a segment relative address. These elements show the way to a particular segment descriptor, which eventually points to the segment being referenced.

Emulator Support Package (ESP) - the software facility required to provide for emulation. The ESP is the interface between the Compatibility Feature (CF) and the Support Control Program (SCP).

Emulator - the combined hardware/firmware/software. The emulator includes: (1) the Compatibility Feature; (2) the Emulation Support Package; and (3) the Peripheral Conversion Package.

Firmware - a hardware unit such as a control store which stores microprograms and forms a form of microprogrammed control.

General Register - a 32 bit register available to executing processes which generally holds binary or bit string data. Certain general registers can be used for indexing.

Index - a data structure which is maintained and operated upon by the system. The structure is visible to the user only in terms of a key which he presents for the purpose of making available or positioning to a specific record occurrence.

Indexing - modification of an address by a signed arithmetic value.

Index (Displacement) Value - Index (Displacement) Value refers to a calculated address value (usually calculated by the Compatibility Feature and placed in an Index Register) which may be referenced to a Base Register to address an information item.

Index Register - a general register used for indexing.

Integrated Emulation - the emulator is integrated within the system and both looks and runs to the extent possible as a system user job under the Operating System.

Interleave - sequential accessing of memory modules to reduce memory access time.

I/O Controller - a unit which provides the basic control for a specific I/O subsystem.

I/O Processes - potentially asynchronous system processes which deal primarily with the movement of data between peripheral storage or I/O devices and main storage.

Logical Channel - see channel.

Main Storage - all addressable storage from which instructions can be executed or from which data can be loaded directly into registers.

Magnetic Tape Controllers - the elements of the peripheral subsystem which control and operate magnetic tape devices (see peripheral processor/control unit).

Mass Storage Controllers - the elements of the peripheral subsystem which control and operate mass storage devices (see peripheral processor/control unit).

Memory Management - operating system facilities for the allocation, relocation, and disallocation of physical memory.

Microprogram - a set of machine codes used to implement the control functions of a processor.

Multiplex - to share a hard resource, such as memory, usually by time division.

Offset - in address development, the number of bytes after the beginning of the segment at which an addressed part of the segment starts.

Operating System - a system of basic software designed to support the efficient operation of user software.

Peripheral Processor/Control Unit - a stand-alone microprogrammed processor which executes channel programs to perform I/O operations.

Peripheral Conversion Package - Input/output conversion algorithms executed by ESP in conjunction with host peripheral subsystem hardware/firmware support apparatus.

Peripheral Subsystem Interface - a standard interface used for transfer and control between free-standing peripheral control units and I/O control units.

Physical Channel - see channel.

Physical Data Structure - a complete definition of the organization of data as it is physically recorded on media.

Physical I/O - that part of the operating system which initiates and controls the transfer of data between memory and peripheral or terminal devices.

Physical Storage - hardware used for the storage of data. It is composed of various types of recording media and the recording/reading hardware.

Process Control Block - a data structure (hardware defined and recognizable) that contains information needed to specify the state of a process at any given time.

Processor - a function capable of receiving data, manipulating it, supplying results, and controlling its sequence of operations in response to stored programs: short for central processor, generic for central processor, peripheral processor, or hardware/software processor.

Program - the specification of the procedural and associated information necessary to solve a problem.

Program Execution - the activity of a process in conformance to program specification.

Relative Address - the incremental/decremental location of some object relative to another.

Ring - a protection attribute of a segment that restricts the read, write, and execute access of processes to a segment.

Segment - a contiguous main memory space treated as a unit.

Segmentation - the use of a division of main memory into logical groupings called segments rather than into a single linear store.

Segment Base - the current origin of the segment. This is one of the fields in a segment descriptor word.

Segment Descriptor - entry in a segment table defining the characteristics of a segment or pointing to a segment descriptor.

Segmented Address - see effective address.

Segment Number - the identification of a particular segment consisting of a segment table number (selecting one of the segment tables of the process) and a segment table entry of that chosen table.

Stand-Alone (Compatibility) Mode - A non-integrated form of emulation in which the host environment functions exclusively as an emulated target system. No system scheduler is assumed and in order to switch from one system to another, reinitialization is required.

Support Control Program (SCP) - A program under which, with special system modules, the ESP is designed to run as a process group.

It will be appreciated by those skilled in the art that many changes may be made to the preferred embodiment of the present invention. For example, in the case where certain types of resources need not be specified by input/output instructions, certain tables and tests performed by microinstruction routines can be either simplified or omitted. Also, alternate arrangements of mode switching and microprogram control elements can be used. For example, it may be desirable to use a separate microprogram control element rather than a common control element for storing emulation microinstruction routines. Other arrangements will be readily apparent to those skilled in the art.

While in accordance with the provisions and statutes there has been illustrated and described the best form of the invention known, certain changes may be made to the system described without departing from the spirit and scope of the invention as set forth in the appended claims and that in some cases, certain features of the invention may be used to advantage without a corresponding use of other features.

Having described the invention, what is claimed is:

1. A host data processing system for processing and executing instructions of a target system program including a plurality of instructions coded in any one of a plurality of formats, said host system including means for operating both in a native and an emulation mode and comprising:

first storage means having a plurality of sections, each having a plurality of addressable storage locations, a first one of said sections being arranged to store said target system program, said program including at least one input/output instruction having an op code character and a plurality of control characters and a second one of said sections having a plurality of tables, each table including a number of entries, each having a predetermined number of bits and corresponding to the number of target system resources of one of a number of different classes not present in said host system and required for executing input/output instructions specifying different arrangements of programmable configurations of resources included in any one of a number of target systems normally operative to execute said instructions;

a plurality of storage registers coupled to said first storage means for storing predetermined ones of said control characters of said input/output instruction during the execution thereof;

arithmetic and logic means coupled to said plurality of registers;

a control store means including a plurality of microprogram sequences, each sequence including a plurality of microinstructions which upon being decoded generate control signals for controlling the transfer of information bytes between said first storage means, said plurality of registers and said arithmetic and logic means when said host system is conditioned to operate in said emulation mode for emulating the operations of one of said target systems for executing said instructions; and, branch and testing means for testing the state of signals applied thereto, said means being coupled to said arithmetic and logic means and to said plurality of registers, and to said control store means, said control store means being operative to reference each of said plurality of microprogram sequences in a predetermined sequence for fetching entries in each of said plurality of tables by generating signals for conditioning said arithmetic and logic means to generate address signals using different ones of said control characters stored in said registers and said each sequence generating signals for conditioning said arithmetic and logic means for testing of predetermined bits of corresponding ones of said entries by said branch and testing means to verify the validity and the availability of different ones of said target system resources specified by the coding of said one input/output instruction as required for execution of said instruction by said host system and determine within a minimum of time whether instruction execution is able to take place.

2. The system of claim 1 wherein each of said second section tables is locatable by a predetermined base reference address and said second section includes:

a channel resource table for storing a plurality of entries for the target system being emulated, one entry for each channel which can be specified by an input/output instruction of said target system program and which indicates the status of said channel and a predetermined entry coded for indicating the current status of channels in said target system and wherein said control store means includes a first microinstruction sequence including microinstructions for generating a first set of control signals for conditioning said arithmetic and logic means to combine said reference base address and a first control character of said input/output instruction in a predetermined manner to generate an indexed address to fetch one of said entries from said channel resource table and a second set of control signals to generate a predetermined address to fetch said predetermined entry, said arithmetic and logic means including means responsive to said first control signals of sequence to perform a logical operation upon predetermined information portions of said entries for testing the availability of said channel resources for assignment and output means coupled to said arithmetic and logic means being responsive to the result of said logical operation to set indicator storage means to a predetermined state for signaling the busy status of said channel to said host system.

3. The system of claim 2 wherein each of said entries is coded to include:

a counter code field portion coded to designate an address of one of a plurality of counters used in the target system for address storage by the channel resource specified; and, a busy mask field portion coded to designate which channel resources are required to be interlocked to accommodate a specified transfer rate;

said first microinstruction sequence generating control signals conditioning said arithmetic and logic means and branch and test means to test said counter code field portion of said one entry for a predetermined bit pattern indicating the invalidity of said counter address in said target system, said control store means being conditioned by said branch and test means when said counter address is detected as invalid to branch to a sequence of microinstructions for generating a predetermined coded message indicating that said counter address is invalid and said branch and test means when said counter address tests valid being operative to condition said control store means to continue execution of said first sequence, said sequence generating said control signals for conditioning said arithmetic and logic means to perform a logical and operation upon the contents of said busy mask field portions of said one entry and said predetermined entry and to test the result for zero to determine said availability of said target system channel resources for assignment.

4. The system of claim 3 wherein said busy mask field portion of each entry is selectively coded to enforce predetermined restrictions and to remove those interlock restrictions not required for proper execution of said target system program by said host system.

5. The system of claim 2 wherein said arithmetic and logic means is conditioned by said control signals to generate said indexed address in said predetermined manner by adding the value of said base address to four times the value of the channel code specified by said first control character.

6. The system of claim 3 wherein said second section further includes:
   a sector resource table for storing a plurality of entries for said target system being emulated, each entry coded to specify those time slots which are required to be assigned by said target system to accommodate a transfer rate on a sector in said target system specified by predetermined ones of said control characters;
   said one entry of said channel resource table further including a time slot mask field portion coded to designate a number of time slots required to be assigned by said sector to accommodate said rate and wherein said control store means includes a second microinstruction sequence, said second microinstruction sequence including microinstructions for generating control signals for conditioning said arithmetic and logic means and said branch and test means for testing the value of a predetermined portion of a second control character of said instruction to determine the formatting of said instruction, said arithmetic and logic means being conditioned by certain ones of said control signals in accordance with the results of said testing to generate a sector code from predetermined bits of certain ones of said control characters for combining with said reference base address in a predetermined manner for generating an indexed address for fetching an entry from said sector resource table and
   said arithmetic and logic means and said branch and test means being conditioned by other ones of said control signals for an instruction specifying a valid target system sector to perform a logical operation upon said time slot mask portion of said one entry and a predetermined portion of said one entry from said sector resource table to test the availability of those time slots specified for accommodating said transfer rate and said output means being responsive to the result of said operation to set said indicator storage means to said predetermined state for signaling that the time slots specified are busy causing said busy status of said channel.

7. The system of claim 6 wherein said time slot mask of each entry is selectively coded to enforce predetermined restrictions and to remove those interlock restrictions not required for proper execution of said target system program.

8. The system of claim 6 wherein said arithmetic and logic means is conditioned by said control signals to generate said indexed address in said predetermined manner by adding the value of said base address and a constant value representative of the size of said channel resource table to four times the value of said sector code specified by said second control character.

9. The system of claim 6 wherein each of said entries of said sector table includes;
   a time slot status field portion coded to designate those time slots currently in use in said sector; and,
   a status field portion coded to indicate whether the sector exists in said target system;
   said arithmetic and logic means being conditioned by certain microinstructions in said second microinstruction sequence to test said status field portion and condition said arithmetic and logic means to perform a logical AND operation upon the contents of said time slot status field and said time slot mask field to test said availability of time slots specified only when said test is positive.

10. The system of claim 9 wherein said branch and test means being conditioned in the absence of a positive test to branch to a sequence of microinstructions for generating a predetermined coded message signaling that the sector specified by said instruction does not exist in said target system.

11. The system of claim 6 wherein said second section further includes:
   a peripheral control resource table for storing a plurality of entries for each sector in said target system, one entry for each possible peripheral control address which can be specified by said target system program, each said one entry coded to include status identifying the type of peripheral control unit; and
   said each entry of said sector resource table further including a displacement address value identifying the location of said peripheral control resource table associated therewith;
   said control store means including a third microinstruction sequence, said third microinstruction sequence including microinstructions for conditioning said arithmetic and logic means to generate an indexed address by combining in a predetermined manner said base address and said displacement address value of said one entry with a peripheral control code corresponding to a plurality of address code bits included within a predetermined one of said control characters for specifying an address of one of a plurality of peripheral control units said arithmetic and logic means and branch and test means being conditioned by microinstructions included in said third microinstruction sequence to select for testing a predetermined bit of said one entry fetched from said peripheral control table to detect whether said status is usable directly for a single peripheral control or is being shared to require fetching of another entry from said peripheral control table to locate status information designating the type of peripheral control specified by said instruction.

12. The system of claim 11 wherein said predetermined bit of said one entry is set to a predetermined state for enabling direct use of said status for said single peripheral device.

13. The system of claim 11 wherein said arithmetic and logic means is conditioned to generate said indexed address in said predetermined manner by adding the value of said base address and said displacement value of said one sector table entry to four times said peripheral control code.

14. The system of claim 11 wherein said control store means includes a further microinstruction sequence including microinstructions for conditioning said branch and test means to perform a multiple branch operation in response to the coding of said status information designating said type of peripheral control to one of a number of a different microinstruction sequences coded in accordance with the type of peripheral control, each of said microinstruction sequences including microinstructions for generating control signals to store a different predetermined code for identifying said type of peripheral control specified by said instruction.

15. The system of claim 14 wherein said branch and test means is responsive to an all zero coding to branch to a predetermined one of said number of microinstruction sequences for generating a predetermined message signaling that said peripheral control type specified by said instruction does not exist in said target system.

16. The system of claim 14 wherein said control store means includes a fourth microinstruction sequence, said arithmetic and logic means and said branch and test means being conditioned by microinstructions of said fourth sequence to test a predetermined bit of said one entry from said peripheral control table and set a second indicator for signaling the busy status of said peripheral control to said host system.

17. The system of claim 14 wherein said second section further includes:
 a device resource table for storing a plurality of entries for each type of a peripheral control, one for each possible peripheral device address which can be specified by said target system program, each said one entry coded to include status information relative to said device; and
 wherein said each entry of said peripheral control table further includes a displacement address value identifying the location of said peripheral control table associated therewith;
 said control store means including a fifth microinstruction sequence, said fifth microinstruction sequence including microinstructions for conditioning said arithmetic and logic means to generate an indexed address by combining in a predetermined manner said base address and said displacement address value of said one entry with a peripheral device address code corresponding to a plurality of address code bits included within a predetermined one of said control characters specifying an address of one of a plurality of peripheral devices to fetch one of a plurality of entries from said device resource table.

18. The system of claim 17 wherein said arithmetic and logic means is conditioned by said microinstructions to generate said indexed address in said predetermined manner by adding the value of said base address and said displacement value of said one peripheral control table entry to four times said peripheral device code.

19. The system of claim 17 wherein said control store means includes a sixth microinstruction sequence, said arithmetic and logic means and said branch and test means being conditioned by microinstructions in said sequence to test said device resource entry and set a third indicator storage means signaling the busy status of said device to said host system.

20. A data processing system for processing and executing instructions of a target system program including different types of input/output instructions coded in any one of a plurality of different formats and including a plurality of registers interconnected for receiving and transferring information, an arithmetic and logic means coupled to said plurality of registers and a microprogram control means for controlling the transfer of information in said system, said system when operating in an emulation mode of operation comprising:
 a main store including a plurality of addressable sections, said target system program being stored in a first one of said sections, said target system program including at least one type of input/output instruction coded to include an op code character specifying an operation not executable by said processing system when operating in a normal mode, a first group of address characters corresponding to a first address field, and at least a first control character coded to specify at least one of a plurality of channel resources of a target system configured for executing said target system program;
 a second one of said sections including a plurality tables, each table being locatable by a predetermined base reference address and containing a plurality of entries coded to define the status of each resource of one of a plurality of different types which can be specified by said program as being required for executing said different types of input/output instructions; said microprogram control means including;
 a control store for storing a plurality of microprogram sequences, each for verifying the validity and availability of resources of any one of said different types by controlling the transfer of information entries between one table of said second section of said main store, said plurality of registers and said arithmetic and logic means and
 branch and testing control means coupled to said control store and coupled to receive signals from said arithmetic and logic means and predetermined ones of said plurality of registers,
 said control store being conditioned initially by said branch and testing control means to branch to a first main routine in response to said op code character coded to specify a control and branch operation, said first main routine generating signals for conditioning said control store to reference different ones of said routines in a predetermined sequence for determining whether those resources specified for testing by said instruction are valid and assignable in said target system, said main routine including at a specified point therein a microinstruction sequence for conditioning said microprogram control means to generate signals for performing an address check upon said first address field of said instruction when said specified resources are busy for detecting another request in said target system program for said operation specified by said instruction op code character until said resources are available, enabling a freeing of said system for other operations.

21. The system of claim 20 wherein said microinstruction sequence of said main routine includes at a specified point therein a microinstruction for conditioning said arithmetic and logic means for comparing said first address field with an address stored in one of said plurality of registers representing the address in said target program of said one type of instruction under execution, said routine including microinstructions for conditioning said microprogram control means to reference microinstructions for causing a branching to the instruction in said target system program specified by said first address field upon detecting a signal indicating that said addresses are unequal.

22. The system of claim 20 wherein said one type of input/output instruction further includes a second control character coded to specify one of a plurality of sector resources and one of a plurality of peripheral control resources in said target system for executing said instruction and a required number of control characters for designating other resources of said target system required to be specified by said instruction for executing a data transfer operation involving one of a plurality of peripheral devices, said branch and testing control means conditioning said control means initially to branch to a second main routine when said op code character is coded to specify said transfer operation, said second routine conditioning said control store to reference each of said sequences in said predetermined sequence until detecting the unavailability of a resource for assignment or until detecting that all of the resources specified by said instruction are valid and available for assignment, said second main routine including at different specified points therein microinstructions for generating one of a number of predetermined call messages for storage in a predetermined one of said plurality of registers, said call message indicating the type of program assistance required and including information indicating the class of instruction being executed and the status of each resource processed.

23. The system of claim 22 wherein for a first type of assistance one predetermined call message is coded to include any one of a number of device specific codes signaling that said instruction is a valid, executable data transfer instruction to the device identified by said code, for a second type of assistance said message is coded to include a first predetermined code signaling that said instruction specifies an illegal channel resource, for a third type of assistance said message is coded to include a third predetermined code signaling that said instruction specifies a non existent peripheral control resource, for a fourth type of assistance said message is coded to include a fourth predetermined code signaling that said instruction does not specify a peripheral control resource or for a fifty type of assistance said message to include a fifth predetermined code signaling that said instruction includes illegal/undefined strings of control characters.

24. The system of claim 23 wherein said one predetermined call message includes status bits for signaling the status of said channel resource, said peripheral control resource and said peripheral device resource, said status bits for said first type of assistance all being set to a first predetermined state signaling that said resources are not busy and the other call messages having at least one of said status bits set to a second predetermined state signaling that one of said resources is busy.

25. The system of claim 23 wherein said first and second main routines and said plurality of microinstruction sequences include at specified points therein microinstruction for storing status information in a predetermined set of said plurality of asid registers derived from said instruction pertinent to the processing of said instruction, said status information including said op code character, a peripheral and control identification code.

26. A method for facilitating the emulation by a data processing system of input/output instructions of a target system program having any one of a plurality of different formats and each including a plurality of characters, said data processing system including a main store having a plurality of sections, one section storing said target system program, a plurality of registers interconnected by a plurality of buses, an arithmetic and logic means connected to receive signals from certain ones of said registers and a microprogram control system for controlling said data between said store, said registers and arithmetic and logic means in an emulation mode of operation by decoding microinstructions contained in a control store included therein, said method comprising the steps of:

storing a plurality of tables in a second section of said main store, each of said tables including a plurality of entries coded to define the status of each resource included in one of a plurality of different classes not physically present in said data processing system which can be validly specified by input/output instructions of said target system programs, each input/output instruction including a plurality of control characters specifying resources required for executing said target system instruction;

storing a plurality of microinstruction sequences in said control store, each sequence for generating signals for accessing different ones of said plurality of entries of one of said plurality of tables, for verifying the validity and availability status of resources of a particular one of said classes;

executing each of said microinstruction sequences in a predetermined sequence for accessing predetermined ones of said entries of different ones of said plurality of tables using corresponding ones of said control characters for determining the validity and availability for assignment of each of those resources specified by each of input/output instructions;

terminating the execution of said sequences upon detecting when a first one of said resources is either invalid or unavailable for assignment or upon completion of executing said sequences; and, generating a predetermined call message indicating what program assistance is required, said message including information defining the format of input/output instruction being executed and the status of resources having been checked.

27. The method of claim 26 wherein a first one of said tables is a channel resource table for storing a plurality of entries for said target system, one entry for each channel which can be specified by said input/output instructions and which indicates the status of said channel and a predetermined entry coded for indicating the current status of channels in said target system, said method further including the steps of:

generating an indexed address by executing microinstructions of a first one of said sequences using a first predetermined one of said plurality of characters for fetching one of said entries from said channel resource table;

performing a logical operation upon predetermined portions of said one entry and said predetermined entry for testing the availability of said channel; and, generating a predetermined call message in response to a predetermined result to signaling the busy status of said channel.

28. The method of claim 27 wherein each of said channel resource entries includes a busy mask field portion for designating which of said channel resources are required to be interlocked to accommodate a specified transfer rate, said method further including the step of selectively coding said mask field portion of each entry for enforcing predetermined restrictions and removing those not required for proper execution of said target system program by said data processing system.

29. The method of claim 27 wherein each of said channel resource entries further includes a time slot mask field portion for designating a number of time slots required to be assigned to said channel resource for accommodating said specified transfer rate, said method further including the step of selectively coding said time slot mask field of each entry for enforcing predetermined restrictions and removing those traffic restrictions not required for said proper execution of said target system program by said data processing system.

30. The method of claim 27 wherein each of said channel resource entries includes a counter code field portion for designating an address of one of said plurality of counters used in said target system for address storage by said channel resource associated therewith, said method further including the step of coding said counter code field of each entry with a predetermined code when said counter address is invalid for use in said target system.

31. A method for facilitating the emulation by a data processing system of input/output instructions included in a target system program having any one of a plurality of different formats and each including a plurality of control characters, said data processing system including a main store having a plurality of sections, one section storing a plurality of instructions comprising said target system program, a plurality of registers interconnected by a plurality of buses, an arithmetic and logic means connected to receive signals from certain ones of said registers and a microprogram control system for controlling the transfer of data between said store, said registers and arithmetic and logic means in an emulation mode of operation, by decoding microinstructions contained in a control store included therein, said method comprising the steps of:

storing a plurality of tables in a second section of said main store, each of said tables including a plurality of entries coded to define the status of resources of one of a plurality of different classes not physically present in said data processing system which can be validly specified by instructions of said target system program and required for executing said target system instructions;

storing a plurality of microinstruction sequences in said control store, each sequence beind coded for accessing different ones of said plurality of entries of one of said pluralities of tables, for verifying the validity and availability status of resources of a certain class;

executing certain ones of said microinstruction sequences in a predetermined sequence for accessing predetermined ones of said entries using corresponding ones of said control characters for testing the status of each of the resources specified by said input/output instructions; and, conditioning said data processing system to execute a next one of said plurality of instructions in said target system program upon detecting that said resources specified by said input/output instruction are not busy.

32. The method of claim 31 wherein said method further includes the steps of:

performing an address check upon a first address field of said instruction when said specified resources are busy and generating a predetermined message when said first address compares equally with an address representing said instruction under execution signaling a repeating of the operation specified by said instruction until said resources specified are not busy.

33. The method of claim 32 wherein said method further includes the step of conditioning said microprogram control system to reference microinstructions for causing a branching to the instruction specified by said first address field upon detecting that said address are unequal.

* * * * *

UNITED STATES PATENT OFFICE
CERTIFICATE OF CORRECTION

PATENT NO. : 3,955,180
DATED : May 4, 1976
INVENTOR(S) : Allen C. Hirtle

It is certified that error appears in the above-identified patent and that said Letters Patent are hereby corrected as shown below:

Column 53, line 63, delete "fifty" and insert --fifth--.

Column 53, line 65, after "illegal" delete the dash.

Column 54, line 13, delete "asid" and insert --said".

Column 54, line 28, delete "said" (first occurrence) and insert --of--.

Column 54, line 38, after "input" delete the dash.

Column 54, line 55, after "of" insert --said--.

Column 54, line 63, after "input" delete the dash.

Column 56, line 21, delete "beind" and insert --being--.

Signed and Sealed this

Fifteenth Day of March 1977

[SEAL]

Attest:

RUTH C. MASON
Attesting Officer

C. MARSHALL DANN
Commissioner of Patents and Trademarks